(12) United States Patent
Amaduzzi

(10) Patent No.: US 12,502,642 B2
(45) Date of Patent: Dec. 23, 2025

(54) CLOSING SYSTEM FOR A CONTAINER OF A FILTERING DEVICE

(71) Applicant: FIL.TECH SRL, Rubiera (IT)

(72) Inventor: Roberto Amaduzzi, Rubiera (IT)

(73) Assignee: FIL.TECH SRL, Rubiera (IT)

( * ) Notice: Subject to any disclaimer, the term of this patent is extended or adjusted under 35 U.S.C. 154(b) by 941 days.

(21) Appl. No.: 17/762,461

(22) PCT Filed: Sep. 9, 2020

(86) PCT No.: PCT/IB2020/058362
§ 371 (c)(1),
(2) Date: Mar. 22, 2022

(87) PCT Pub. No.: WO2021/059063
PCT Pub. Date: Apr. 1, 2021

(65) Prior Publication Data
US 2022/0362716 A1    Nov. 17, 2022

(30) Foreign Application Priority Data

Sep. 25, 2019    (IT) ..................... 102019000017192

(51) Int. Cl.
*B01D 61/08*    (2006.01)
(52) U.S. Cl.
CPC .......... *B01D 61/08* (2013.01); *B01D 2313/02* (2013.01); *B01D 2313/041* (2022.08); *B01D 2313/201* (2022.08); *B01D 2313/21* (2013.01)
(58) Field of Classification Search
CPC .............. B01D 61/08; B01D 2313/041; B01D 2313/201; B01D 2313/02; B01D 2313/21
See application file for complete search history.

(56) References Cited

U.S. PATENT DOCUMENTS 6,533,931 B1 *  3/2003  Reid ...................... B01D 35/31
                                                             210/450
6,592,152 B1    7/2003  Nejigaki
(Continued)

FOREIGN PATENT DOCUMENTS

BE         700173 A     12/1967
DE       9209684 U1 *    9/1992 ............. B01D 65/00
JP      H05 33831 U      5/1993

OTHER PUBLICATIONS

DE9209684U1_English translation (Year: 1992).*

*Primary Examiner* — Youngsul Jeong
(74) *Attorney, Agent, or Firm* — Volpe Koenig

(57) ABSTRACT

A container for filtering devices includes: a tubular lateral wall, a bottom plate which closes a first axial end of said lateral wall, and a closing system configured to close—in an openable fashion—a second and opposite axial end of said lateral wall. The closing system includes: an occlusion element, which includes a cylindrical lower portion coaxially insertable into the lateral wall, and an upper portion from which one or more abutment elements configured to rest on the edge of the second axial end of the lateral wall project, one or more coaxial annular seats on the outer lateral surface of the lower portion of the occlusion element configured to receive an annular sealing gasket, and a tightening member including a ring nut configured to surround the occlusion element and to be axially constrained to the lateral wall's exterior, at the second axial end thereof.

11 Claims, 33 Drawing Sheets

(56) References Cited

U.S. PATENT DOCUMENTS

| | | | |
|---|---|---|---|
| 7,601,256 B2 * | 10/2009 | Beall | C02F 9/20 |
| | | | 210/257.2 |
| 9,808,766 B2 * | 11/2017 | Lee | B01D 61/08 |
| 2007/0045165 A1 | 3/2007 | Beall | |
| 2017/0015569 A1 | 1/2017 | Watanabe | |
| 2018/0334394 A1 | 11/2018 | Burrows | |

* cited by examiner

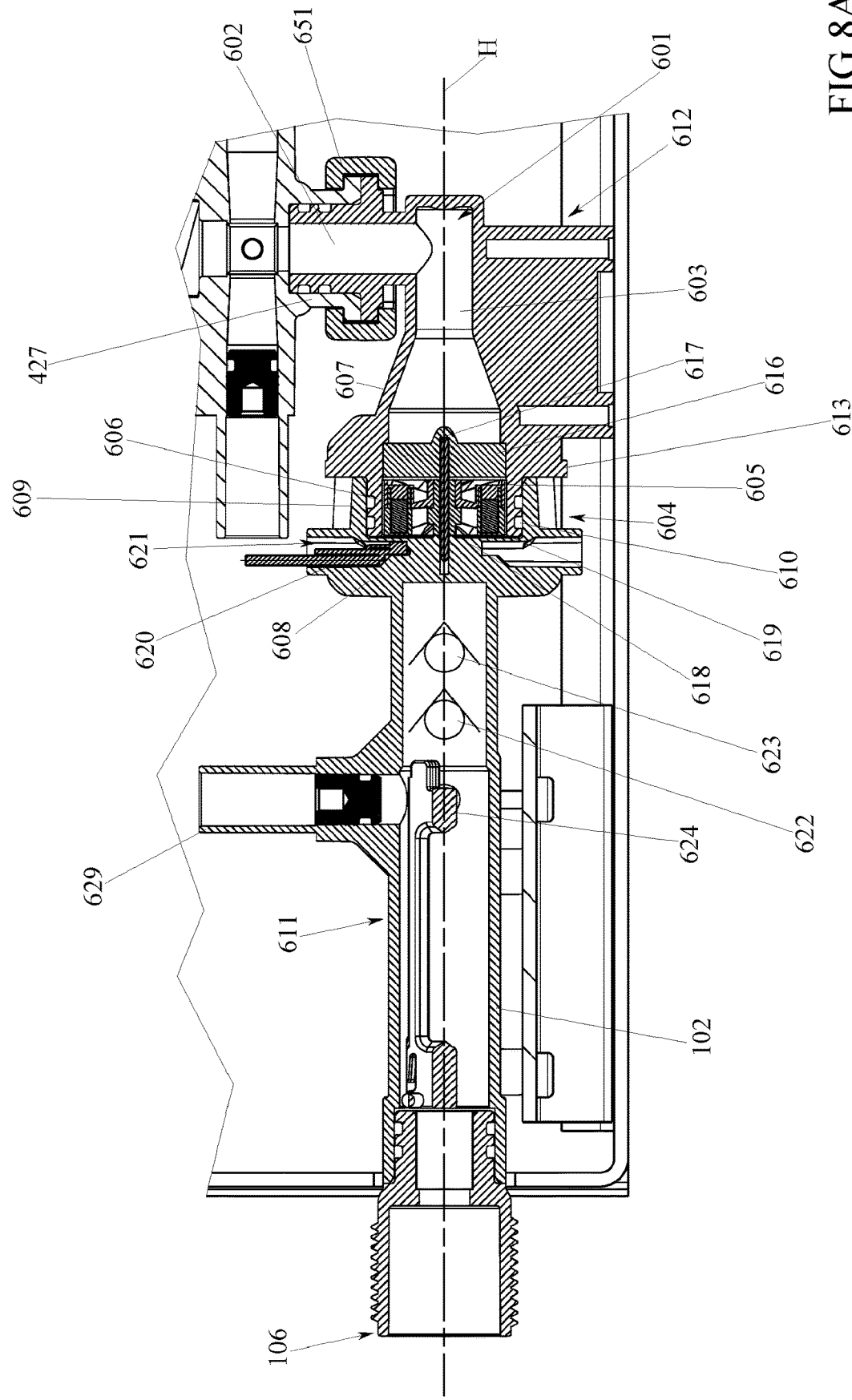

CLOSING SYSTEM FOR A CONTAINER OF A FILTERING DEVICE

TECHNICAL FIELD

The present invention relates to a container for filtering devices, for example but not exclusively for reverse osmosis filtering devices. In particular, the present invention relates to a closing system suitable to be associated with the aforesaid container.

BACKGROUND

As is known, most of the filtering devices, including also the reverse osmosis filtering devices, usually comprise a container suitable to contain a filtering cartridge.

This container is generally formed by a cup-like body which comprises a tubular lateral wall, for example cylindrical, and a bottom plate that closes an axial end of said lateral wall.

The opposite axial end of the lateral wall defines the mouth of the cup-like body and is occluded by a closing system, which can be removed to allow the container to be opened, for example if it is necessary to replace the filtering cartridge.

Traditionally, the closing system consists of a cover which is screwed onto the mouth of the cup-like body, by interposition of one or more annular sealing gaskets, which have the function of preventing the outflow of the liquid being filtered.

This closing system, although very simple, has some long-standing drawbacks.

For example, in some applications, the cover tends to unscrew spontaneously due to the vibrations to which the filtering device is subjected, causing liquid leaks.

In other applications, on the contrary, the prolonged use of the filtering devices causes the annular sealing gaskets to adhere (stick) between the cover and the mouth of the cup-like body, making any unscrewing of the cover extremely difficult.

There are also filtering devices, including in particular those for reverse osmosis, where the container containing the filtering cartridge is subjected to a relatively high internal pressure.

This pressure acts against the walls of the cup-like body and the cover, which therefore tend to deform outwards.

In some cases this deformation is greater at the cover than at the mouth of the cup-like body, causing a loosening of the compression of the annular sealing gaskets which lose their effectiveness and cause the liquid outflow.

DISCLOSURE OF THE INVENTION

In light of the above, an object of the present invention is to solve the aforementioned drawbacks of the prior art, in the context of a simple, rational and relatively low-cost solution.

This and other purposes are achieved by the characteristics of the invention reported in independent claim 1. The dependent claims outline preferred and/or particularly advantageous but not strictly necessary aspects of the invention.

In particular, an embodiment of the present invention makes available a container for filtering devices, comprising:
 a tubular lateral wall,
 a bottom plate which closes a first axial end of said lateral wall and
 a closing system suitable to close—in an openable fashion—a second and opposite axial end of said lateral wall,
wherein said closing system comprises:
 an occlusion element, which comprises a cylindrical lower portion suitable to be coaxially inserted into the lateral wall, and an upper portion from which one or more abutment elements suitable to rest on the edge of the second axial end of the lateral wall project,
 one or more annular seats obtained coaxially on the outer lateral surface of the lower portion of the occlusion element and singularly suitable to receive an annular sealing gasket, and
 a tightening member comprising a ring nut suitable to surround the occlusion element and to be axially constrained to the external of the lateral wall, at the second axial end thereof, and at least one abutment surface suitable to rest on the upper portion of the occlusion element, on the opposite side with respect to the bottom plate.

Thanks to this solution, the sealing function and the support and contrasting function of the pressure forces are advantageously delegated to two separate components, respectively to the occlusion element and to the tightening element, allowing to eliminate the criticalities of traditional systems. In fact, while the annular sealing gaskets are carried by the occlusion element, which can be completely without threadings and can be sized to obtain the best seal under all operating conditions, the pressure is supported exclusively by the tightening member which, being without annular sealing gaskets, will always be easy to unscrew and remove when it is necessary to open the container.

In this regard, the ring nut of the fixing member can be, for example, a threaded ring nut which is screwed to the external of the lateral wall of the container but it is not excluded that, in other embodiments, the axial constraint can be made by means of a bayonet coupling or other.

According to an aspect of the invention, the lower portion of the occlusion element can be defined by a tubular wall which delimits an axial inner cavity open towards the bottom plate.

In this way, the internal pressure to which the container can be subjected during operation also acts on this tubular wall, pushing it from the inside towards the outside and, consequently, constantly tending to push the annular sealing gaskets against the inner surface of the lateral wall of the container.

In this regard, it is preferable that said tubular wall of the occlusion element is sized in such a way as to safely prevent the annular gaskets from losing contact with the lateral wall of the container, despite the expansions due to the internal pressure.

For example, it is envisaged that the tubular wall of the occlusion element may have a thickness less than the thickness of the lateral wall of the container, at least at the second axial end thereof.

According to another aspect of the invention, the edge of the second axial end of the lateral wall of the container can be shaped so as to define a cam profile on which the abutment elements of the occlusion element can slide following a rotation of the latter around the axis thereof, said cam profile being suitable to transform said rotation into an axial displacement of the occlusion element with respect to the lateral wall.

In this way, the removal of the occlusion element is advantageously facilitated when it is necessary to open the container. In fact, even in the case in which the annular gaskets "stick" between the occlusion element and the lateral wall of the container, by rotating the occlusion element around the axis thereof, the abutment elements slide on the cam profile of the edge of the container, causing a roto-translation of the occlusion element which facilitates the detachment of the annular seals and causes a first axial extraction of the occlusion element with respect to the container.

In this regard, the upper portion of the occlusion element can have an axial cavity suitable to obtain a prismatic coupling with a manoeuvring key of the coupled type.

This solution has the advantage of allowing simpler actuation with rotation of the occlusion element with respect to the container, facilitating the manual removal thereof.

Essentially for the same reason, the upper portion of the occlusion element can have one or more through slots having transverse axes with respect to the axis of the occlusion element itself, for example at the abutment elements.

These through slots can in fact accommodate any elongated tool, such as a screwdriver, by means of which it is possible to leverage to more easily rotate the occlusion element with respect to the lateral wall of the container.

According to another aspect of the present invention, the abutment surface of the tightening member can be defined by a bottom wall which occludes an axial end of the ring nut.

In this way, the tightening member essentially takes on the shape of a cover, which is simple and inexpensive to make, which is screwed onto the second end of the container. A preferred aspect of the present invention provides that the container can also comprise an anti-unscrewing system for the tightening member with respect to the lateral wall of the container.

Thanks to this solution it is advantageously possible to prevent the tightening member from unscrewing spontaneously, for example by effect of vibrations, causing accidental opening of the container.

For example, said anti-unscrewing system can comprise:
a first notch fixed to the tightening member,
a second notch moveably coupled to the lateral wall of the container between an engagement position, in which it is suitable to be engaged with the first notch for preventing the rotation of the tightening member, and a disengagement position in which it frees said engagement, and
a spring suitable to push the second notch in engagement position.

In this way, after the tightening member has been screwed in, the second notch, pushed into engagement position by the spring, prevents any accidental unscrewing of the tightening member.

If it is necessary to open the container, it is then sufficient to manually displace the second notch into the disengagement position, in contrast to the action of the spring, and unscrew the tightening member.

BRIEF DESCRIPTION OF THE FIGURES

Further features and advantages of the invention will be more apparent after reading the following description provided by way of non-limiting example, with the aid of the figures illustrated in the accompanying drawings.

FIG. 8A is an enlarged detail of FIG. 8 showing the outlet module.

DETAILED DESCRIPTION

Figure 1:
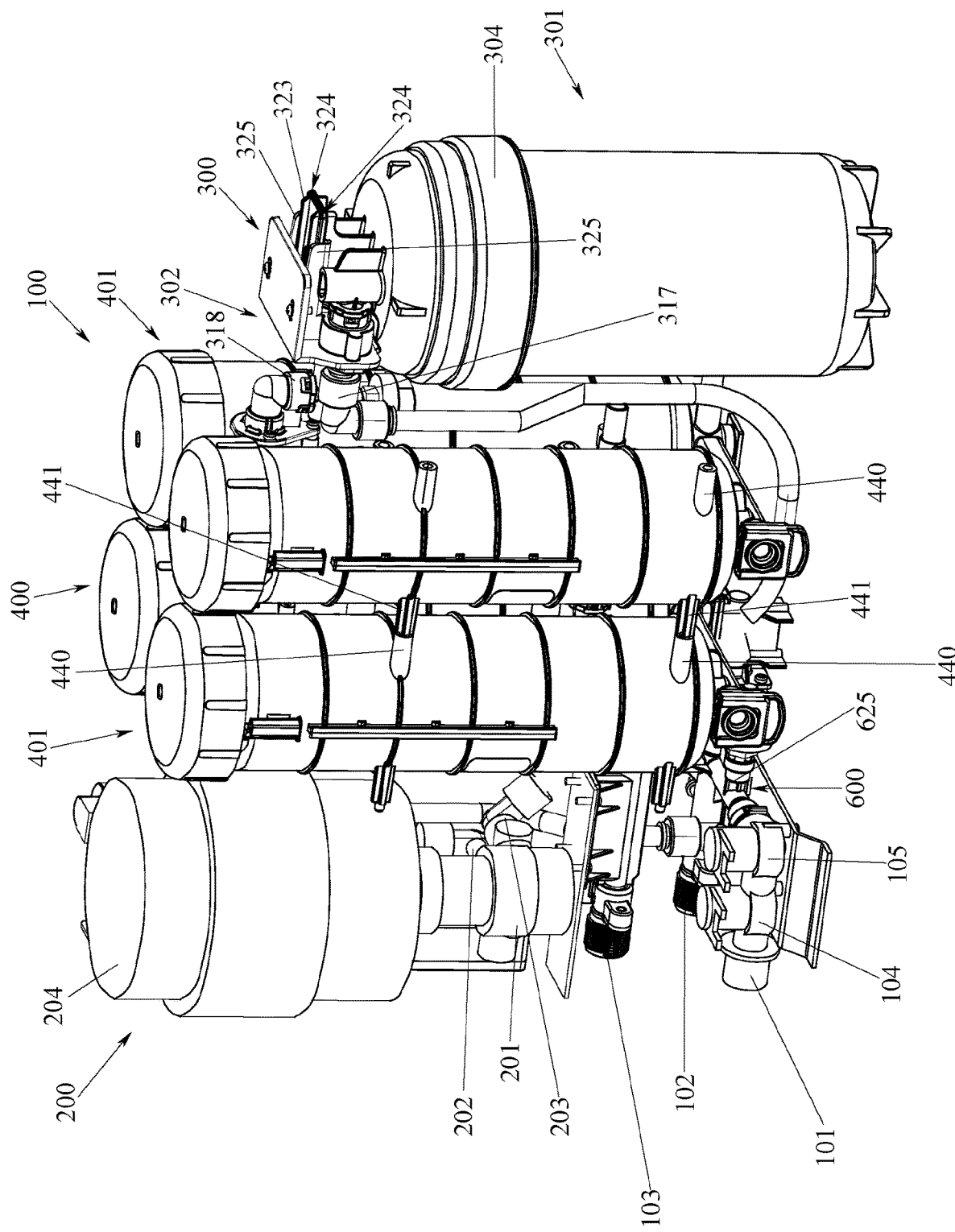
FIG. 1 is a perspective view of a water treatment plant according to an embodiment of the present invention, without the external case.

The aforesaid figures describe two examples of a plant 100 for the treatment of water, which can be advantageously used both in the food sector, for example for the treatment of water intended for direct consumption or for the preparation of beverages or other foods, and in the technological field, for example for the treatment of water intended for washing plants (e.g. dishwashers, washing machines or other), and for applications that can be both for domestic and industrial use.

Both plants 100 schematically comprise an inlet duct 101 for the water to be treated, which can be connected for example with the water distribution network, an outlet duct 102 for the treated water, which can be connected with the utilities, and a discharge duct 103 for any reject water, which can be connected, for example, with a sewer disposal system.

According to an aspect of the present disclosure, the outlet duct 102 can be integrated into a more complex outlet module 600, which comprises numerous other functions of the plant 100 in order to limit the connections with pipes and fittings.

The plant 100 also comprises a pumping group 200, which is suitable to receive water coming from the inlet duct 101 and to feed it under pressure towards the outlet ducts 102 and discharge ducts 103, after having made it pass through the treatment devices.

The inlet duct 101 can be provided with a main solenoid valve 104, which is suitable to be controlled by an electronic control unit (not illustrated) to selectively allow or prevent the inflow of water towards the pumping group 200.

The inlet duct 101 can also be provided with a bypass solenoid valve 105, which is normally closed and can be controlled for its opening in order to place the inlet duct 101 in direct communication with the outlet duct 102, regardless of the opening or closing state of the main solenoid valve 104.

In particular, the bypass solenoid valve 105 can be controlled by the electronic control unit which also controls the main solenoid valve 104 or by a simple switch which allows the selective feeding of the electronic control unit or of the bypass solenoid valve 105. Between the pumping group 200 and the outlet ducts 102 and discharge ducts 103, the plant 100 can comprise a first filtering device 300, which is generally designed to retain the coarse particles and impurities that may be present in water and possibly to retain chlorine and/or other substances which may be present in water so as to eliminate or at least reduce the bacterial load.

The first filtering device 300 can be configured to perform a mechanical filtration and/or a filtration by adsorption of chemicals, for example by means of activated carbon. In addition or alternatively, the first filtering device 300 can contain resins which can also work by ion exchange, in order to advantageously replace some salts that are contained in the water with other salts. Depending on the type of resin chosen, said resins can operate in many different ways, for example but not exclusively by replacing carbonates with sodium chloride, in order to lower the hardness of water without reducing the fixed residue thereof.

The plant 100 can also comprise a second reverse osmosis filtering device 400, which is suitable to receive the water filtered from the first filtering device 300 and is mainly designed to remove the salts that can be dissolved in the water.

Figure 9:
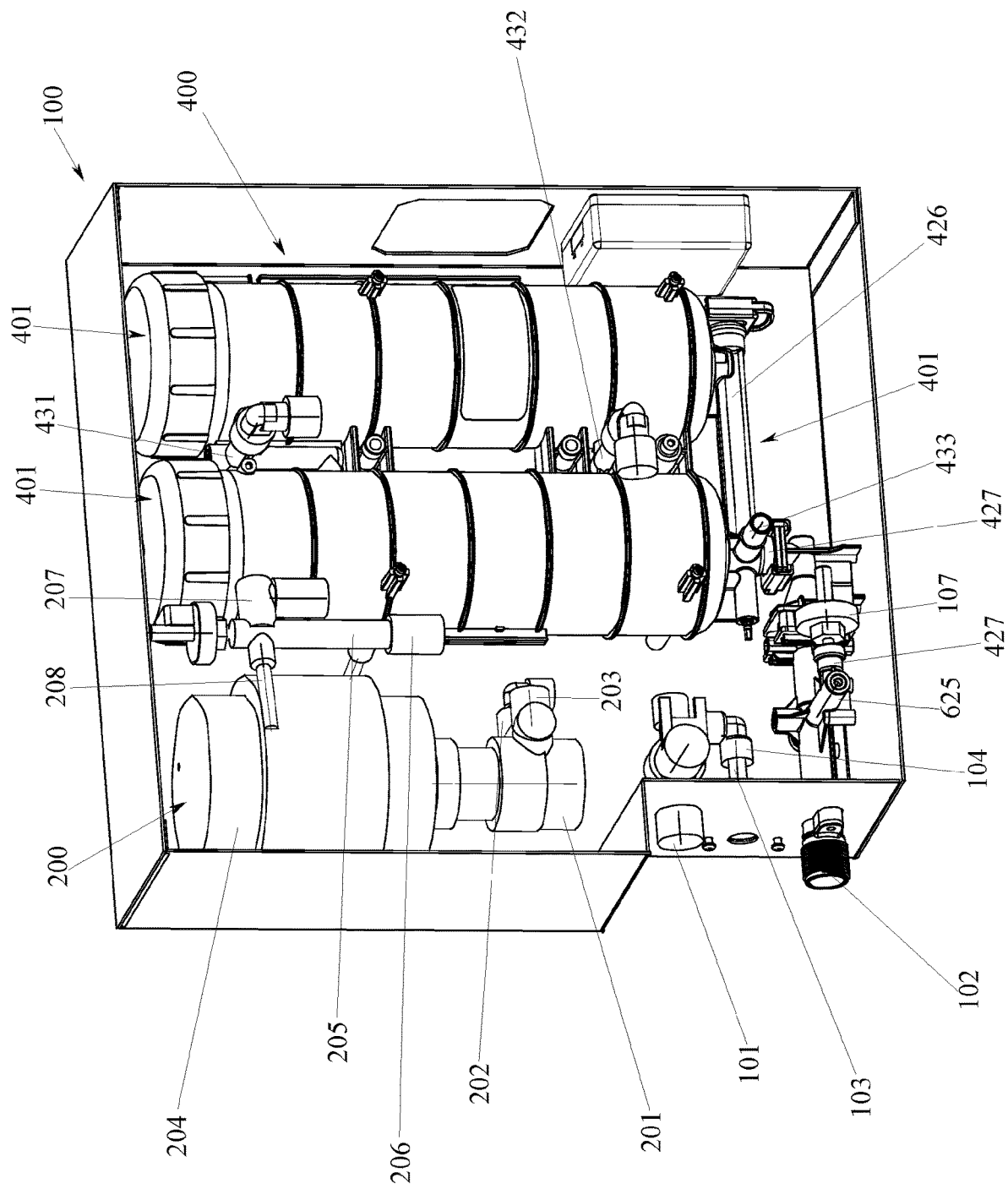
FIG. 9 is a perspective view of a water treatment plant according to an alternative embodiment of the present invention.
Figure 10:
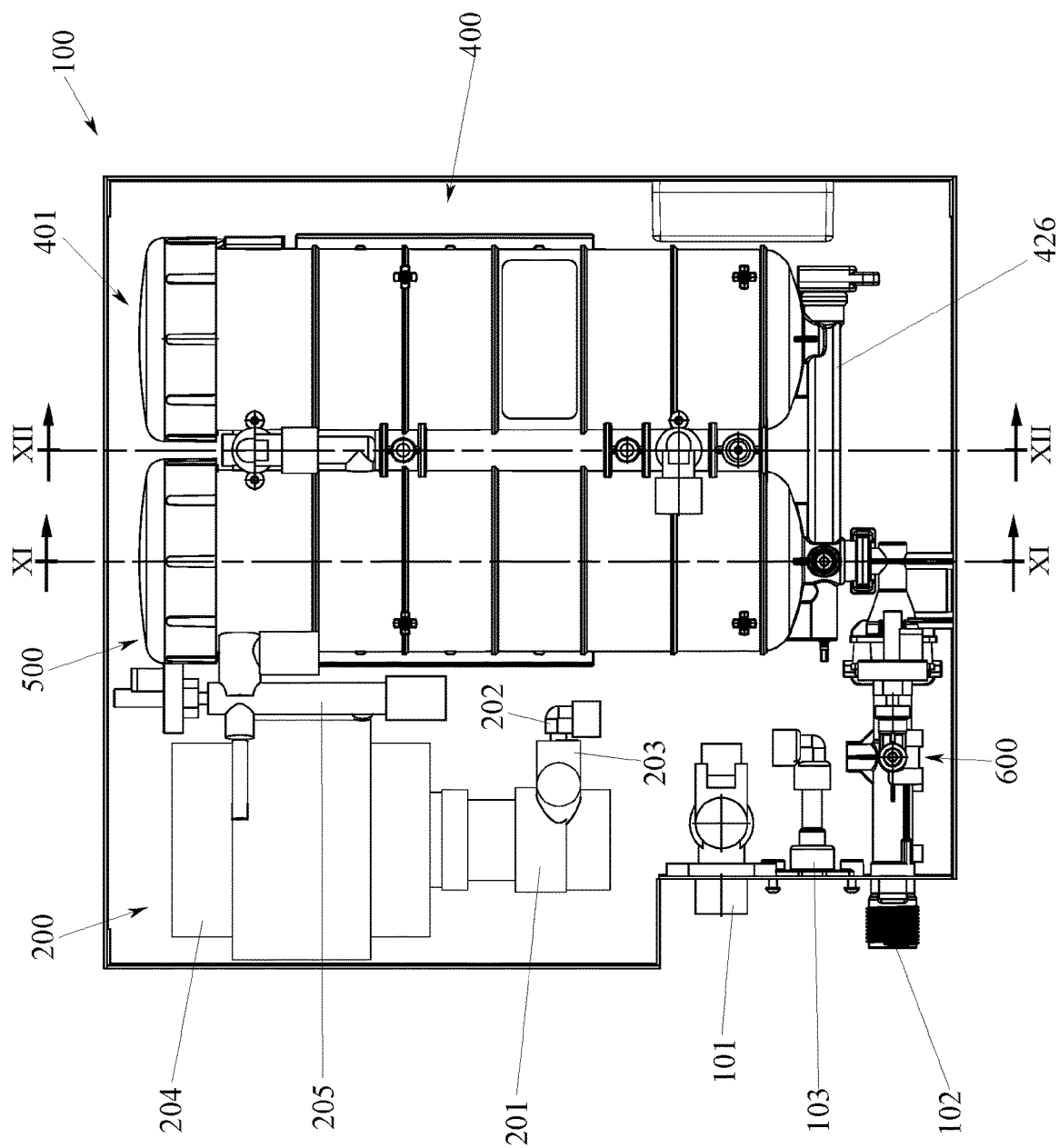
FIG. 10 is a side view of the plant of FIG. 9.

As illustrated in the example of FIG. 9, in some embodiments, the first filtering device 300 may be absent and may possibly be made in the form of a separate device (see FIG. 24) which is positioned for example upstream of the plant 100, i.e. which is suitable to receive the water to be filtered from the water network and which, after filtering it, feeds it to the inlet duct 101 of the plant 100 or to any other utility.

Starting from this general scheme, the various parts of the plant 100 are detailed below starting from the reverse osmosis filtering device 400.

Reverse Osmosis Filtering Device

The reverse osmosis filtering device 400 comprises one or more modular elements 401, substantially identical or in any case similar, which can be advantageously assembled together to vary the operative capacity of the reverse osmosis filtering device 400, for example the hourly flow rate of filterable water, based on the specific needs and requirements of the utilities to which the plant 100 is intended.

Figure 16:
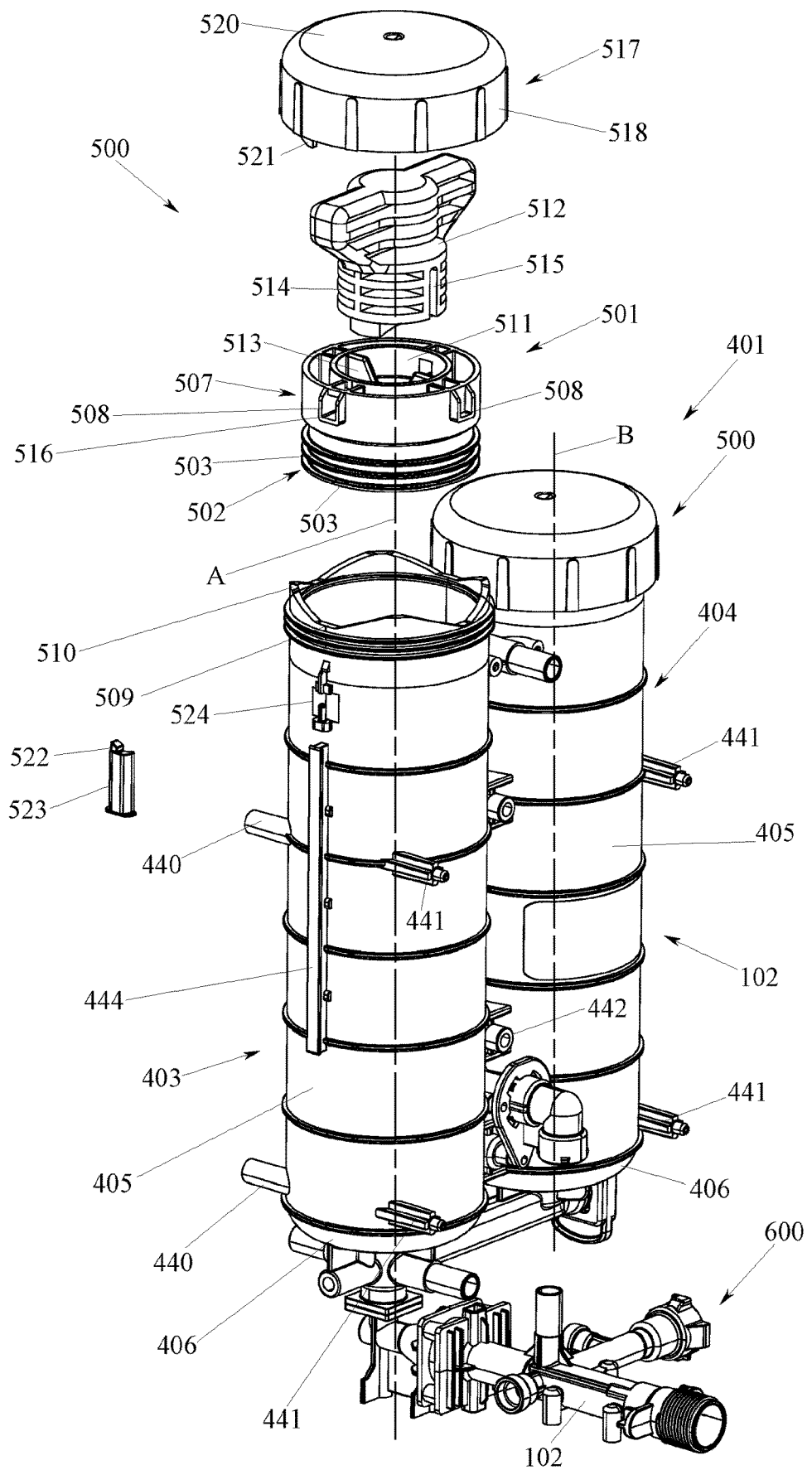
FIG. 16 is a partially exploded perspective view of a modular element used in the osmotic action filtering device of the plants of FIGS. 1 and 9.

As illustrated in FIG. 16, each modular element 401 comprises a monolithic body 402, which can be made of plastic, for example by means of the injection molding technique. In particular, the monolithic body 402 can be directly obtained as a single piece, or it can be obtained in several parts which are then inseparably joined together, for example by welding or gluing, thus forming a single piece.

The monolithic body 402 comprises (defines) a first container 403 and a second container 404, each of which is substantially shaped like a vessel comprising a tubular-shaped lateral wall 405, for example cylindrical, and a bottom plate 406, for example with a rounded shape, which closes a first axial end of the lateral wall 405.

The second and opposite axial end of each of said first and second container 403 and 404 is closed by a respective closing system 500 of the openable type, which will be described in detail below.

Figure 3:
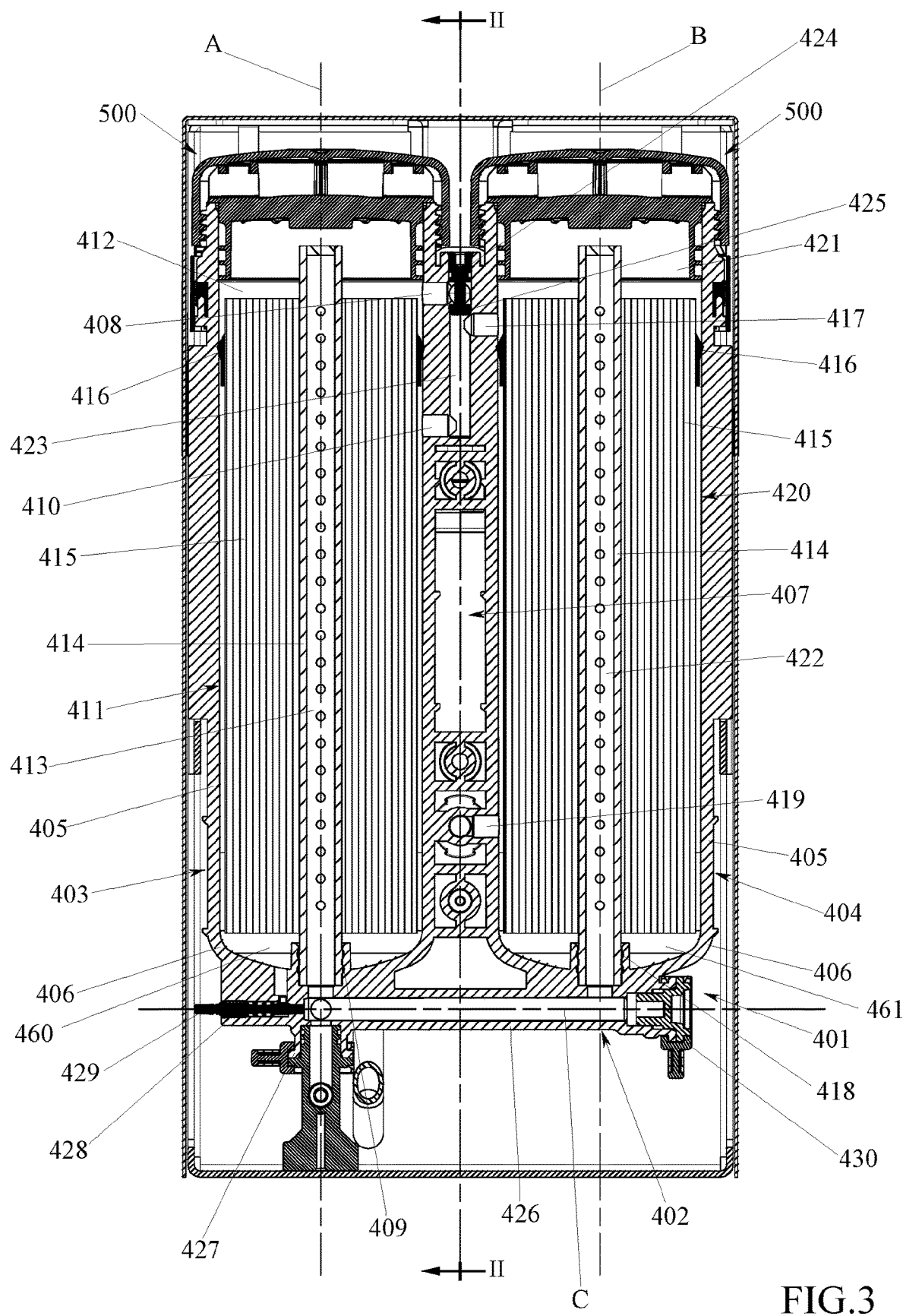
FIG. 3 is the section III-III of FIG. 2, shown on an enlarged scale.

As clearly visible in FIG. 3, the first and the second container 403 and 404 are preferably arranged so that the respective lateral walls 405 are arranged adjacent to each other and have respective mutually parallel central axes A and B.

Preferably, the lateral walls 405 of the first and of the second container 403 and 404 are not in mutual contact but are separated by a small interspace 407.

Furthermore, the lateral walls 405 of the first and of the second container 403 and 404 preferably have the same length, i.e. the same longitudinal extension, and bring the respective bottom plates 406 substantially to the same axial level with respect to the central axes A and B.

In particular, the first and the second container 403 and 404 are intended to be installed in such a way that the central axes A and B of the corresponding lateral walls 405 are oriented vertically and that the bottom plates 406 are positioned at the bottom, each of them for closing the lower axial end of the corresponding lateral wall 405.

Remaining on FIG. 3, the first container 403 comprises an inlet 408 for the water to be filtered, a first outlet 409 for the filtered water and a second outlet 410 for the reject water. Preferably, the inlet 408 and the second outlet 410 are obtained in the lateral wall 405 of the first container 403, for example both in the part facing towards the lateral wall 405 of the second container 404.

In particular, the inlet 408 and the second outlet 410 can have mutually parallel axes, perpendicular to the central axes A and B of the lateral walls 405 of the first and of the second container 403 and 404, and both lying in the same plane on which said central axes A and B lie.

The distance between the inlet 408 and the bottom plate 406 of the first container 403 is generally greater than the distance between said bottom plate 406 and the second outlet 410.

However, both the inlet 408 and the second outlet 410 can be closer to the axial end of the lateral wall 405 in which the corresponding closing system 500 is placed than to the axial end in which the corresponding bottom plate 406 is placed.

The first outlet 409 can be obtained in the bottom plate 406 of the first container 403, for example with axis coinciding with the central axis A of the lateral wall 405 of the first container 403 itself.

Inside the first container 403 an osmotic membrane filtering cartridge 411 can be accommodated, which is generally suitable to partition the internal volume of the first container 403 into three separate chambers, of which a first chamber 412 placed in communication with the inlet 408, a second chamber 413 placed in communication with the first outlet 409, and a third chamber 460 placed in communication with the second outlet 410.

The osmotic membrane filtering cartridge 411 is known per se and generally comprises a central support tube 414, which is internally hollow and has a perforated lateral wall. The osmotic membrane filtering cartridge 411 further comprises one or more pockets, which are spirally wound around the central support tube 414 forming a sort of cylindrical coil 415.

Each of said pockets is substantially formed by two sheets of osmotic membrane, which are at least slightly spaced apart from each other, defining a thin interspace.

In order to create the interspace between the pockets and inside them, a sort of mesh is used, called spacer or tricot.

The pockets are associated with the central support tube 414 so that the aforesaid interspaces are placed in communication with the holes obtained in the lateral wall of the central support tube 414, isolating them from the surrounding environment.

The osmotic membrane filtering cartridge 411 can further comprise an annular gasket 416, which can be coaxially associated externally to the cylindrical coil 415.

The osmotic membrane filtering cartridge 411 is coaxially inserted inside the first container 403, so that a terminal segment of the central support tube 414 is inserted, by interposition of suitable sealing gaskets, into the first outlet 409.

In this way, the internal volume of the central support tube 414 practically defines the second chamber 413.

The annular gasket 416, on the other hand, is suitable for sealing between the outer surface of the cylindrical coil 415 and the inner surface of the lateral wall 405 of the first container 403, preferably in a segment axially comprised between the inlet 408 and the second outlet 410, partitioning the first chamber 412 from the third chamber 460.

In this way, the water coming from the inlet 408 can flow freely outside the pockets of the osmotic membrane filtering cartridge 411 until it reaches the second outlet 410.

However, by virtue of the fact that in the first container 403 there is a pressure level higher than the osmotic pressure, part of the water in transit is able to cross the osmotic membrane sheets and reach the interspace defined between them, and then flow through the internal cavity of the central support tube 414 towards the first outlet 409.

Thanks to the reverse osmosis phenomenon, starting from a water at the inlet having a certain concentration of salts, the filtered water that outflows from the first outlet 409 will have a significantly lower concentration of salts than the reject water that reaches the second outlet 410.

The second container 404 in turn comprises an inlet 417 for the water to be filtered, a first outlet 418 for the filtered water and a second outlet 419 for the reject water.

Preferably, the inlet 417 and the second outlet 419 are obtained in the lateral wall 405 of the second container 404, for example both in the part facing towards the lateral wall 405 of the first container 403.

In particular, the inlet 417 and the second outlet 419 can have mutually parallel axes, perpendicular to the central axes A and B of the lateral walls 405 of the first and of the second container 403 and 404, and both lying in the same plane on which said central axes A and B lie.

The distance between the inlet 417 and the bottom plate 406 of the second container 404 is generally greater than the distance between said bottom plate 406 and the second outlet 419.

However, while the second outlet 419 may be closer to the corresponding bottom plate 406 than to the corresponding closing system 500, the inlet 417 may be closer to the corresponding closing system 500 than to the corresponding bottom plate 406.

For example, with respect to the direction defined by the central axes A and B of the lateral walls 405 of the first and of the second container 403 and 404, the inlet 417 of the second container 404 can be positioned between the inlet 408 and the second outlet 410 of the first container 403, while the second outlet 419 of the second container 404 can be positioned between the second outlet 410 of the first container 403 and the bottom plates 406.

Also in this case, the first outlet 418 can be obtained in the bottom plate 406 of the second container 404, for example with axis coinciding with the axis B of the lateral wall 405 of the second container 404 itself.

Inside the second container 404, a further osmotic membrane filtering cartridge 420 can be accommodated, which is generally suitable to partition the internal volume of the second container 404 into three separate chambers, of which a first chamber 421 placed in communication with the inlet 417, a second chamber 422 placed in communication with the first outlet 418, and a third chamber 461 placed in communication with the second outlet 419.

The osmotic membrane filtering cartridge 420 is completely similar to the osmotic membrane filtering cartridge 411 described previously, of which it has the same characteristics.

The osmotic membrane filtering cartridge 420 is therefore coaxially inserted into the second container 404, in such a way that a terminal segment of the central support tube 414 is inserted, by interposition of suitable sealing gaskets, into the first outlet 418.

The annular gasket 416 is suitable for sealing between the outer surface of the cylindrical coil 415 and the inner surface of the lateral wall 405 of the second container 404, preferably in a segment axially comprised between the inlet 417 and the second outlet 419.

In this way, the water coming from the inlet 417 can flow freely externally to the pockets of the osmotic membrane filtering cartridge 420 until it reaches the second outlet 419 but, by virtue of the fact that a pressure level higher than the osmotic pressure reigns in the second container 404, part of this water is able to cross the osmotic membrane sheets and reach the internal cavity of the central support tube 414 and then flow towards the first outlet 418.

Also in this case, the reverse osmosis phenomenon ensures that starting from a water at the inlet having a certain concentration of salts, the filtered water that outflows from the first outlet 418 has a significantly lower concentration of said salts than the reject water reaching the second outlet 419.

According to an important aspect of the modular element 401, the monolithic body 402 also comprises a scavenging duct 423 which connects the second outlet 410 of the first container 403 with the inlet 417 of the second container 404, so that the reject water exiting from the first container 403 becomes the water to be filtered in the second container 404.

In other words, this solution entails that the first and the second container 403 and 404 are hydraulically connected between them in series, allowing the water coming from the inlet 408 of the first container 403 to be filtered in cascade by two osmotic membrane filtering cartridges 411 and 420, thus producing two flows of filtered water through the first outlets 409 and 418 of the first and of the second container 403 and 404 and a single flow of reject water through the second outlet 419 of the second container 404.

It is wished to observe here that, in order to ensure that a pressure higher than the osmotic pressure reigns inside the first container 403 and the second container 404, the plant 100 generally comprises a flow restrictor, which is connected downstream of the second outlet 419 of the second container 404, as will be described later.

Returning to the scavenging duct 423, this duct can be obtained in a portion of the monolithic body 402 which extends into the interspace 407 between the first and the second container 403 and 404, connecting the respective lateral walls 405.

The scavenging duct 423 can be defined by a hole extending in a direction parallel to the central axes A and B of the lateral walls 405 and which can lead outwards at the closing systems 500, where it can be occluded by a suitable plug 424.

This hole can also be placed in communication with the inlet 408 of the first container 403, which is however hydraulically separated from the scavenging duct 423 by a shutter insert 425 which is inserted into the hole, at a level comprised between the inlet 408 of the first container 403 and the inlet 417 of the second container 404.

The monolithic body 402 of each modular element 401 can further comprise (define) a collection manifold 426, which is placed in communication with both the first outlets 409 and 418 of the first and of the second container 403 and 404, so as to collect the filtered water.

The collection manifold 426 can be directly joined to the bottom plates 406, for example on the opposite side with respect to the lateral walls 405 of the first and of the second container 403 and 404.

The collection manifold 426 can be shaped as a duct, for example a straight duct, the central axis C of which is oriented perpendicularly to the central axes A and B of the lateral walls 405 of the first and of the second container 403 and 404, however lying preferably in the same plane on which said central axes A and B lie.

The collection manifold 426 is provided with an outlet mouth 427, through which the filtered water can be conveyed towards the first outlet duct 102 of the plant 100.

This outlet mouth 427 can have axis straight, for example coinciding with the central axis A of the lateral wall 405 of the first container 403, facing on the opposite side with respect to the corresponding bottom plate 406.

The collection manifold 426 can also be placed in direct communication with the first chamber 412 of the first container 403, for example through a bypass opening 428 which can be obtained in the bottom plate 406 of the first container 403 and which can lead out at a first axial end of the collection manifold 426.

In this way, part of the reject water (with a higher concentration of salts) present in the first container 403 can be mixed with the filtered water found in the collection manifold 426, in order to adjust the effective salinity of the water that is supplied to utilities.

This expedient can be particularly useful when water is used in the preparation of beverages, for example to feed automatic coffee machines or the like, in order to ensure a correct flavour of the beverage.

For said mixing to be adjusted, the collection manifold 426 can be equipped with a valve 429, for example a needle and manually operated valve, which is screwed to the end of the collection manifold 426 and which, based on the axial position thereof, is suitable for closing and/or adjusting the opening degree of the bypass opening 428.

The opposite axial end of the collection manifold duct 426 can instead be simply closed by means of a plug 430.

Figure 4:
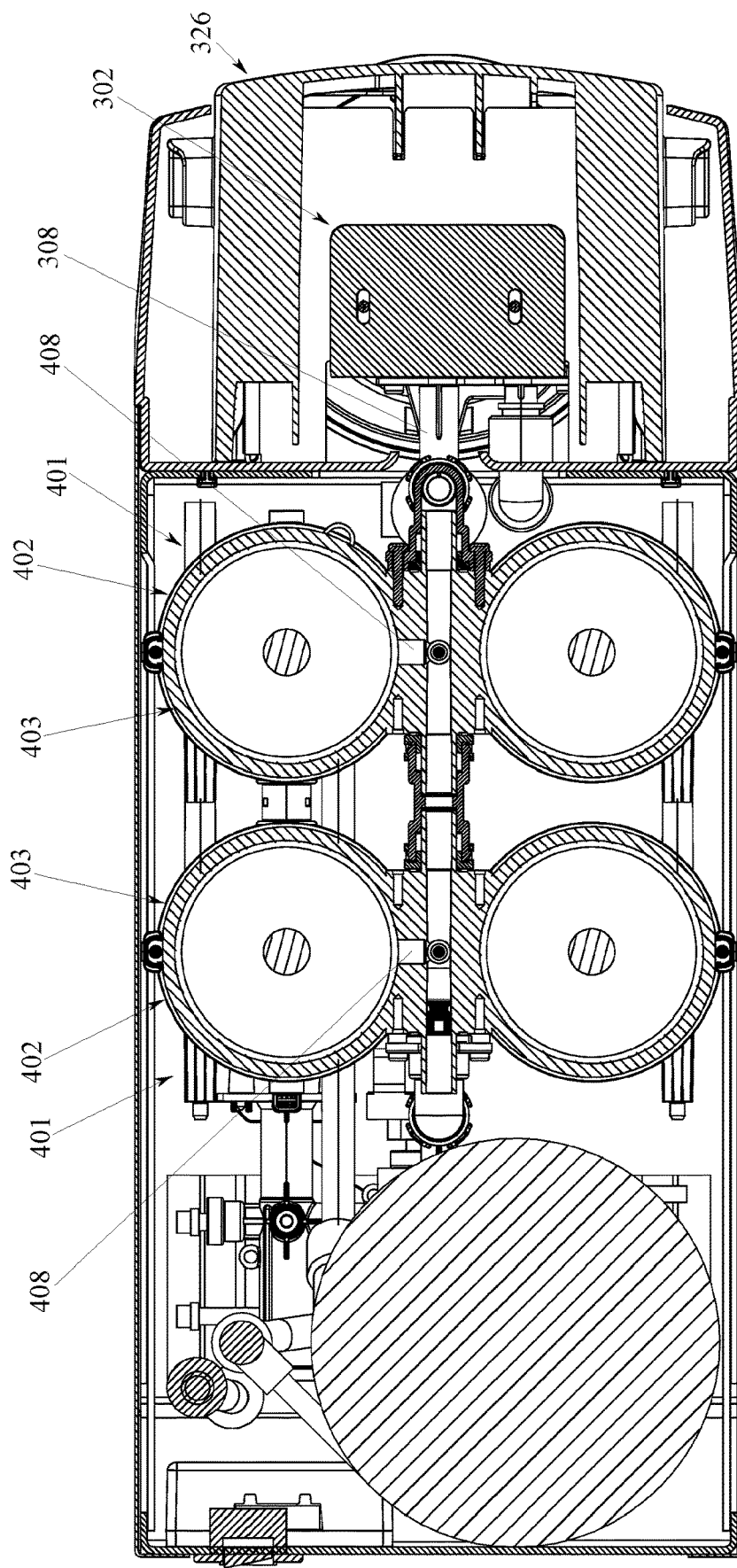
FIG. 4 is the section IV-IV of FIG. 2, shown on an enlarged scale.

Switching now to FIG. 4, it can be observed how the monolithic body 402 of each modular element 401 can comprise a first connection duct 431, which is positioned in the interspace 407 comprised between the first and the second container 403 and 404 and is hydraulically placed in communication with the inlet 408 of the first container 403.

In particular, said first connection duct 431 can have axis straight and orthogonal to the plane of lying which contains the central axes A and B of the first and of the second container 403 and 404.

Furthermore, the first connection duct 431 can extend from both sides of the aforesaid lying plane, so as to have an intermediate segment placed in communication with the inlet 408 of the first container 403 and two opposite axial, open and free projecting ends.

For example, the first connection duct 431 can be obtained in the same portion of the monolithic body 402 in which the scavenging duct 423 is also obtained.

Figure 6:
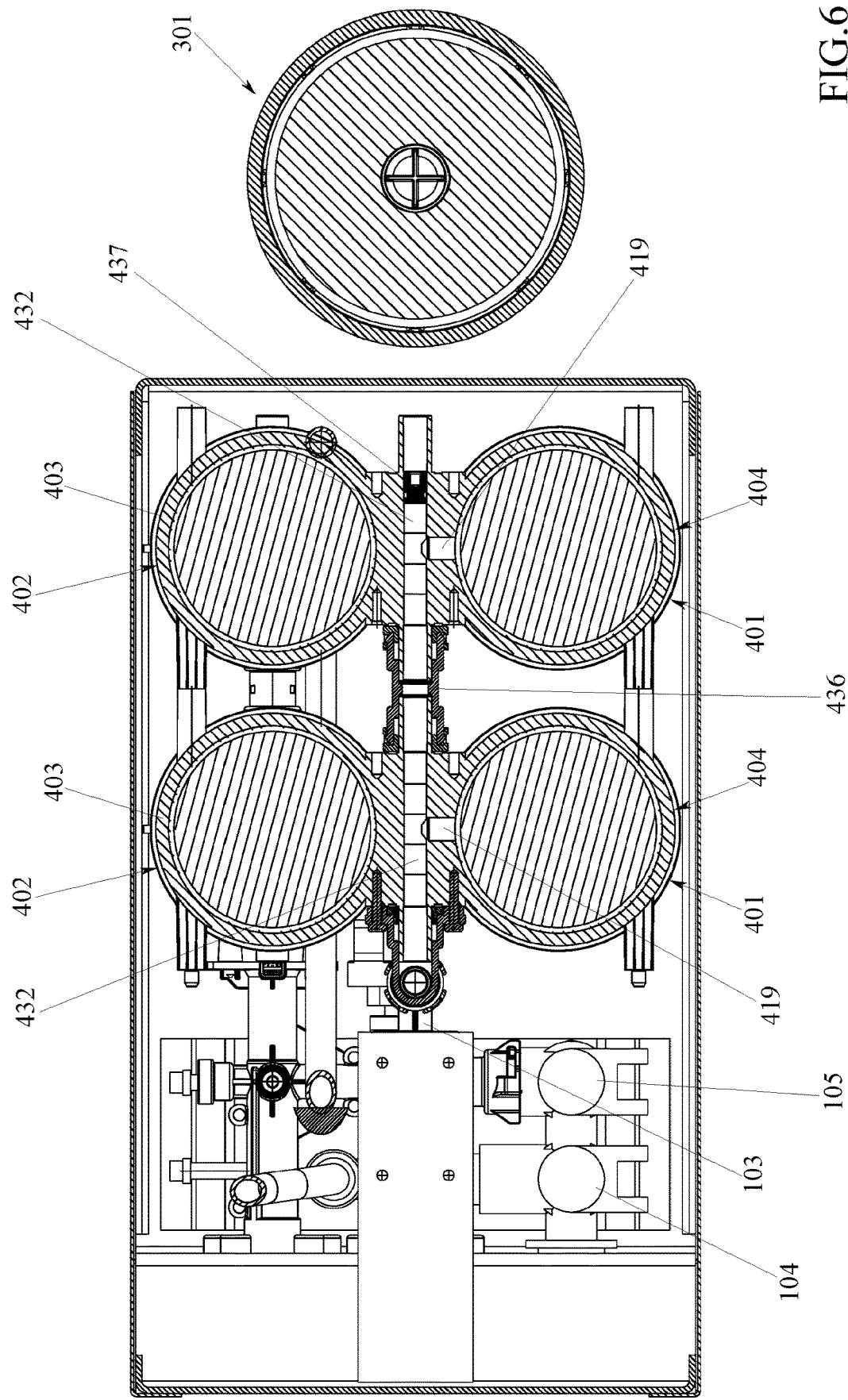
FIG. 6 is the section VI-VI of FIG. 2, shown on an enlarged scale.

In particular, the first connection duct 431 can intersect the hole defining the scavenging duct 423 and be separated from the latter by the already mentioned shutter insert 425. As illustrated in FIG. 6, the monolithic body 402 of each modular element 401 also comprises a second connection duct 432, which is also positioned in the interspace 407 comprised between the first and the second container 403 and 404 but is hydraulically placed in communication with the second outlet 419 of the second container 404.

This second connection duct 432 can also have axis straight and orthogonal to the plane of lying which contains the central axes A and B of the first and of the second container 403 and 404.

Furthermore, the second connection duct 432 can also extend from both sides of the aforesaid lying plane, so as to have an intermediate segment placed in communication with the second outlet 419 of the second container 404 and two opposite axial open and free projecting ends.

Figure 7:
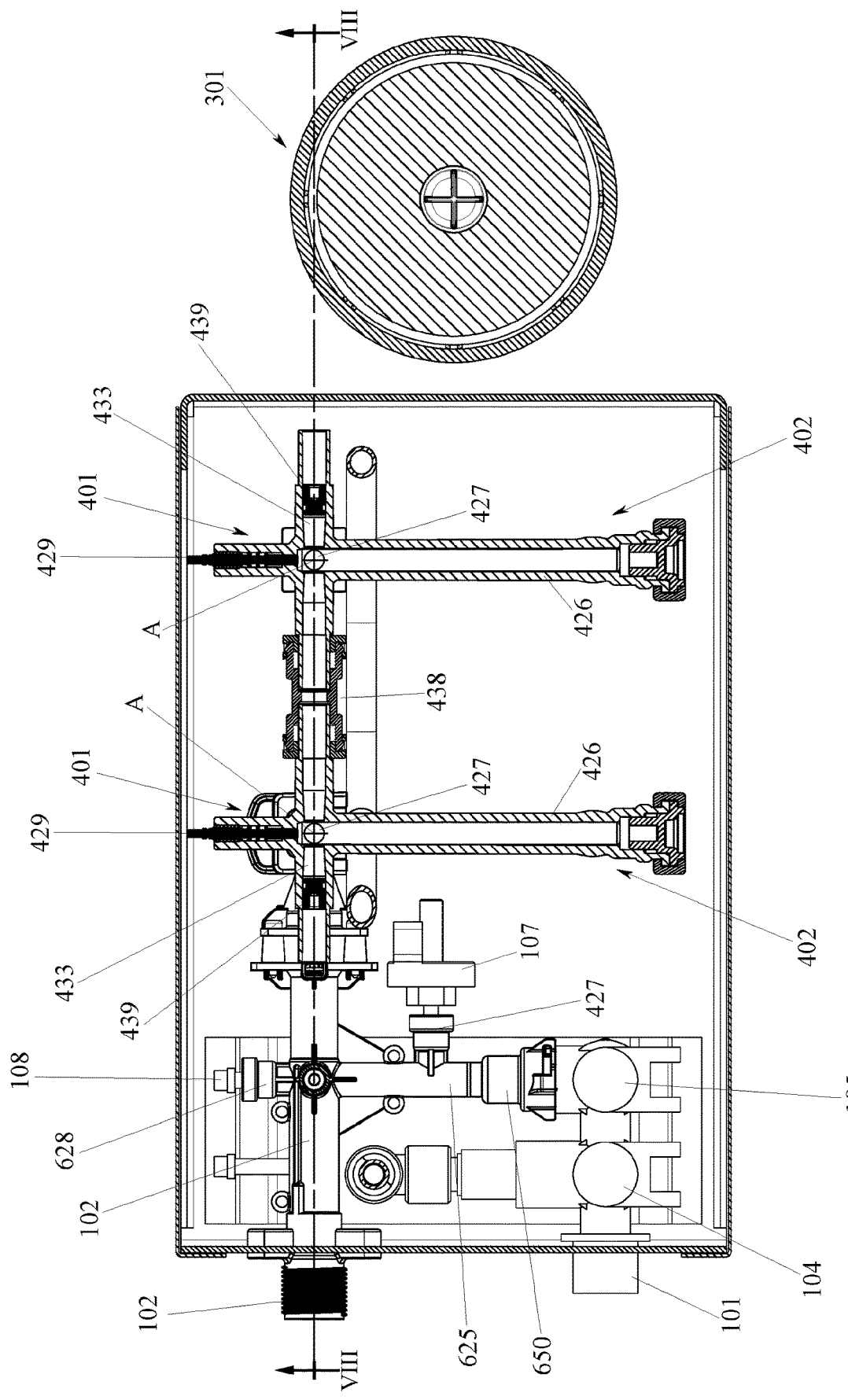
FIG. 7 is the section VII-VII of FIG. 2, shown on an enlarged scale.
Figure 8:
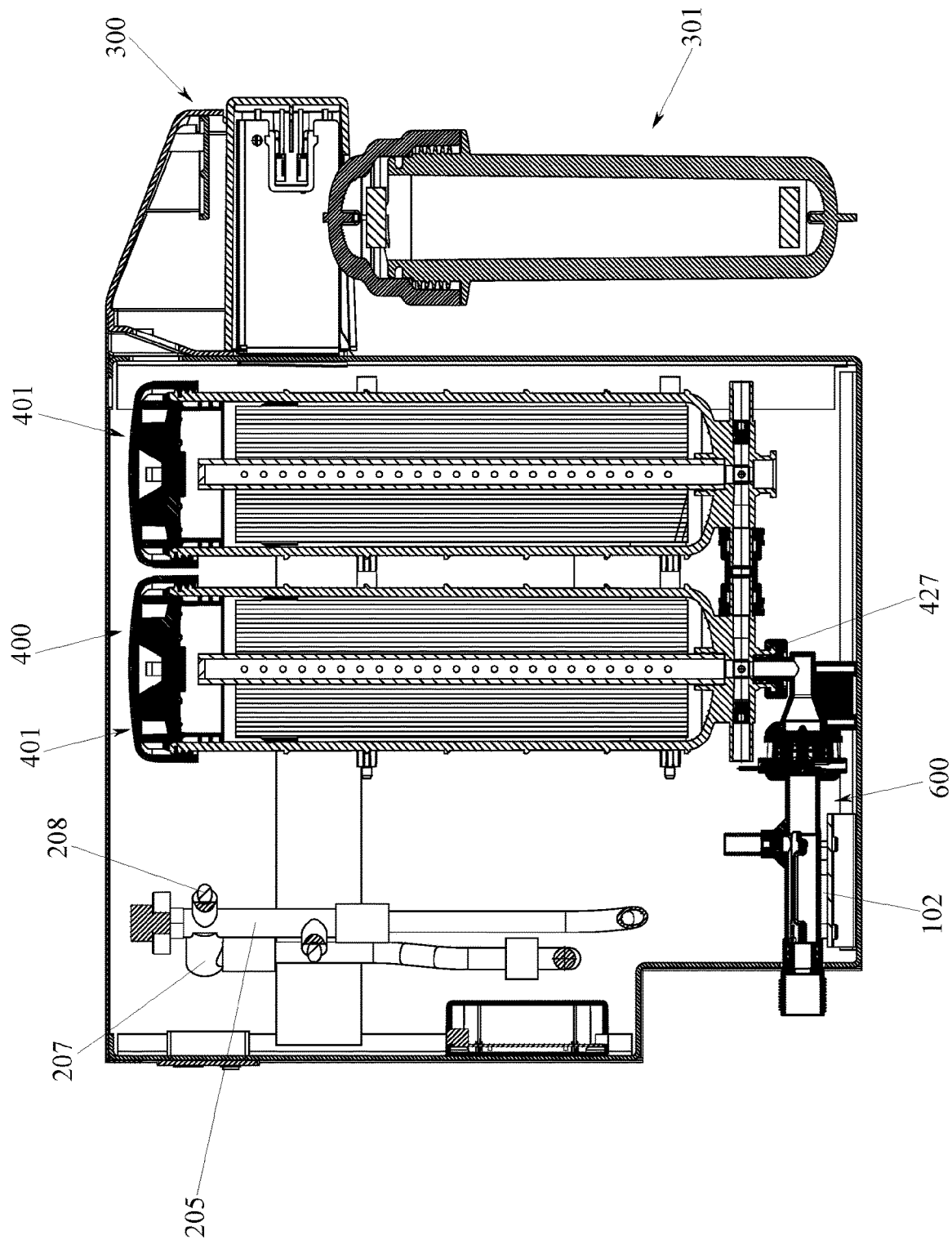
FIG. 8 is section VIII-VIII of Figure/shown on a reduced scale.

For example, the second connection duct 432 can have substantially the same length as the first connection duct 431 and be perfectly aligned with the latter, along the direction defined by the central axes A and B of the first and of the second container 403 and 404. As illustrated in FIG. 7, the monolithic body 402 of each modular element 401 can finally also comprise a third connection duct 433, which substantially intersects and is hydraulically placed in communication with the collection manifold 426.

In particular, said third connection duct 433 can have axis straight and parallel to the axes of the first and of the second connection duct 431 and 432 but can be arranged offset with respect to the latter, for example positioned so as to intersect the central axis A of the lateral wall 405 of the first container 403.

The third connection duct 433 can also extend from both sides of the lying plane which contains the central axes A and B of the first and of the second container 403 and 404, so as to have an intermediate segment placed in communication with (which intersects) the collection manifold 426 and two opposite axial ends projecting from opposite sides of the collection manifold 426, which are open and free.

In the embodiment illustrated in FIGS. 1 to 8, the reverse osmosis filtering device 400 comprises two of the modular elements 401 described above, which are connected between them so as to operate in parallel.

In particular, the two modular elements 401 are arranged so that the first connection duct 431, the second connection duct 432 and the third connection duct 433 of each of them are coaxially aligned respectively with the first connection duct 431, with the second connection duct 432 and with the third connection duct 433 of the other modular element 401. As illustrated in FIG. 4, the first connection ducts 431 of the two modular elements 401 can be hydraulically connected by means of a connecting sleeve 434, preferably rigid and straight, the opposite ends of which can be inserted, preferably by interposition of annular sealing gaskets, on the free ends of the two first connection ducts 431 which are proximal to each other.

With regard to the distal ends of the first two connection ducts 431, one of them can be occluded by a plug 435 while the other one can be connected so as to receive the water to be filtered.

In this way, the two first connection ducts 431 and the relative connecting sleeve 434 substantially define an inlet manifold which distributes the water to be filtered into the inlets 408 of the first containers 403 of both modular elements 401.

Similarly (see FIG. 6), the second connection ducts 432 of the two modular elements 401 can be hydraulically connected by means of a connecting sleeve 436, preferably similar to the previous one, the opposite ends of which can be inserted, preferably by interposition of annular sealing gaskets, on the free ends of the two second connection ducts 432 which are proximal to each other.

The distal end of one of the second connection ducts 432 can be occluded by a plug 437, while the distal end of the other connection duct 432 can be hydraulically connected directly to the discharge duct 103 of the plant 100.

In this way, the two second connection ducts 432 and the relative connecting sleeve 436 substantially define a discharge manifold which collects the reject water coming from the second outlets 419 of the second containers 404 of both the modular elements 401 and conveys it towards the discharge duct 103.

To ensure that a pressure higher than the osmotic pressure reigns inside the first and the second container 403 and 404 of each modular element 401, the discharge duct 103 can contain the already mentioned flow restrictor 109.

Figure 2:
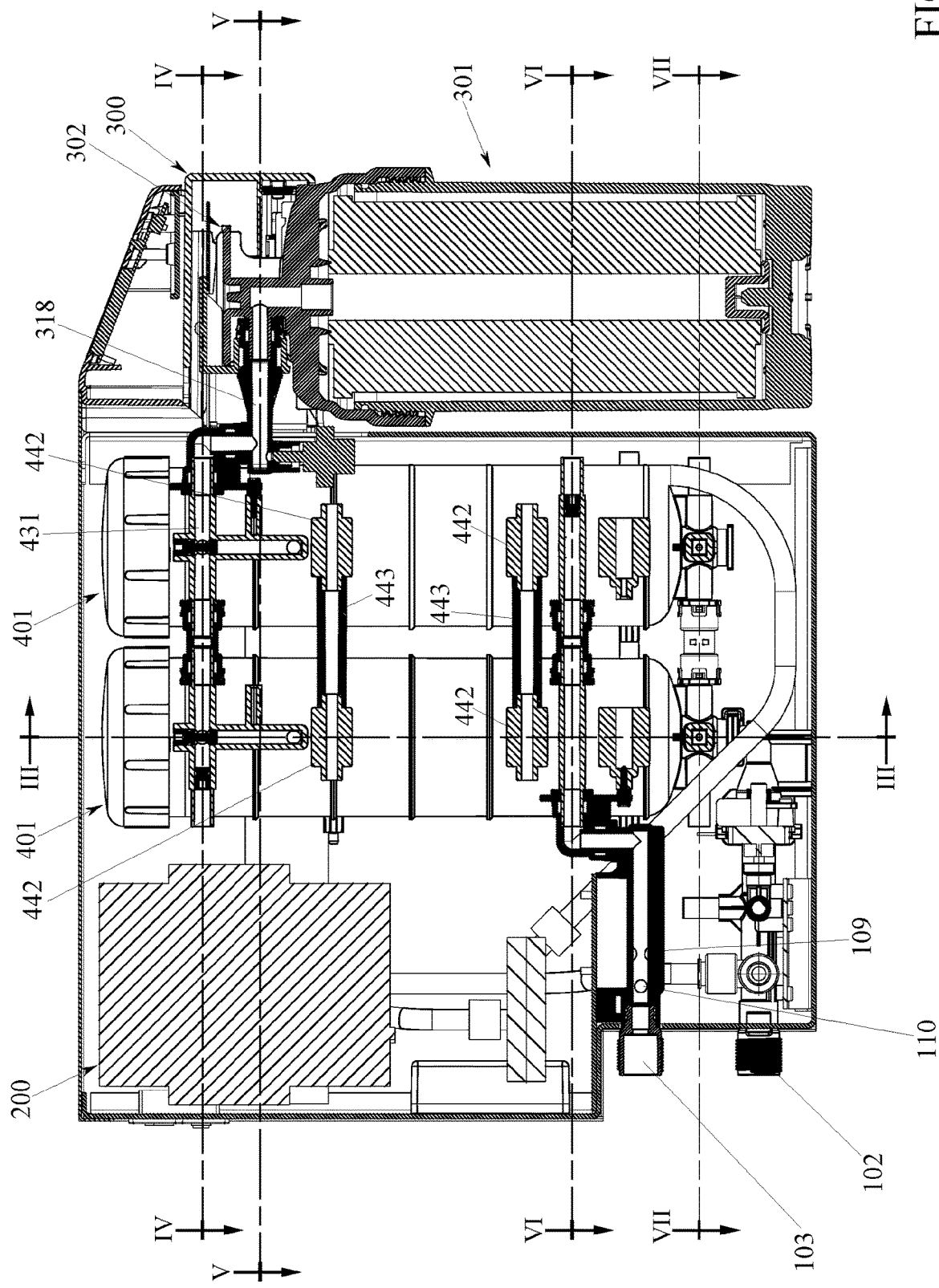
FIG. 2 is a section of the plant of FIG. 1 made according to the plane II-II indicated in FIG. 3.

As illustrated in FIG. 2, the flow restrictor 109 can be configured as a narrowing of the opening section of the discharge duct 103 and can optionally be of an adjustable type, i.e. it can allow a variation in the extent of such narrowing in order to suitably vary the pressure inside the first and the second container 403 and 404 of each modular element 401.

Inside the discharge duct 103 there may also be a non-return valve 110, which can be positioned downstream of the flow restrictor 109 with respect to the direction of exit of the reject water.

Said non-return valve 110 is oriented so as to allow the reject water to outflow towards the exit, while preventing instead the opposite path.

Referring now to FIG. 7, it can be observed that also the third connection ducts 433 of the two modular elements 401 can be hydraulically connected by means of a connecting sleeve 438, preferably similar to the previous ones, the opposite ends of which can be inserted, preferably by interposition of annular sealing gaskets, on the free ends of the two third connection ducts 433 which are proximal to each other.

Both distal ends of the two third connection ducts 433 can be singularly occluded by a plug 439.

In this way, the two third connection ducts 433 and the relative connecting sleeve 438 place the collection manifolds 426 of both modular elements 401 in hydraulic communication, so as to convey all the filtered water towards the outlet duct 102 of the plant 100. In particular, since the outlet duct 102 can be only one, it can be connected to the outlet mouth 427 of only one of the modular elements 401, while the outlet mouth 427 of the other modular element 401 can be occluded with a plug.

It is wished to highlight that, in other embodiments, the connection between the modular elements 401 could take place without connecting sleeves 434 and/or 436 and/or 438, for example by shaping the first connection ducts 431 and/or the second connection ducts 432 and/or the third connection ducts 433 so that they integrate themselves male/female couplings with relative seals, i.e. said male/female couplings are obtained as an integral part of the relative monolithic body 402.

Figure 17:
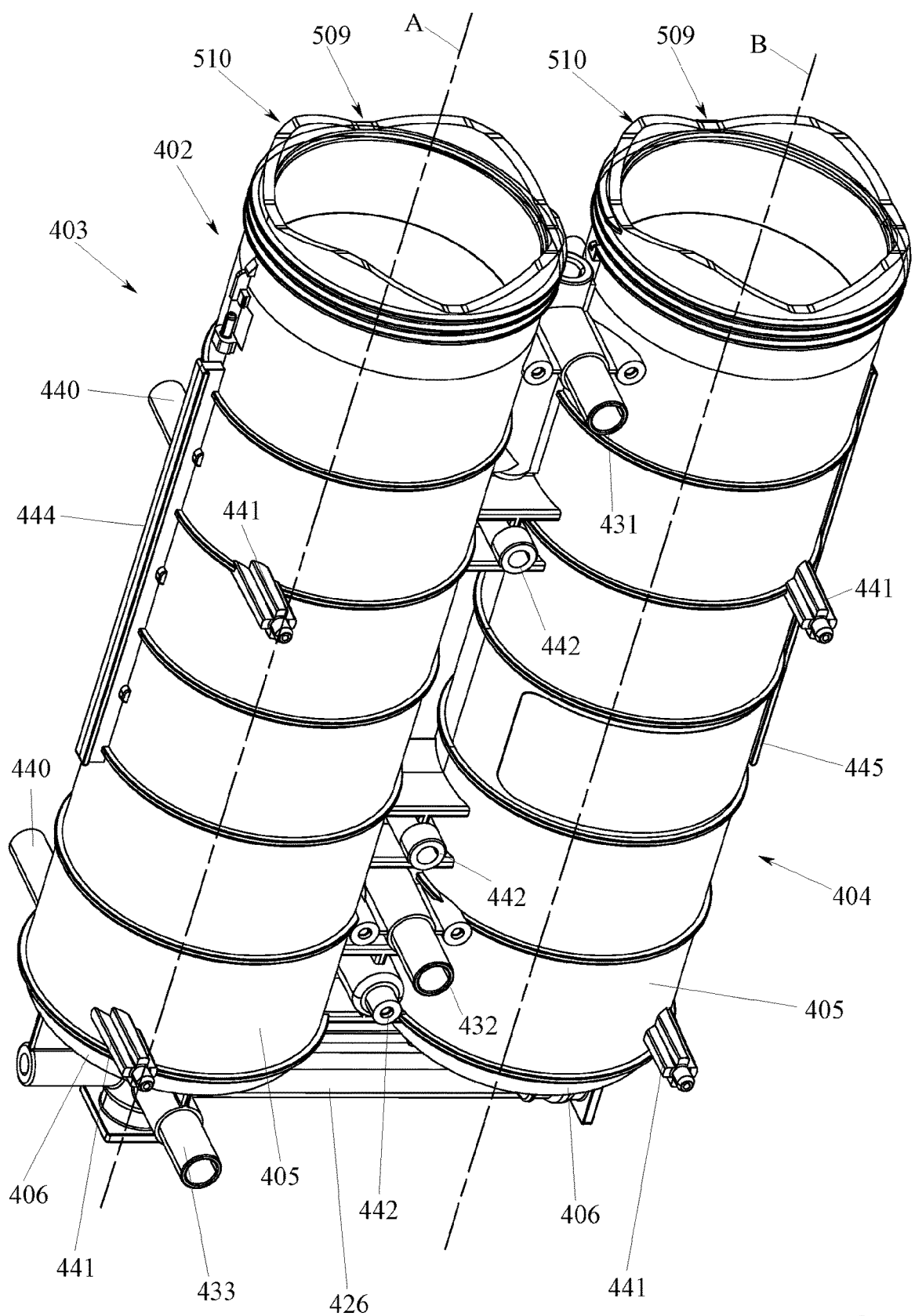
FIG. 17 is a perspective view of a monolithic body that makes up the modular element of FIG. 16.

As illustrated in FIG. 1, in order to facilitate the assembly of the modular elements 401, the monolithic body 402 of each of them can comprise a plurality of positioning tangs 440 (see also FIGS. 16 and 17) deriving from the lateral walls 405 of the first and of the second container 403 and 404 with axes perpendicular to the plane on which the central axes A and B of said lateral walls 405 lie, as well as a plurality of positioning pins 441 also deriving from the lateral walls 405 of the first and of the second container 403 and 404, each of which is coaxial to a corresponding positioning tang 440 but it is obtained on the opposite side with respect to the lying plane of the central axes A and B of the lateral walls 405.

In this way, when the monolithic bodies 402 of two modular elements 401 are assembled together, the positioning pins 441 of one of said monolithic bodies 402 can be singularly aligned and coaxially coupled to the positioning tangs 440 of the other monolithic body 402, ensuring perfect alignment also of the first, of the second and of the third connection ducts 431, 432 and 433.

To stably fix the modular elements 401 between them, each monolithic body 402 can further comprise one or more fixing bushings 442, hollow inside, each of which can be positioned in the interspace 407 comprised between the lateral walls 405 of the first and of the second container 403 and 404, where it can extend with axis orthogonal to the plane on which the central axes A and B of said lateral walls 405 lie.

For example, in the embodiment illustrated in the figures, the monolithic body 402 of the modular elements 401 comprises two fixing bushings 442 positioned between the first connection duct 431 and the second connection duct 432.

When the monolithic bodies 402 of two modular elements 401 are assembled together, each fixing bushing 442 of one of said monolithic bodies 402 is coaxially aligned with a corresponding fixing bushing 442 of the other monolithic body 402, as illustrated in FIG. 2.

A cylindrical spacer 443 can optionally be interposed between a fixing bushing 442 of a modular element 401 and the corresponding fixing bushing 442 of the other modular element 401 and, inside their cavities, a threaded tie rod can be inserted which is fixed with a nut so as to keep the modular elements 401 axially locked.

Alternatively or in addition, the locking of the modular elements 401 can be obtained thanks to a shape coupling between them and a corresponding support structure.

In this regard (see FIG. 17), the monolithic body 402 of each modular element 401 can comprise, for example, two fixing plates lying in the plane on which the central axes A and B of the first and of the second container 403 and 404 lie, of which a first fixing plate 444 deriving in a cantilever fashion from the lateral wall 405 of the first container 403, on the opposite side with respect to the second container 404, and a second fixing plate 445 deriving in a cantilever fashion from the lateral wall 405 of the second container 404, on the opposite side with respect to the first container 403.

Each of said fixing plates 444 and 445 can extend as a profile with a substantially constant section along a direction parallel to the central axes A and B of the first and of the second container 403 and 404.

For example, the section of each of said fixing plates 444 and 445 can substantially have a T shape.

Figure 5:
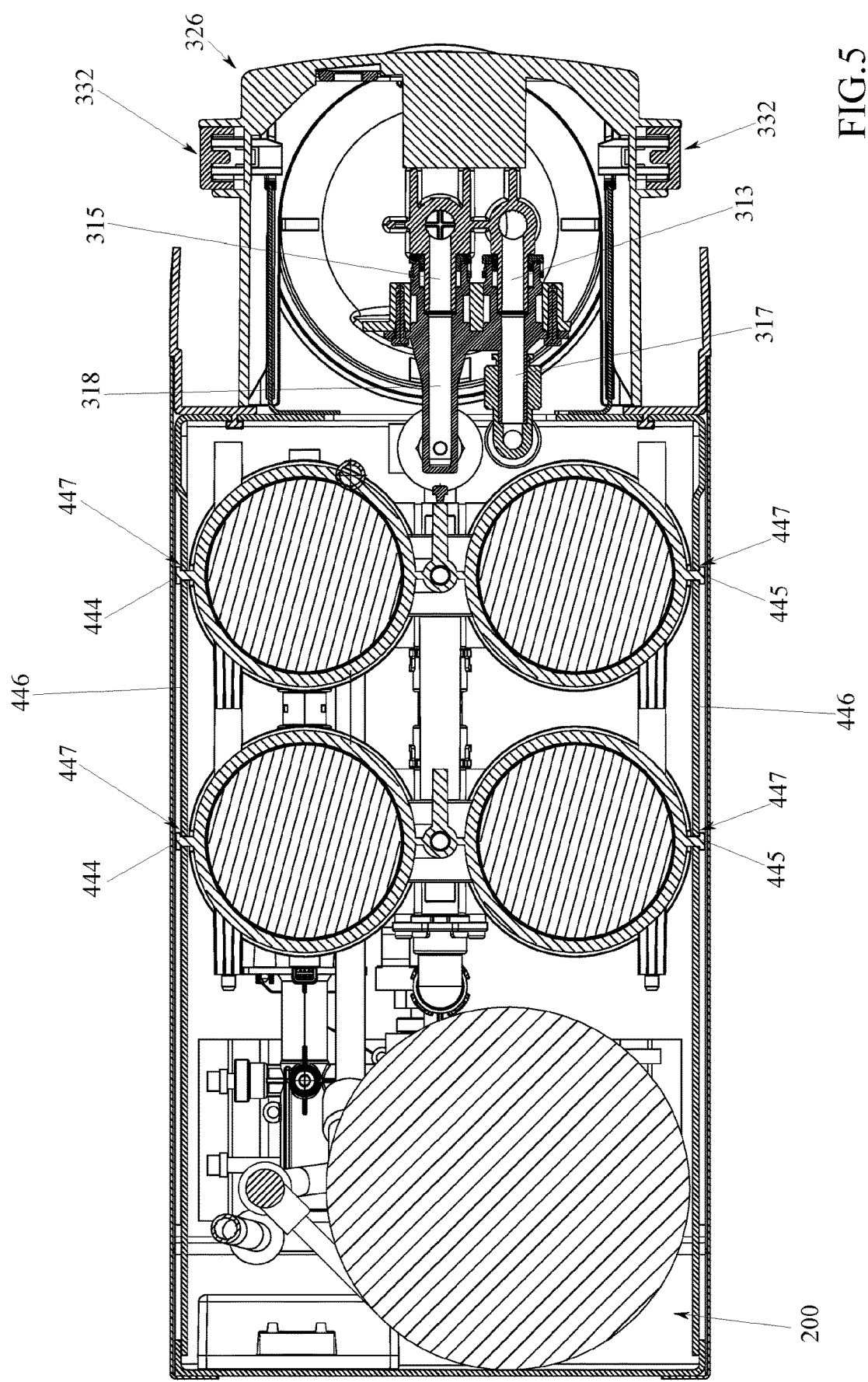
FIG. 5 is the section V-V of FIG. 2 shown on an enlarged scale.

As illustrated in FIG. 5, the support structure can be fixed for example inside a protective case that encloses the plant 100 and can comprise two flat walls 446 mutually parallel and facing each other, which are separated by a distance substantially equal to the distance between the fixing plates 444 and 445 of each modular element 401.

Each of said flat walls 446 can have a plurality of slits 447 which extend parallel to each other, for example extending in a vertical direction.

Each slit 447 of a flat wall 446 can face a corresponding slit 447 of the flat wall 446, opposite with respect to a direction orthogonal to the flat walls 446 themselves.

The distance between two consecutive slits 447 of the same flat wall 446 can be substantially equal to the distance that separates the fixing plates 444 and/or 445 of two modular elements 401 assembled together as previously described.

In this way, after having assembled the two modular elements 401, they can be inserted into the space comprised between the two flat walls 446, by inserting the fixing plates 444 and 445 of each modular element 401 into a pair of mutually opposite slits 447 of the two flat walls 446, which thus lock the modular elements 401 in the assembly position with no the need for screws or bolts.

Figure 35:
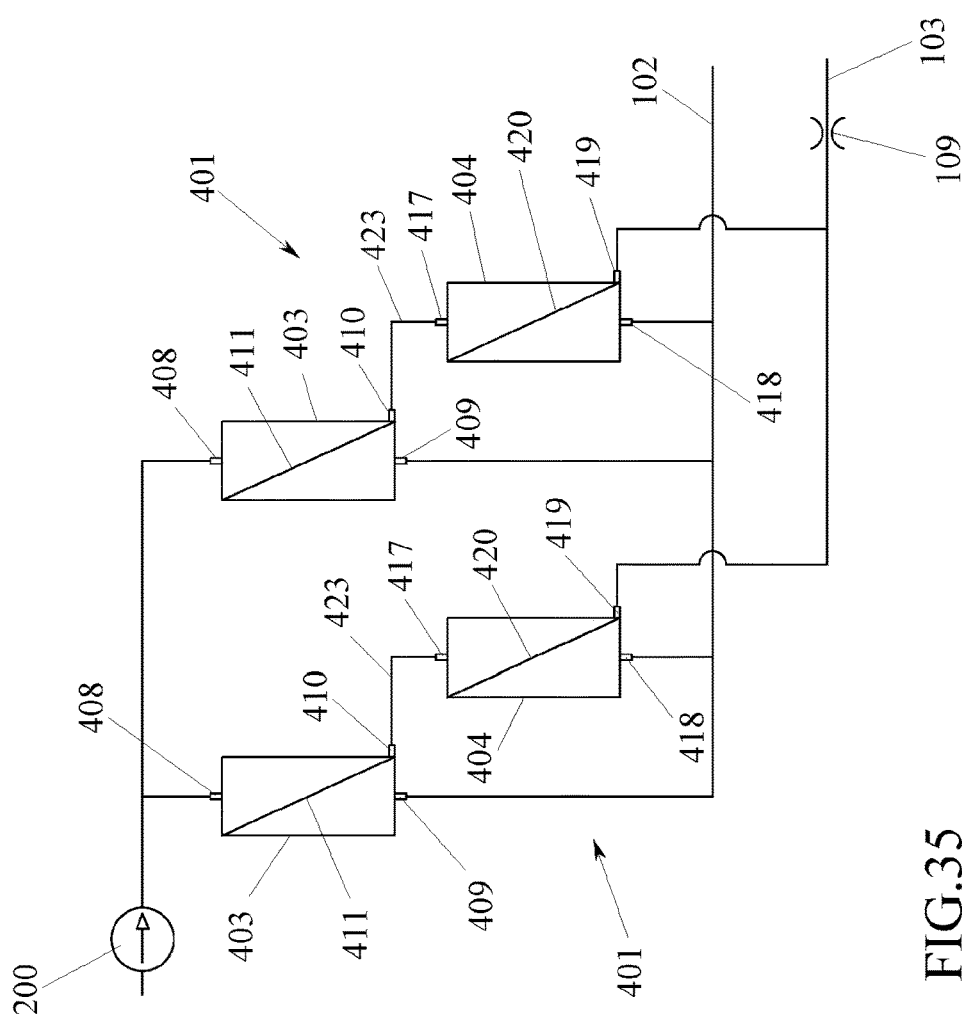
FIG. 35 is a simplified hydraulic diagram of a reverse osmosis filtering device belonging to the plant illustrated in FIGS. 1 to 8.

To better understand the operation of this embodiment, reference can be made to FIG. 35, which shows the simplified hydraulic diagram of the reverse osmosis filtering device illustrated in FIGS. 1 to 8.

The water coming from the pumping group 200 is fed in parallel to the inlets 408 of the first containers 403 of both modular elements 401.

The water crossing the osmotic membrane filtering cartridge 411 contained in each of said first containers 403 flows through the first outlets 409 directly into the collection manifold 426 towards the outlet duct 102.

The reject water exiting from the second outlet 410 of each of the first containers 403 instead flows in the scavenging duct 423 towards the inlet 417 of the corresponding second container 404.

The water crossing the osmotic filtering cartridge 420 contained in each of the second containers 403 also flows through the first outlets 418 in the collection manifold 426 towards the outlet duct 102, while the reject water which finally outflows from the second outlets 419 flows through the flow restrictor 109 towards the discharge duct 103.

In this way, the two modular elements 401 are hydraulically connected in parallel to each other, while the first and the second container 403 and 404 of each modular element are hydraulically connected in series.

Thanks to the connection in series, water can flow faster, making cross-flow filtration more efficient and therefore allowing less concentrate to be discarded.

By exploiting this modularity principle, other embodiments may provide that the reverse osmosis filtering device 400 comprises a greater number of modular elements 401, assembled together in the same fashion illustrated previously.

Other embodiments, such as the one illustrated in FIG. 9, can also provide that the reverse osmosis filtering device 400 comprises a single modular element 401.

Figure 11:
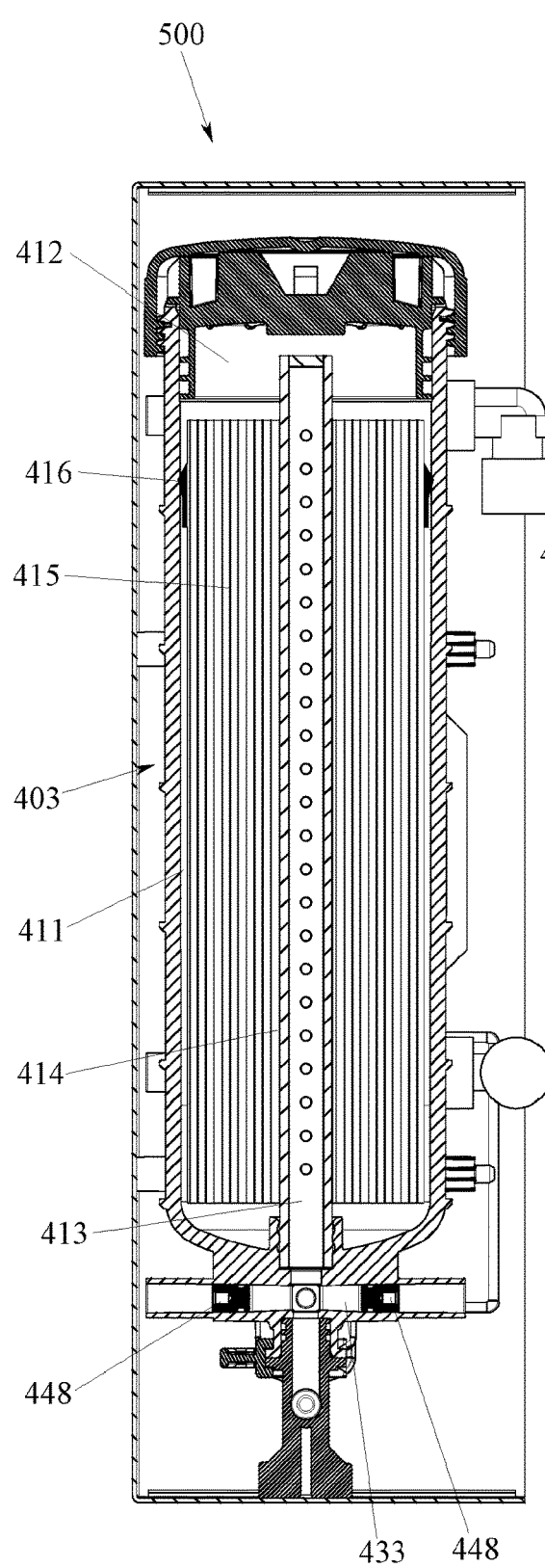
FIG. 11 is the section XI-XI of FIG. 10, shown on an enlarged scale.
Figure 12:
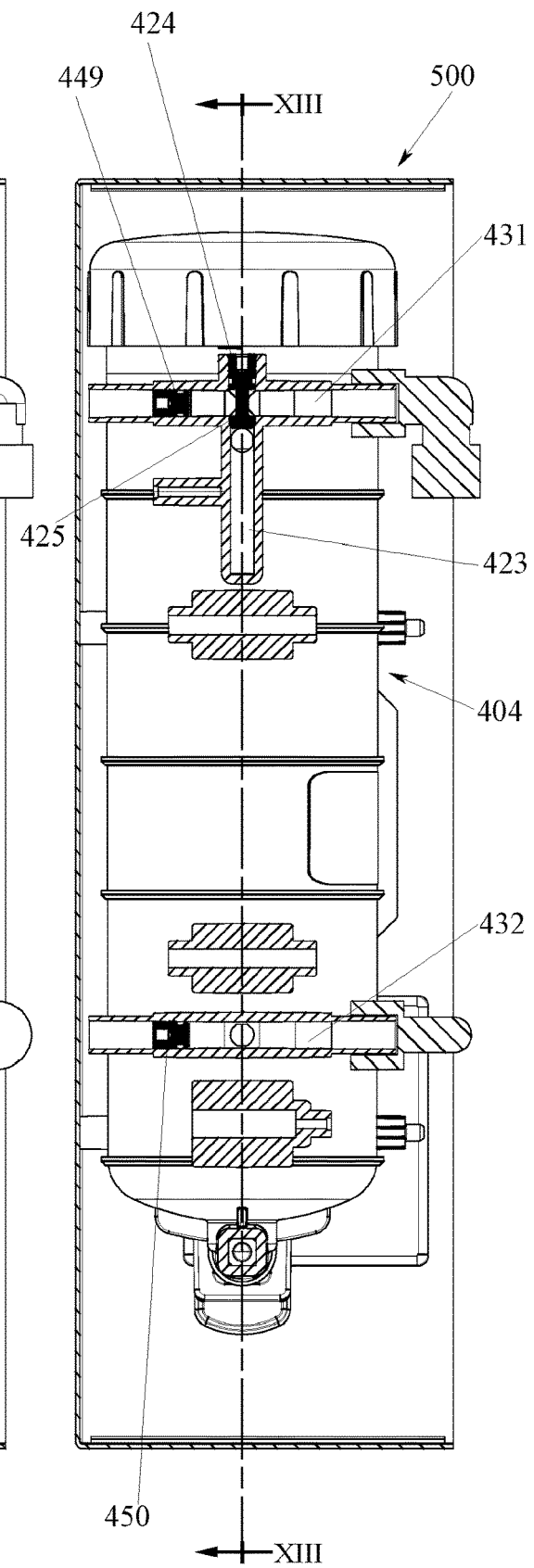
FIG. 12 is the section XII-XII of FIG. 10, shown on an enlarged scale.
Figure 13:
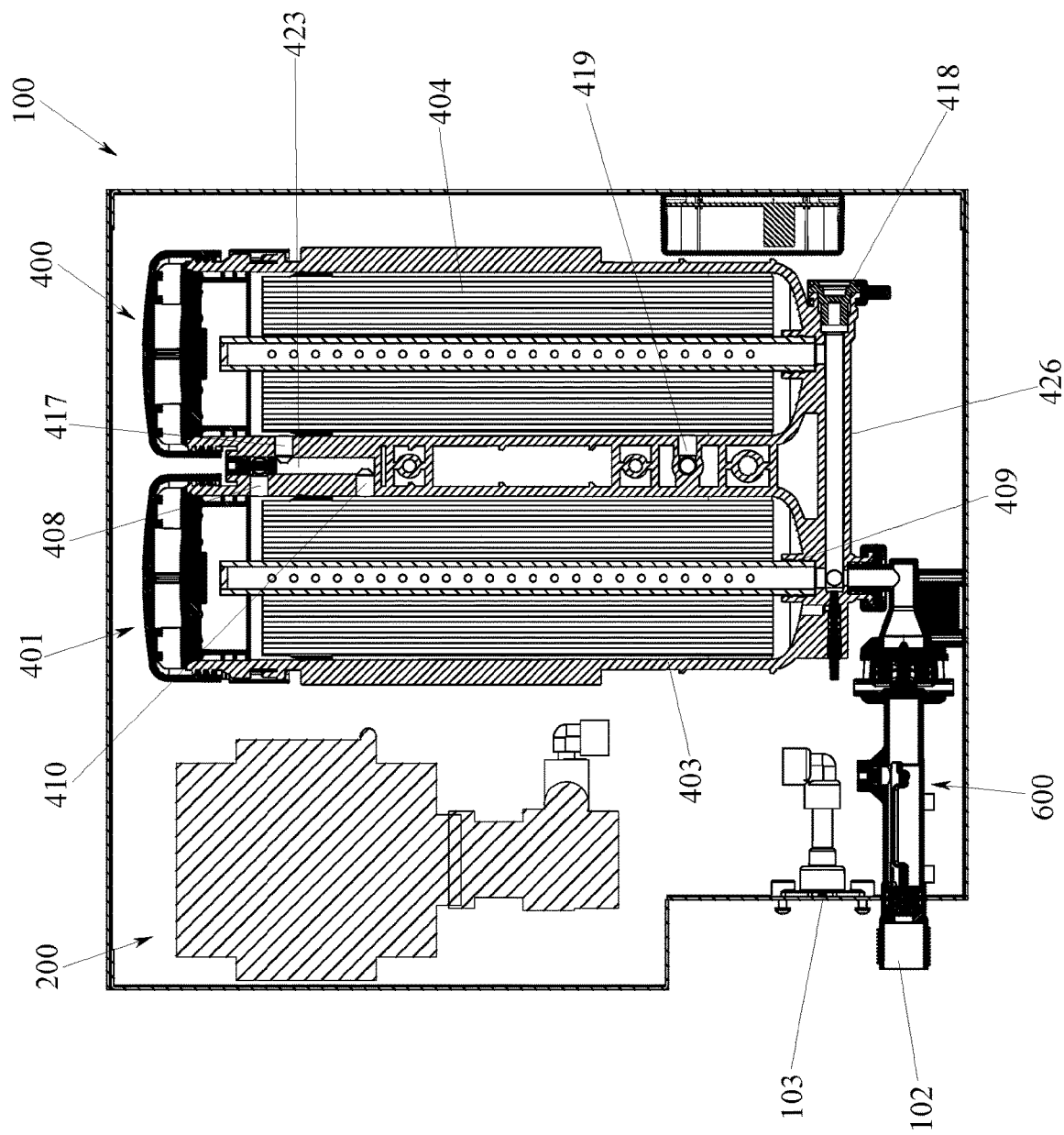
FIG. 13 is the section XIII-XIII of FIG. 12 shown on a reduced scale.
Figure 14:
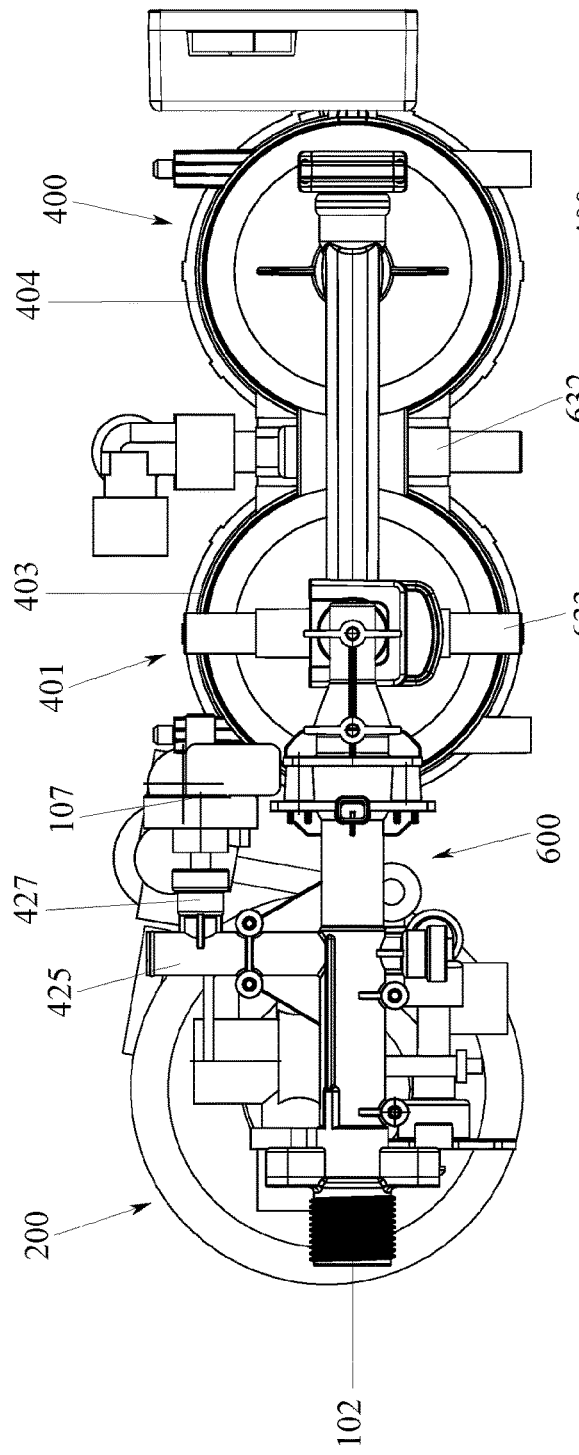
FIG. 14 is a bottom view of the plant of FIG. 9.
Figure 15:
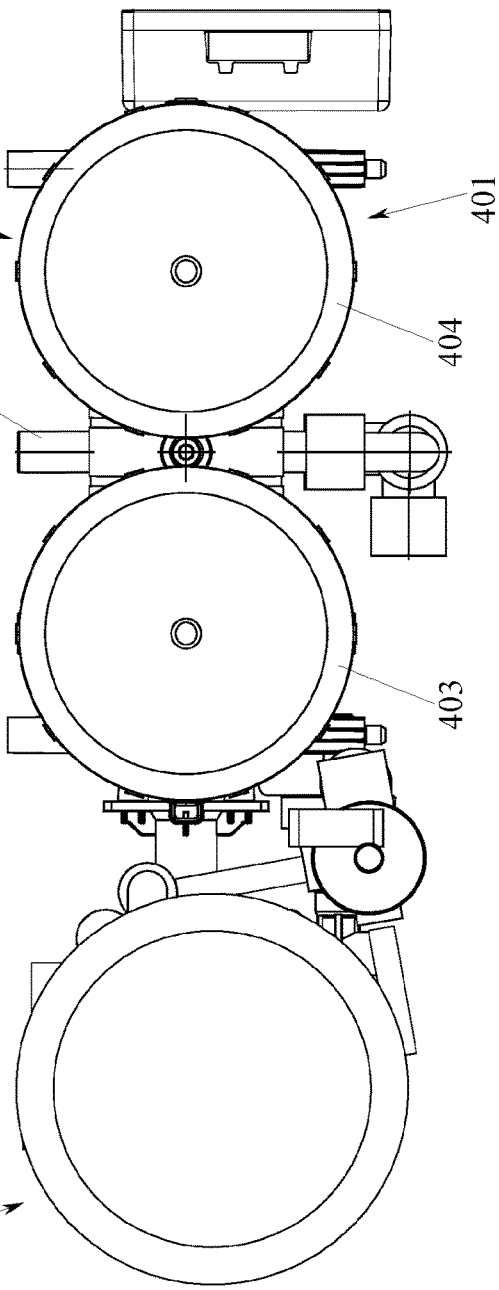
FIG. 15 is a top view of the plant of FIG. 9.

In this case, the modular element 401 is substantially similar to the one described above, the only difference being that the third connection duct 433 has both free ends occluded by a plug 448 (see FIG. 11), that the first connection duct 431 has a free end suitable to be connected for receiving the water to be filtered and an opposite free end occluded by a plug 449 (see FIG. 12), and that the second connection duct 432 has a free end occluded by a plug 450 and an opposite free end connected to the discharge duct 103.

Also in this embodiment, the discharge duct 103 can be provided with the flow restrictor 109 and with the non-return valve 110, as previously described with reference to FIG. 2.

Figure 36:
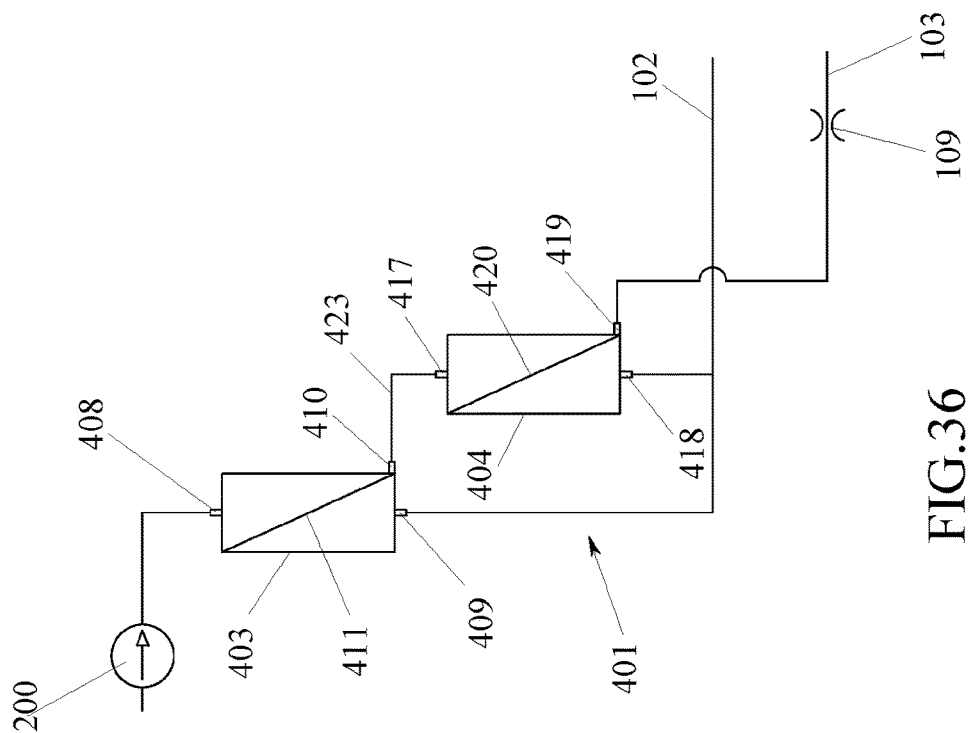
FIG. 36 is a simplified hydraulic diagram of a reverse osmosis filtering device belonging to the plant illustrated in FIGS. 9 to 15.

The simplified hydraulic scheme of this second embodiment is illustrated in FIG. 36, in which it can be appreciated how the water coming from the pumping group 200 is fed to the inlet 408 of the first container 403 of the single modular element 401.

The water crossing the osmotic membrane filtering cartridge 411 contained in the first container 403 flows through the first outlet 409 directly in the collection manifold 426 towards the outlet duct 102, while the reject water exiting the second outlet 410 of the first container 403 flows in the scavenging duct 423 towards the inlet 417 of the second container 404.

At this point, the water crossing the osmotic filtering cartridge 420 contained in the second container 403 also flows through the first outlet 418 in the collection manifold 426 towards the outlet duct 102, while the last reject water that outflows from the second outlet 419 flows through the flow restrictor 109 towards the discharge duct 103.

Also in this case, thanks to the connection in series, the water can flow faster, making the cross-flow filtration more efficient and therefore allowing less concentrate to be discarded. It is wished to point out here that the modular elements 401 used in the embodiments described above can all be identical to each other but could also be slightly different, while remaining conceptually very similar. For example, it is possible to provide versions in which one or more of the connection ducts, instead of being closed by plugs as described above, can have ends which are obtained already closed, for example in the molding step of the monolithic body 402.

Closing System of the Containers

As previously mentioned, both the first and the second container 403 and 404 of each modular element 401 are closed, on the opposite side with respect to the bottom plate 406, by a respective closing system 500.

Said closing system 500, which is the same for both containers 403 and 404, is configured so as to allow selective opening of the container, for example to replace the corresponding osmotic membrane filtering cartridge 411 or 420.

In the following, the closing system 500 will be described with reference to the first container 403 but the same considerations apply mutatis mutandis also to the closing system 500 of the second container 404.

Figure 3A:
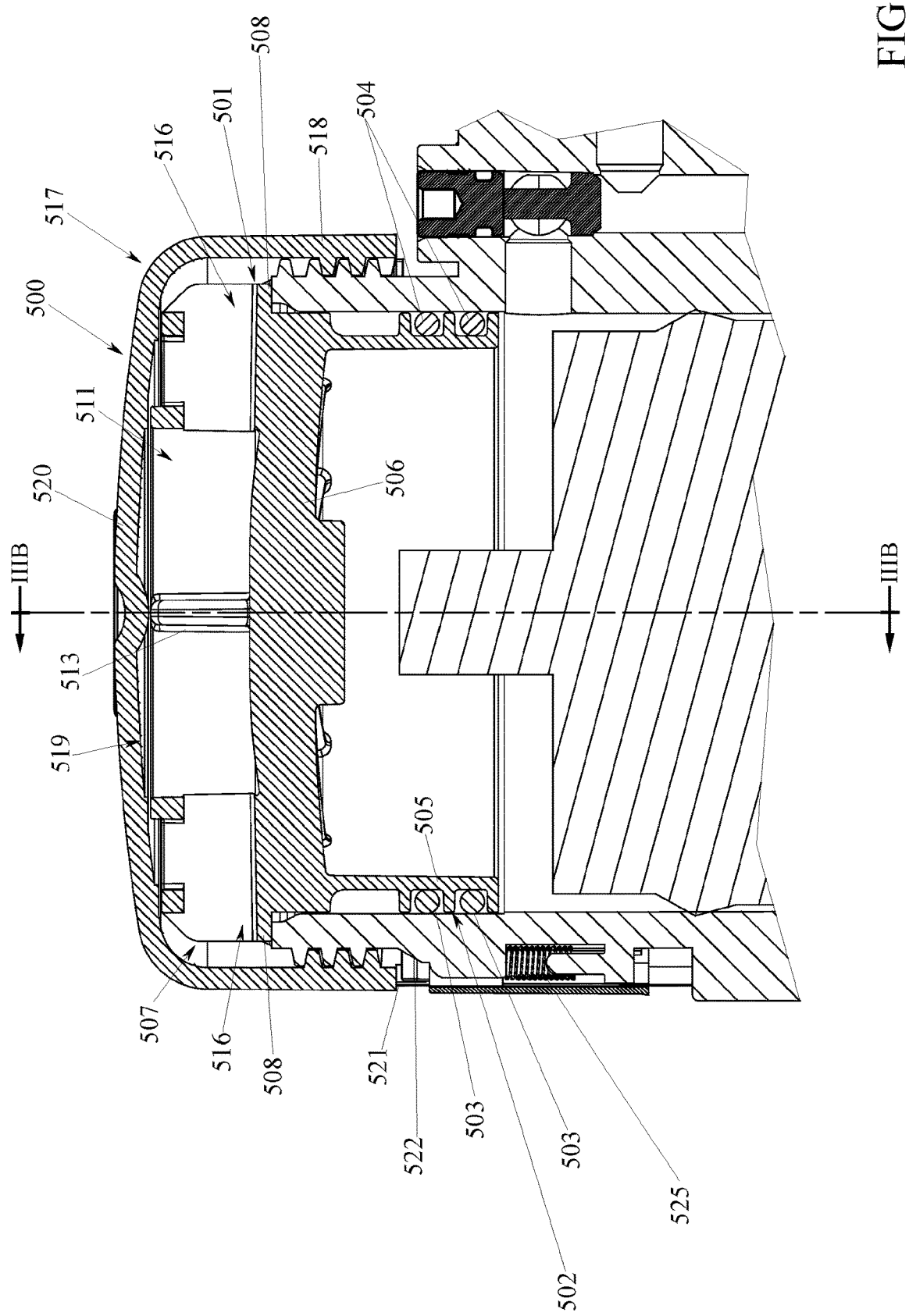
FIG. 3A is an enlarged detail of FIG. 3 showing the closing system of the containers.
Figure 3B:
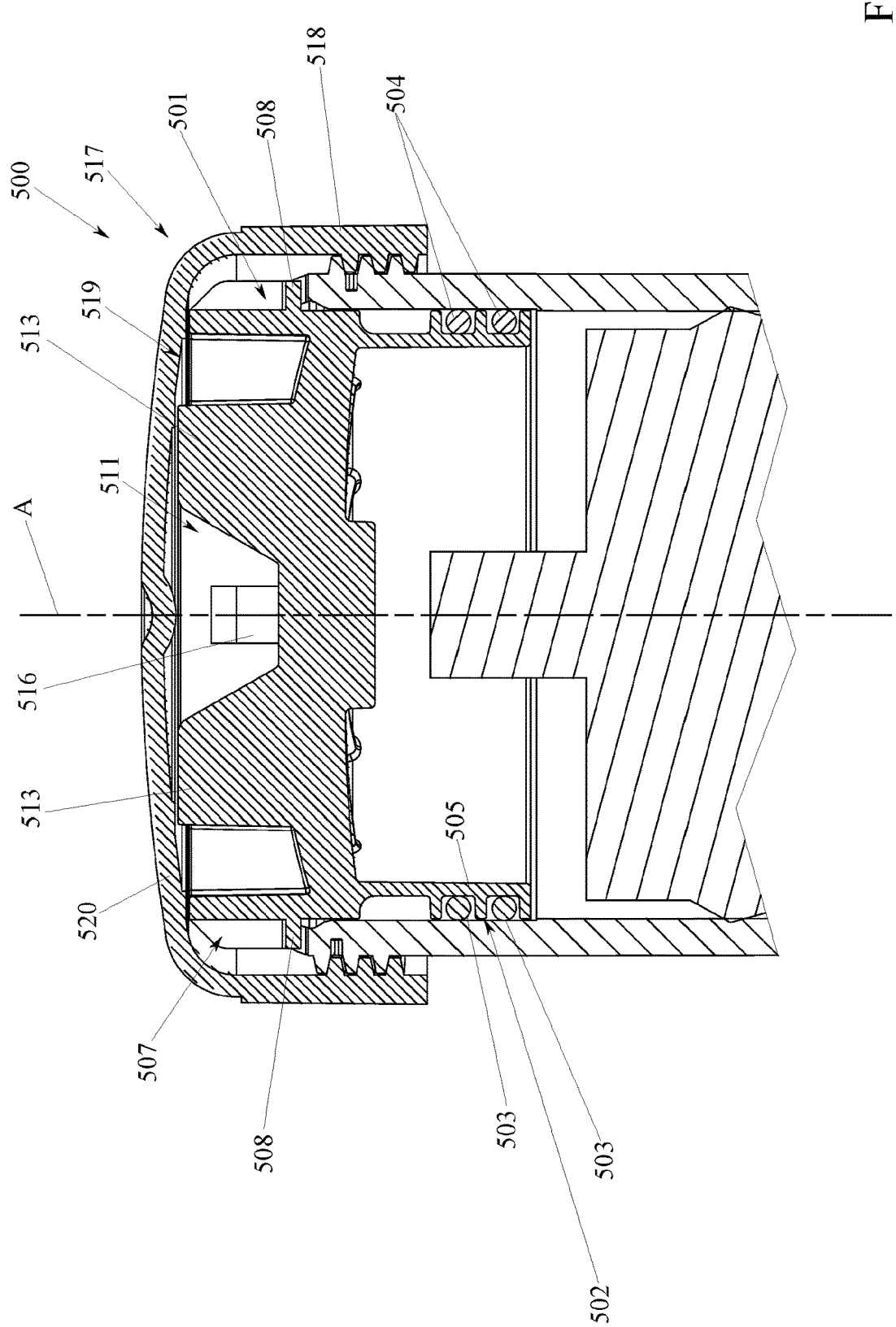
FIG. 3B is the section IIIB-IIIB indicated in FIG. 3A.

With particular reference to FIGS. 3A, 3B and 16, it can be observed that the closing system 500 comprises an occlusion element 501, which is suitable to be coupled to the second end of the lateral wall 405 of the first container 403, i.e. the one opposite the bottom plate 406, preferably without any type of threaded connection.

Said occlusion element 501 has a cylindrical lower portion 502 suitable to be coaxially inserted into the second end of the lateral wall 405 of the first container 403.

One or more annular seats 503 are coaxially obtained on the outer lateral surface of said cylindrical portion 502, each of which is suitable to accommodate an annular gasket 504. Although in the drawings the annular seats 503 have a substantially "C"-shaped cross section, i.e. with three closed sides and only one open side facing outwards, it is not excluded that in other embodiments the annular seats 503 may have a cross section with a substantially "L" shape, i.e. with two closed sides and two open sides facing outwards and in axial direction respectively.

The annular gaskets 504 are singularly designed to obtain a radial sealing between the outer lateral surface of the cylindrical portion 502 of the occlusion element 501 and the inner surface of the lateral wall 405 of the first container 403.

In particular, it should be observed that the cylindrical portion 502 is internally hollow and is substantially defined by a tubular wall 505 having a first axial end closed by a transverse wall 506, and a second and opposite open axial end, which faces the inside of the first container 403 towards the corresponding bottom plate 406.

In this way, the transverse wall 506 occludes the internal volume of the first container 403 while the cavity delimited by the tubular wall 505 faces towards the bottom plate 406. Preferably, the tubular wall 505 has a thickness (in a radial direction with respect to the axis of the cylindrical portion 502) which, at least in the area of mutual insertion, is smaller than the thickness of the lateral wall 405 of the first container 403 (in a radial direction with respect to the central axis A).

In this way, following the overpressure that reigns inside the first container 403 during the operation of the plant 100, the tubular wall 505 of the occlusion element 501 tends to expand radially outwards, more than the lateral wall 405 of the first container 403, resulting in the increase in the radial compression of the annular gaskets 504, to the advantage of the seal.

The occlusion element 501 further comprises an upper portion 507, which is suitable to remain external to the first container 403, projecting axially beyond the open end of the lateral wall 405, on the opposite side with respect to the bottom plate 406.

Said upper portion 507 can be obtained as a single body with the lower cylindrical portion 502 and can also have a shape substantially cylindrical and coaxial with the cylindrical portion 502 itself.

From the lateral surface of the upper portion 507 one or more abutment elements 508 project radially in a cantilever fashion outwards, which are suitable to rest axially on the edge of the second axial end of the lateral wall 405 of the first container 403, so as to limit the axial position of the cylindrical portion 502 in the insertion direction.

In the illustrated embodiment, the abutment elements 508 can be arranged angularly equidistant with respect to the axis of the lower cylindrical portion 502.

According to an advantageous aspect of the present solution (see also FIG. 17), the edge of the second axial end of the first container 403 is not perfectly flat, i.e. it does not lie in a single plane orthogonal to the central axis A of the lateral wall 405, but it has circumferentially an alternation of depressions 509 and rises 510 that are mutually connected by means of inclined surfaces, in which the axial distance between the bottom of the depressions 509 and the bottom plate 406 is smaller than the axial distance between the bottom plate 406 and the top of the rises 510.

For example, the edge of the second axial end of the first container 403 can comprise a number of depressions 509 (and therefore of rises 510) equal to the number of abutment elements 508 of the occlusion element 501 and which can be distributed in the same way, for example angularly equidistant with respect to the central axis A of the lateral wall 405. In this way, when the abutment elements 508 rest on the bottom of the depressions 509, the cylindrical lower portion 502 of the occlusion element 501 is at the maximum insertion degree inside the first container 403, in an operative position in which all annular gaskets 504 ensure an effective sealing.

If the occlusion element 501 is rotated around the central axis A of the first container 403, starting from the aforesaid operative position, the abutment elements 508 slide on the inclined surfaces which connect the depressions 509 to the rises 510, causing a progressive and contextual slipping off of the lower cylindrical portion 502.

In other words, the shaped edge of the second axial end of the lateral wall 405 defines a cam profile on which the abutment elements 508 of the occlusion element 501 can slide, following a rotation of the latter around the central axis A, and which is suitable to transform said rotation into an axial displacement of the occlusion element 501 with respect to the lateral wall 405.

This solution is advantageous because, during the operation of the reverse osmosis filtering device 400, the annular gaskets 504 tend to adhere (stick) to the inner lateral surface of the lateral wall 405, potentially making a purely axial extraction of the occlusion element 501 difficult.

Thanks to the cam system described above, the combined action of rotation and translation facilitates the detachment of the annular gaskets 504, making it easier to remove the occlusion element 501.

Furthermore, the release is less traumatic as it is progressive and always with coaxial movement, unlike a free and uncontrolled traction.

To facilitate the rotation of the occlusion element 501, the upper portion 507 can comprise an axial cavity 511, facing towards the outside of the first container 403, which is suitable to obtain a prismatic coupling with a manoeuvring key 512 of the coupled type.

In the illustrated embodiment, the axial cavity 511 is made as a cylindrical cavity, from the inner surface of which one or more radial ribs 513 project.

The manoeuvring key 512 in turn comprises a cylindrical tang 514 suitable to be coaxially inserted, preferably to size, into the axial cavity 511, which is provided with one or more slits 515 suitable to receive the radial ribs 513, making in this way the manoeuvring key 512 integral in rotation with the occlusion element 501.

However, it is not excluded that, in other embodiments, the prismatic coupling between the manoeuvring key 512 and the axial cavity 511 of the occlusion element 501 can be obtained with completely different shapes and/or methods.

Still with a view to facilitating the rotation of the occlusion element 501 during the removal step, for example if the manoeuvring key 512 was not available, the upper portion 507 of the occlusion element 501 can comprise one or more through slots 516 having axes oriented transversely (for example orthogonal) with respect to the axis of the cylindrical portion 502.

Said through slots 516 can be obtained in the lateral wall that delimits the axial cavity 511, for example at and above the abutment elements 508, and can be diametrically aligned two by two, so that each pair of aligned through slots 516 substantially defines a single aperture which completely crosses the upper portion 507 of the occlusion element 501. In this way, the removal of the occlusion element 501 can be made by inserting any elongated tool, for example a screwdriver, into a pair of through slots 516, and by using the lever provided by said tool, to rotate the occlusion element 501 and slide it on the cam profile.

It is wished to underline here that the latter tool, as well as the manoeuvring key 512 described above, are accessories which can be supplied and used to remove the occlusion element 501 but which are not part of the closing system 500.

The closing system 500, on the other hand, further comprises a tightening member 517, the sole function of which is to axially lock the occlusion element 501 in the operative position in which the abutment elements 508 rest in the depressions 509, supporting the axial pressure forces being unloaded on it.

This tightening member 517 comprises a ring nut 518, for example with substantially cylindrical shape, which is suitable to surround the occlusion element 501 and to be coaxially screwed external to the second axial end of the lateral wall 405 of the first container 403.

The tightening member 517 further comprises at least one abutment surface 519 suitable to rest on the upper portion 507 of the occlusion element 501, when the same is in the operative position.

For example, the abutment surface 519 can be defined by a bottom wall 520 which for example completely occludes an axial end of the ring nut 518, giving the tightening member 517 substantially the shape of a cover.

Since it only needs to provide an axial constraint against the slipping off of the occlusion element 501, the tightening member 517 does not carry any type of gasket and does not have to be tightly screwed to the first container 403.

Nevertheless, it is obviously preferable that the tightening member 517 cannot unscrew freely, for example following the vibrations caused by the operation of the plant.

For this reason, the closing system 500 can comprise an anti-unscrewing system which prevents the tightening member 517 from unscrewing with respect to the lateral wall 405 of the first container 403.

This anti-unscrewing system can comprise a first notch 521 firmly fixed to the tightening member 517, for example which projects axially in a cantilever fashion from the edge of the ring nut 518 on the opposite side with respect to the bottom wall 520 (see FIG. 16).

In this way, by screwing and unscrewing the tightening member 517, the first notch 521 is suitable to vary its own axial distance with respect to the second edge of the lateral wall 405 of the first container 403, up to a maximum value that is reached when the tightening member 517 is completely screwed down.

The anti-unscrewing system can further comprise a second notch 522, which is instead coupled to the lateral wall 405 of the first container 403, so as to be able to move between an engagement position and a disengagement position.

In particular, the second notch 522 can be carried by a slider 523, which is slidingly coupled to a guide 524 obtained in the lateral wall 405 of the first container 403, for example aligned with the fixing plate 444 and between the latter and the second end of the lateral wall 405.

The slider 523, being coupled with this guide 524, can be suitable to slide in a direction parallel to the central axis A of the lateral wall 405, so that, when it is in the engagement position, the second notch 522 is closer to the second end of lateral wall 405 with respect to when it is in the disengagement position.

In particular, when it is in the engagement position, the second notch 522 is placed at a distance from the second end of the lateral wall 405 which is equal to or smaller than the distance reached by the first notch 521, when the tightening member 517 is completely screwed down, while when it is in the disengagement position, the second notch 522 is placed at a distance from the second end of the lateral wall 405 which is greater than the distance reached by the first notch 521.

In this way, by bringing the second tooth 522 into the disengagement position, it is advantageously possible to freely unscrew and screw again the tightening member 517. By instead bringing the second notch 522 into the engagement position, for example after the complete screwing of the tightening member 517, the second notch 522 interferes with the first notch 521, preventing accidental unscrewing of the tightening member 517. A spring 525 (see FIG. 3A) can be interposed between the slider 523 and the relative guide 524, so as to push and keep the second notch 522 normally in the engagement position.

It is wished to point out here that, although in the example illustrated the ring nut 518 is a threaded ring nut which is coaxially screwed to the external of the second axial end of the lateral wall 405 of the first container 403, it is not excluded that, in other embodiments, the ring nut 518 can be axially constrained to the lateral wall 405 of the first container 403 by other means of mutual coupling, for example by means of a bayonet coupling or other.

Pumping Group

As anticipated in the introduction, the plant 100 can comprise a pumping group 200, which is suitable to receive the water coming from the inlet duct 101 and to feed it under pressure towards the reverse osmosis filtering device 400, possibly after having made it transit through the mechanical separation filtering device 300.

Figure 18:
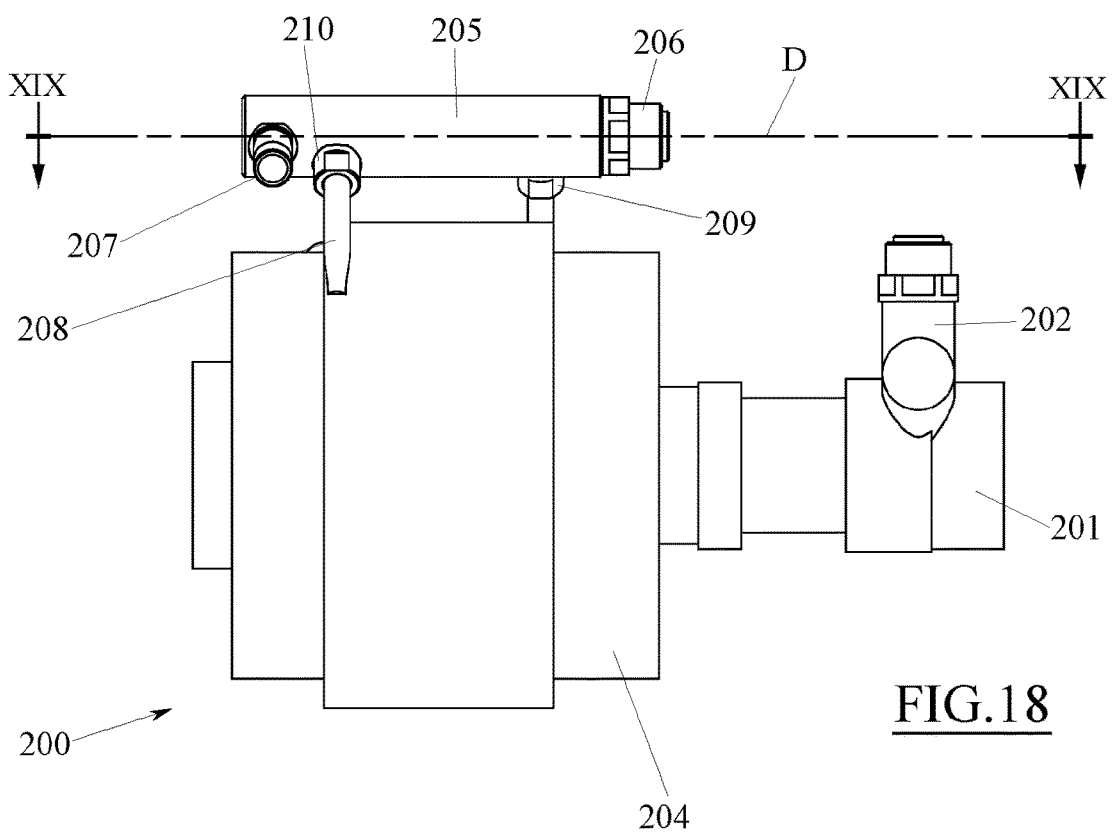
FIG. 18 is a side view of a pumping group used in the plants of FIGS. 1 and 9.
Figure 19:
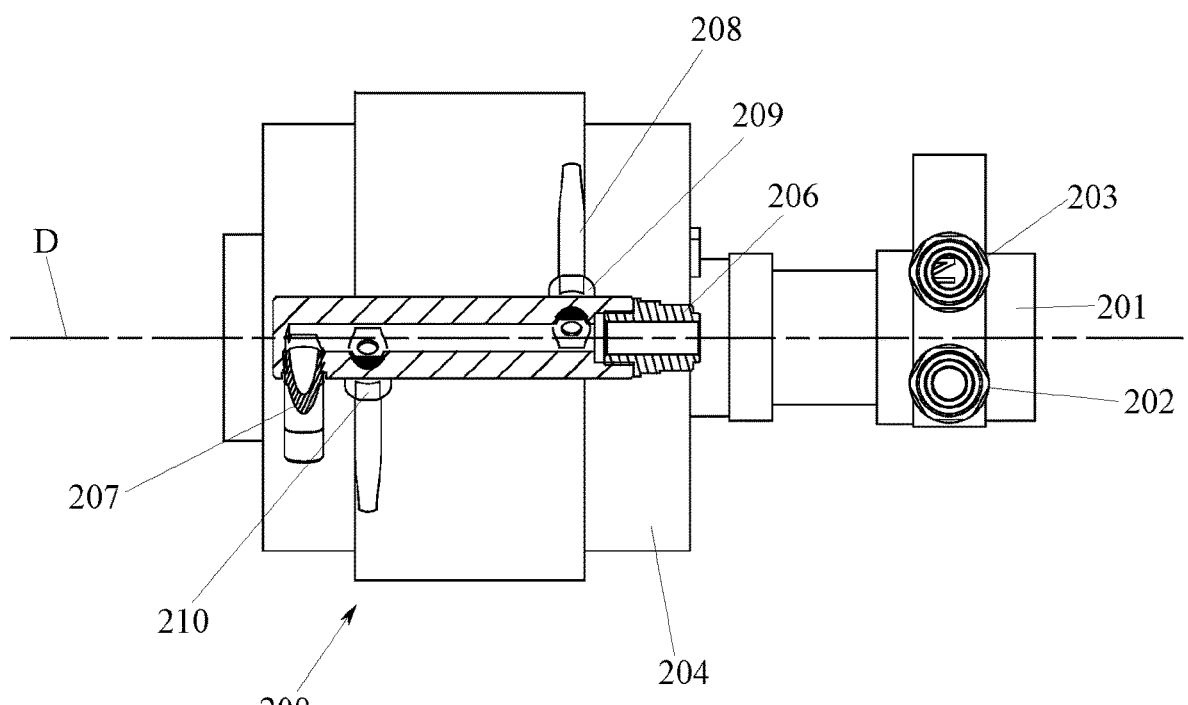
FIG. 19 is the section XIX-XIX of FIG. 18.

With particular reference to FIGS. 18 and 19, the pumping group 200 comprises a pump 201, for example a vane pump, which is provided with an inlet 202 for low-pressure water and with an outlet 203 for high-pressure water, and a motor 204, for example an electric motor, which is coupled to the pump 201 in order to drive it.

The pumping group 200 may further comprise a liquid cooling system for the motor 204. This cooling system comprises a tubular manifold 205, substantially shaped as a straight duct having a central axis D, which comprises an inlet terminal 206 and an outlet terminal 207, positioned at a predetermined mutual distance, with respect to the direction defined by the axis central D of the tubular manifold 205.

The cooling system further comprises a branch pipe 208, which is wound as a coil around the motor 204 and has a first end 209 and a second opposite end 210.

Both the first and the second end 209 and 210 of the branch pipe 208 are hydraulically connected to the tubular manifold 205, in a portion comprised between the inlet terminal 206 and the outlet terminal 207.

The first and the second end 209 and 210 of the branch pipe 208 are also positioned at a predetermined mutual distance, with respect to the direction defined by the axis D of the tubular manifold 205.

For example, the first end 209 is placed at a distance from the inlet terminal 206 which is smaller than the distance between said inlet terminal 206 and the second end 210, which can instead be closer to the outlet terminal 207.

Preferably, the diameter of the branch pipe 208 is smaller than the diameter of the tubular manifold 205, while the overall length thereof can be greater than the length Lc of the entire segment of the tubular manifold 205 which is comprised between the first and the second end 209 and 210 of branch pipe 208.

In the embodiments illustrated in FIGS. 1 and 9, the inlet terminal 206 of the tubular manifold 205 is suitable to be connected with the inlet duct 101 of the plant 100, for example through the main solenoid valve 104, so as to be able to receive the water to be treated directly, for example the one coming from the water network.

The outlet terminal 207 of the tubular manifold 205 is instead connected to the inlet 202 of the pump 201, the outlet 203 of which can be connected to the reverse osmosis filtering device 400, possibly through the mechanical separation filtering device 300 (if any).

In this way, the tubular manifold 205 of the cooling system is hydraulically connected in series with the pump 201 and upstream of the latter with respect to the water direction. In other embodiments, while remaining hydraulically connected in series, the tubular manifold 205 of the cooling system could nevertheless be connected downstream of the pump 201 with respect to the water direction.

In this case, the inlet 202 of the pump 201 could be directly connected with the inlet duct 101 of the plant 100, for example through the main solenoid valve 104, while the outlet 203 of the pump 201 could be connected with the inlet terminal 206 of the tubular manifold 205, the outlet terminal 207 of which could be connected to the reverse osmosis filtering device 400, possibly through the mechanical separation filtering device 300 (if any).

In both cases, when the pump 201 is running and the main solenoid valve 104 is open, the tubular manifold 205 of the cooling system is traversed by the water that will be treated in the plant 100.

In addition to further travelling along the tubular manifold 205, from the inlet terminal 206 towards the outlet terminal 207, part of this water is also diverted and flows inside the branch pipe 208, placing itself in a heat exchange relationship with the motor 204.

In this way, the water circulating in the branch pipe 208 subtracts part of the heat produced by the motor 204, cooling it effectively, before joining again the portion of water that flows only in the tubular manifold 205 and continuing together towards the filtrating devices.

On the other hand, since not all the water traverses the branch pipe 208 but a substantial part thereof travels only along the tubular manifold 205, from the inlet terminal 206 towards the outlet terminal 207, this solution allows to keep pressure drops rather low. Naturally, to maximize the cooling of the motor 204 while minimizing the pressure drop, the various parts of the cooling system must be sized appropriately.

Purely by way of example, a rough sizing of the cooling system is shown, assuming to use a 360 W motor 204 with 60% efficiency and admitting an increase in temperature DT of the water in the branch pipe 208 equal to 5° C.

To remove this heat (considering the specific heat of water and assuming pejoratively the total transfer of the heat to water), it can be calculated that the branch pipe 218 must be traversed by a water flow rate of at least 0.4 liters/minute.

To meet this requirement, the cooling system can be made using a tubular collector 205 having an intermediate segment length Lc=100 mm and a pressure drop coefficient in turbulent flow Kc=0.0011 (experimental value based on the pipe used), and using a branch pipe 208 with overall length Ls=2500 mm and a pressure drop coefficient in turbulent flow Ks=0.0077 (experimental value based on the pipe used).

As proof of this, it can be considered that, in turbulent flow, the pressure drop P in a duct is proportional to the length L of the duct, to the pressure drop coefficient K and to the square of the flow rate Q.

Since the branch pipe 208 joins again the tubular manifold 205, the pressure drop P of said two ducts must be the same, from which it follows that the following relationship must be satisfied:

$$Ks*Ls*Qs^2 = Kc*Lc*Qc^2$$

where Qs is the flow rate along the branch pipe 208 while Qc is the flow rate along the intermediate segment of the tubular manifold 205.

By inserting the previous values in this relationship, it is obtained that:

$$Qc/Qs = 13.2$$

Considering that the pump 201 is able to produce a total flow rate equal to Qc+Qs=16 liters/minute, it can be obtained that the flow rate along the intermediate segment of the tubular manifold 205 is equal to Qc=14.9 liters/minute, while the flow rate along the branch pipe 208 is equal to Qs=1.1 liters/minute, that is, well above the minimum of 0.4 liters/minute, required for cooling the motor 204 under the previous hypotheses.

In general terms, it can be stated that it is preferable that the tubular manifold 205 and the branch pipe 208 are sized so that the flow of water traversing the tubular manifold 205 is greater than the flow of water traversing the branch pipe 208.

In particular, it is preferable that the sizing is such that the flow rate of water flowing along the tubular manifold 205 is equal to or greater than 70% of the total water flow rate entering the cooling system and that only the remaining portion, equal or less than 30%, flows along the branch pipe 208.

In analytical terms, it is therefore preferable that the pressure drop coefficients Ks and Kc and the lengths Ls and Lc, respectively of the branch pipe 208 and of the tubular manifold 205, are chosen so as to respect the following condition:

$$\frac{Qc}{Qs} = \sqrt{\frac{Ks*Ls}{Kc*Lc}} \geq \frac{70}{30} = 2.333$$

First Filtering Device

The mechanical separation filtering device 300 schematically includes a filtering group 301 and a fixed support element 302, to which the filtering group 301 is preferably associated in a removable way, for example in order to allow the replacement thereof when necessary.

As anticipated in the introduction, the filtering device 300 can be inserted into the plant 100 or it can be obtained as a separate entity.

However, since the filtering device 300 has substantially the same characteristics in both cases, it will be described below with reference mainly to the case in which it is a separate entity, it being understood that the same considerations also apply in the case in which the filtering device 300 is integrated into the plant 100, and vice versa.

Figure 29:
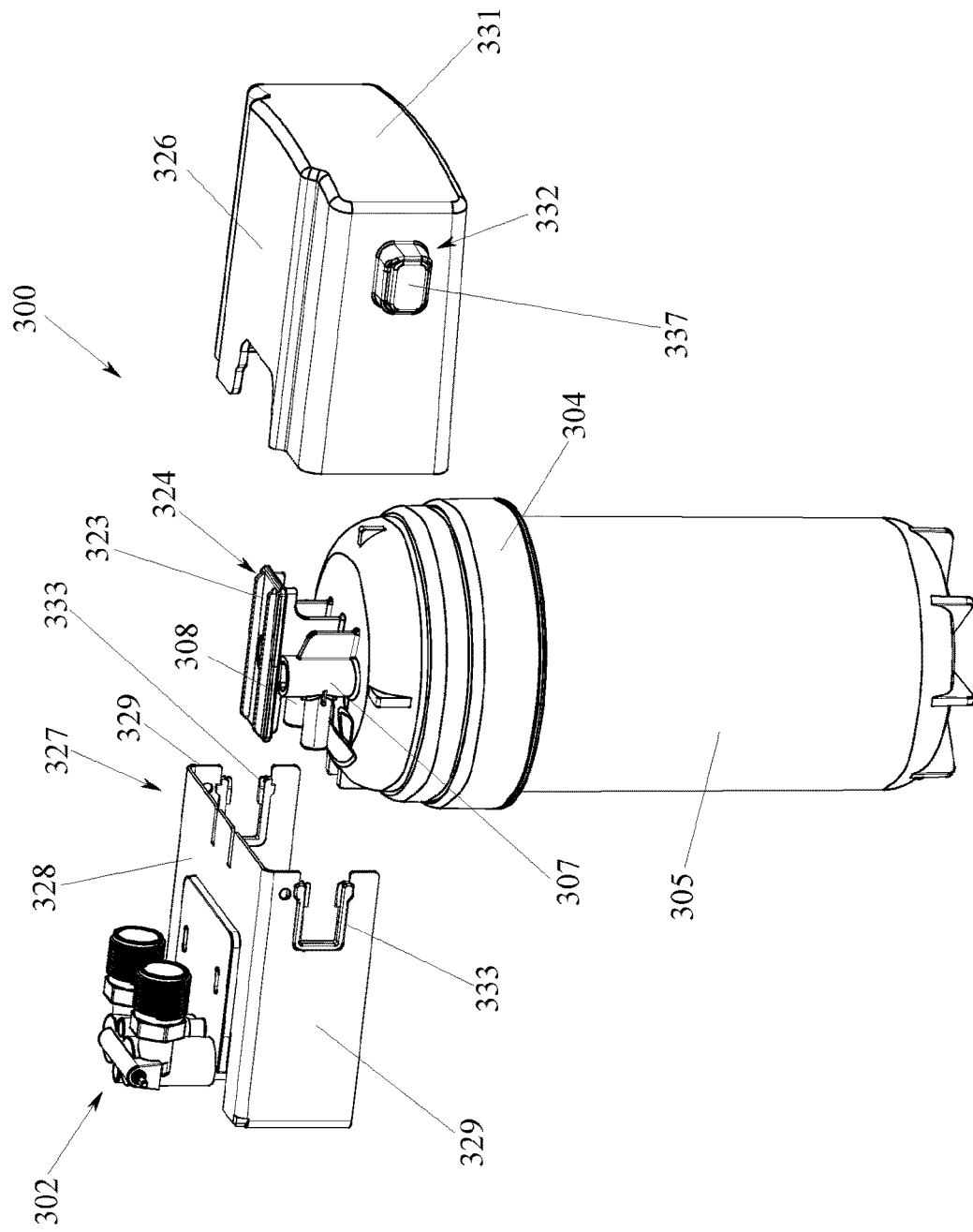
FIGS. 29, 30 and 31 are a partially exploded perspective view of the filtering device of FIG. 24 shown in as many steps during the assembly process.

As illustrated in FIG. 29, the filtering group 301 comprises an external casing comprising a cup-like body 303 and a cover 304 suitable to close said cup-like body 303.

The cup-like body 303 is generally provided with a lateral wall 305 with tubular shape, for example cylindrical, which has a predetermined central axis E, and a bottom plate 306 positioned so as to close a first axial end of said lateral wall 305.

The second and opposite axial end of the lateral wall 305 is closed by the cover 304, which can for example be screwed to the external to the lateral wall 305 preferably by interposition of at least one annular sealing gasket.

The cover 304 is provided with an inlet duct 307 for the water to be filtered and with an outlet duct 308 for the filtered water.

Figure 25:
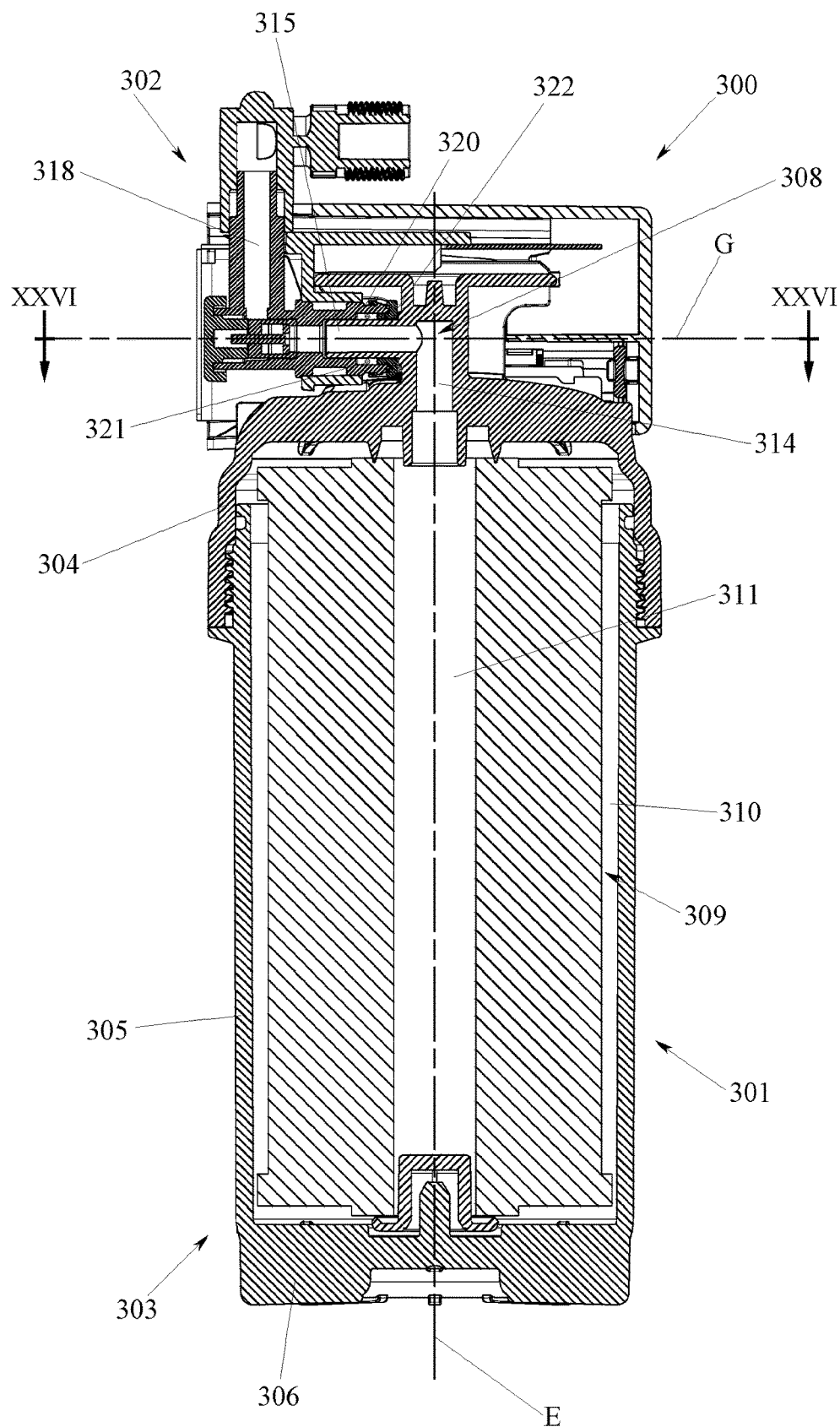
FIG. 25 is the section XXV-XXV of FIG. 24.

As illustrated in FIG. 25, a filtering cartridge 309 is accommodated inside the cup-like body 303, for example but not necessarily a filtering cartridge with a substantially tubular shape, which partitions the internal volume of the cup-like body 303 into a first chamber 310, which is placed in communication with the inlet duct 307 (see FIG. 28), and a second chamber 311, which is placed in communication with the outlet duct 308.

In this way, the water crossing the outer casing from the inlet duct 307 towards the outlet duct 308 is forced to cross the filtering cartridge 309.

The filtering cartridge 309 generally comprises a filtering medium, which is suitable to be crossed by water in order to perform the intended filtration function.

This filtering medium can comprise a porous or perforated body, with meshes of suitable size, which allows to retain by mechanical action the coarse particles and/or other solid impurities that may be present inside water, in order to prevent them from reaching the reverse osmosis filtering device 400, where they could damage the osmotic membrane filtering cartridges 411 and 420.

Alternatively or in addition, the filtering medium of the filtering cartridge 309 can comprise activated carbon, for example in the form of flakes or granules, which, being crossed by water, may be able to absorb and/or retain chlorine and/or by chemical interaction and/or other unwanted chemicals that may be present in water.

Alternatively or in addition, the filtering medium of the filtering cartridge 309 can comprise resins, usually but not necessarily in the form of spheroidal granules, which can also work by ion exchange, in order to advantageously replace some salts that are contained in water with other salts. Depending on the type of resin chosen, said resins can operate in many different ways, for example but not exclusively by replacing carbonates with sodium chloride, in order to lower the hardness of water without reducing the fixed residue thereof.

In some embodiments, the filtering medium can simply be constituted by activated carbon, for example in the form of flakes or granules, or by resins, for example in the form of spheroidal granules, which are loaded directly into the cup-like body 303.

Figure 27:
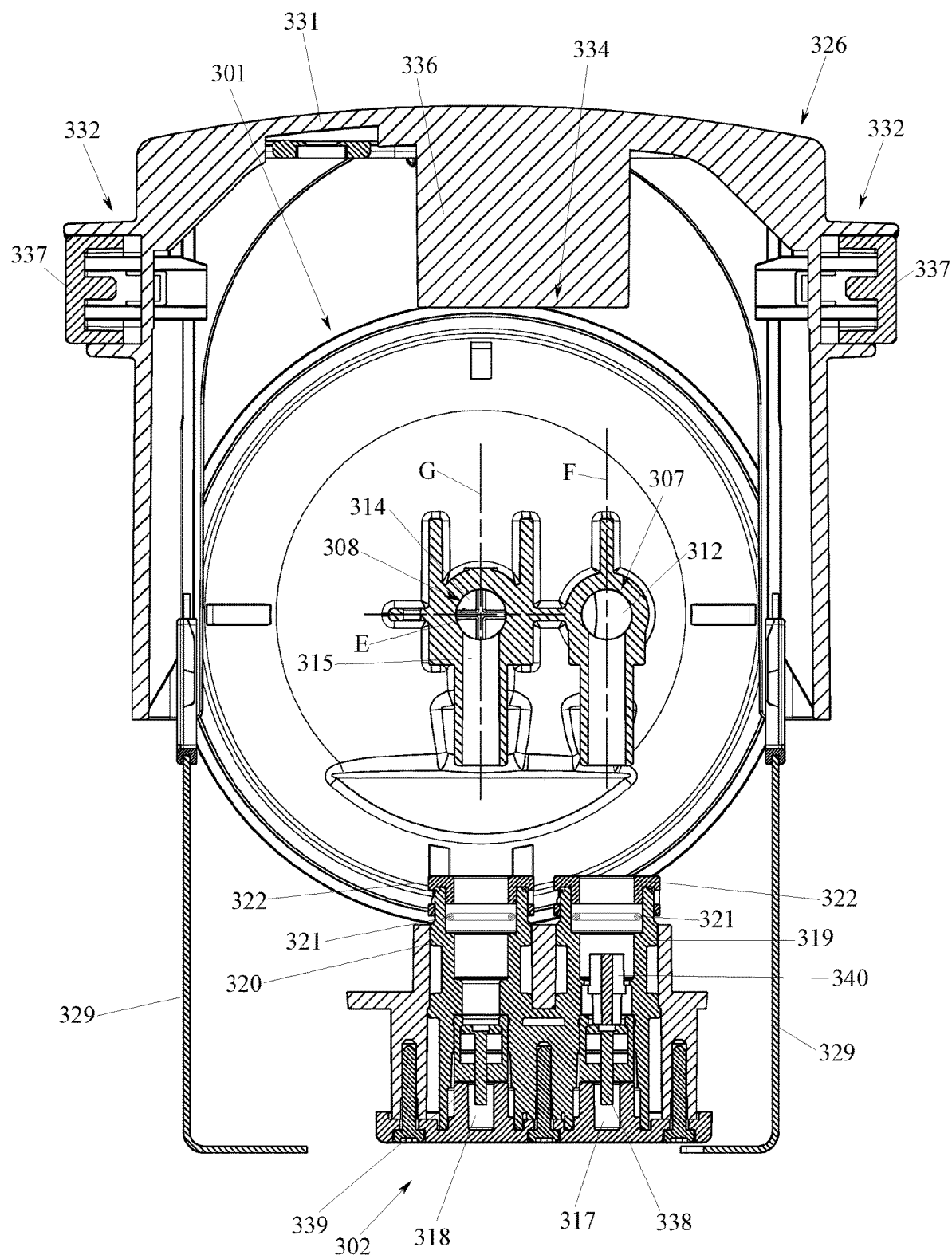
FIG. 27 is the section of FIG. 26 shown with the main components separated along the direction of mutual coupling.
Figure 28:
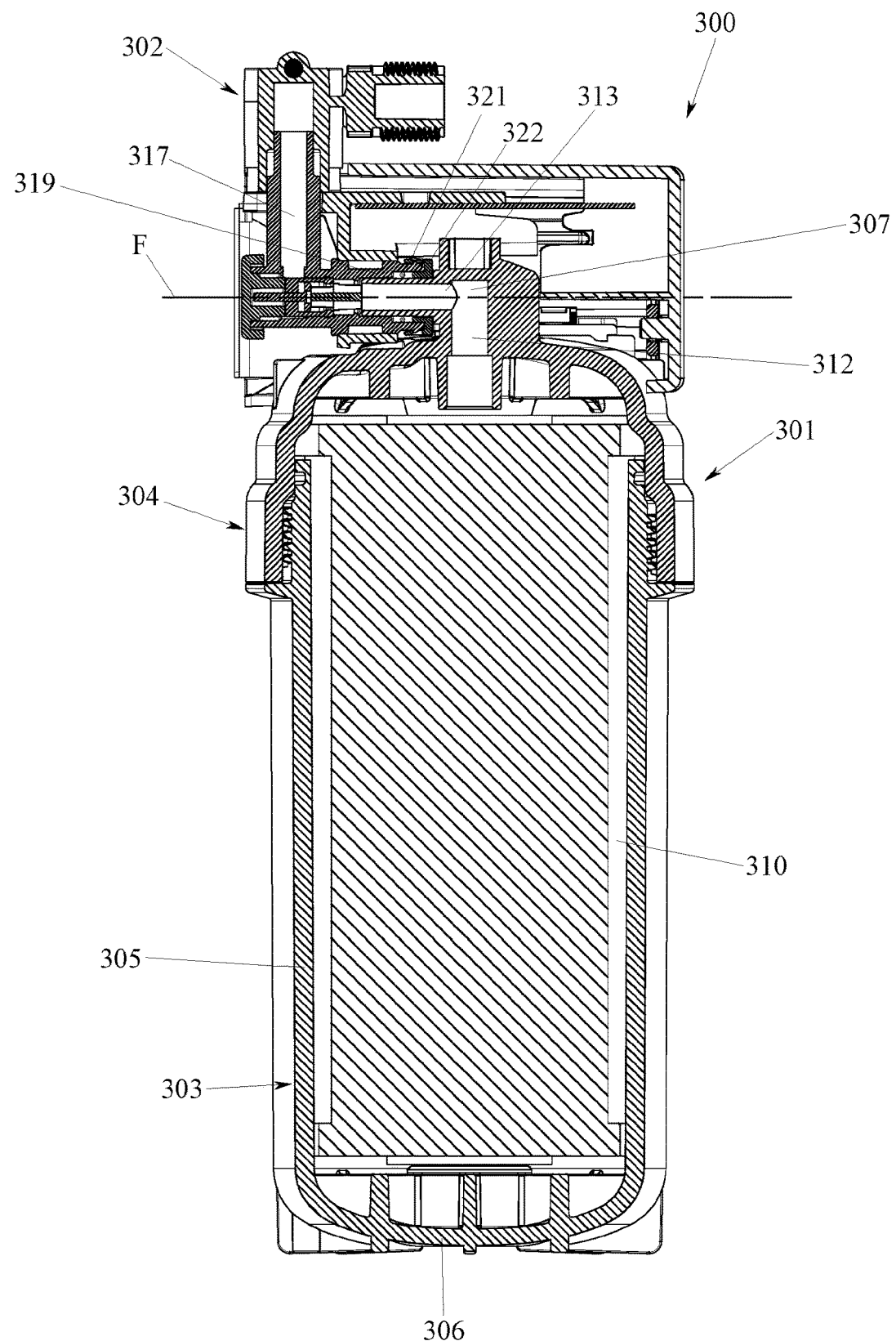
FIG. 28 is the section XXVIII-XXVIII of FIG. 26 shown on a reduced scale.

Returning to the inlet and outlet ducts 307 and 308, it can be observed in FIG. 28 that the inlet duct 307 comprises a connecting segment 312, directly communicating with the first chamber 310 of the cup-like body 303, which rises from the cover 304 with axis straight, parallel and preferably offset with respect to the central axis E of the lateral wall 305 (see also FIG. 27).

The inlet duct 307 also comprises a terminal segment 313 deriving in a cantilever fashion from the connecting segment 312 and extending with axis F straight and orthogonal to the central axis E, so as to lead out to the outside of the cup-like body 303 for receiving the water to be filtered.

Similarly, it can be observed in FIG. 25 that the outlet duct 308 comprises a connecting segment 314, directly communicating with the second chamber 311 of the cup-like body 303, which rises from the cover 304 with axis straight, parallel and preferably coinciding with the central axis E of the lateral wall 305.

The outlet duct 308 also comprises a terminal segment 315 deriving in a cantilever fashion from the connecting segment 314 and extending with axis G straight and orthogonal to the central axis E, so as to lead out to the outside of the cup-like body 303 for allowing the outflow of the filtered water.

As illustrated in FIG. 27, the terminal segment 315 of the outlet duct 308 is arranged adjacent, oriented parallel to and facing in the same direction as the terminal segment 313 of the inlet duct 307.

For example, the axes F and G of the terminal segments 313 and 315 can lie coplanar on a plane orthogonal to the axis E of the lateral wall 305 of the cup-like body 303.

Furthermore, the free ends of the terminal segments 313 and 315, i.e. those afferent directly to the outside, can be placed at the same distance with respect to a plane orthogonal to the axes F and G and passing through the central axis E of the lateral wall 305. As already mentioned, the filtering group 301 is suitable to be associated in a removable way with the corresponding fixed support element 302, for example in order to be replaced when necessary.

In all the embodiments of the filtering device 300, the support element 302 is provided with a first connection duct 317 and with a second connection duct 318, each of which comprises a free terminal segment, indicated respectively with 319 and 320.

As illustrated in FIG. 27, the terminal segments 319 and 320 of the connection ducts 317 and 318 are mutually arranged adjacent, have parallel axes (for example horizontal) and are oriented in the same direction, substantially specular to the terminal segments 313 and 315 of the inlet and outlet ducts 307 and 308 of the filtering group 301.

In this way, the terminal segment 313 of the inlet duct 307 of the filtering group 301 can be coaxially coupled with terminal segment 319 of the first connection duct 317 and, at the same time, the terminal segment 315 of the outlet duct 308 of the filtering group 301 can be coaxially coupled with the terminal segment 320 of the second connection duct 318.

Figure 26:
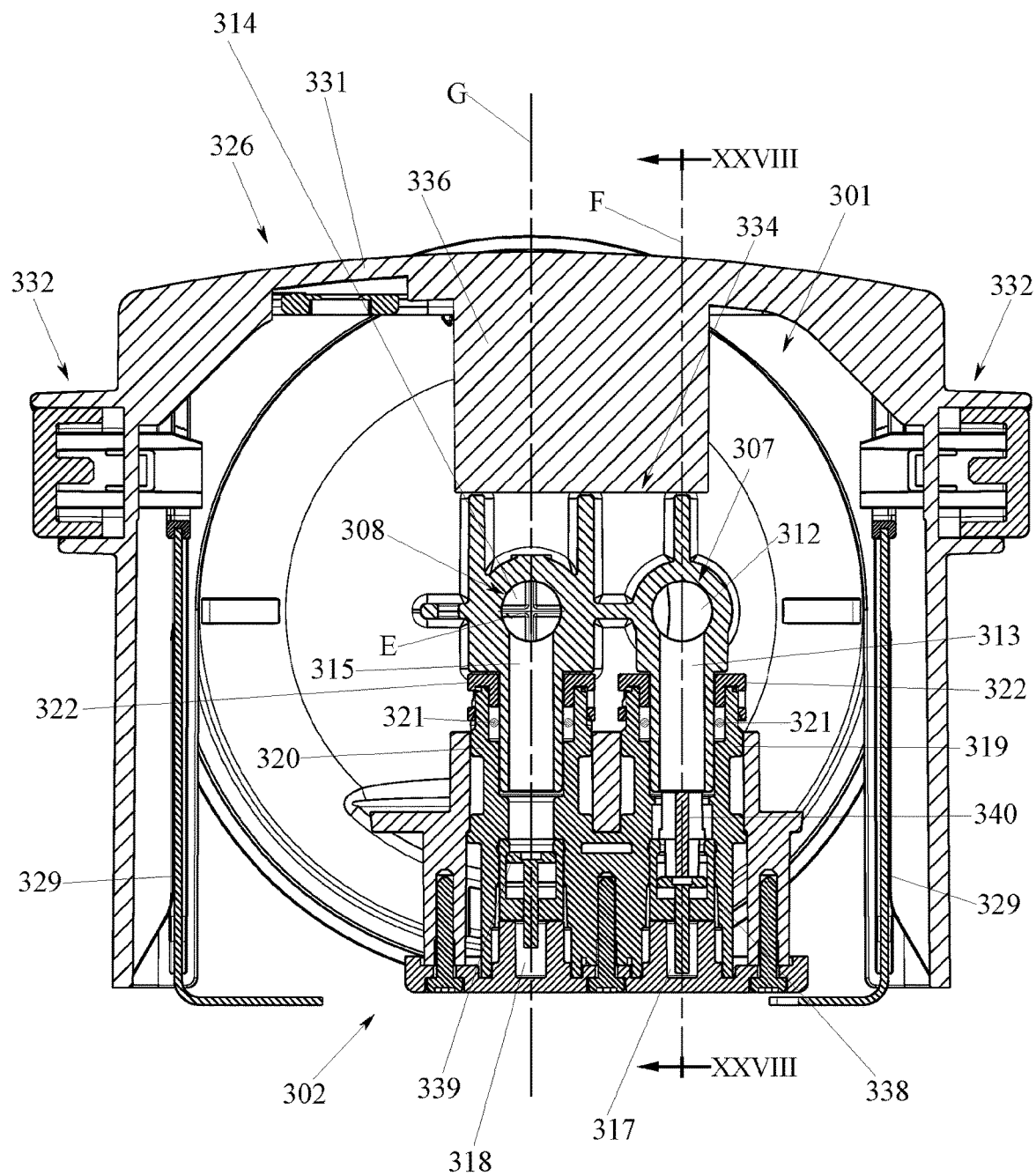
FIG. 26 is the section XXVI-XXVI of FIG. 25, shown on an enlarged scale.

In particular, said coaxial couplings can take place by inserting the terminal segments 313 and 315 of the inlet 307 and outlet 308 duct of the filtering group 301 inside the corresponding terminal segments 319 and 320 of the first and of the second connection ducts 317 and 318, as illustrated in FIG. 26.

To ensure the sealing of said couplings, a respective annular sealing gasket 321 can be coaxially interposed between each terminal segment 319 and 320 of the first and of the second connection duct 317 and 318 and the corresponding terminal segment 313 and 315 of the inlet duct 307 and of the outlet duct 308 of the filtering group 301.

Said annular gaskets 321 are preferably mounted coaxially inside the terminal segments 319 and 320 of the first and of the second connection duct 317 and 318, where each of them can be axially locked by means of a respective ring nut 322 fixed to the end of the respective terminal segment 319 and 320.

In this way, the two annular gaskets 321 remain constantly associated with the fixed support element 302, while the filtering group 301, which represents the replaceable part of the filtering device 300, is advantageously simpler and therefore more economical.

The ring nut 322 can be a ring nut that can be inserted by pressure lock (clip) and which can possibly be removed by rotation, for example for maintenance interventions.

To facilitate the coupling and uncoupling of the filtering group 301 with respect to the support element 302, the filtering device 400 can comprise a coupling and guide system suitable to constrain the filtering group 301 to the support element 302 in a configuration in which the axes F and G of the terminal segments 313 and 315 of the inlet duct 307 and of the outlet duct 308 of the filtering group 301 coincide respectively with the axis of the terminal segment 319 of the first connection duct 317 and with the axis of the terminal segment 320 of the second connection duct 318.

By maintaining this configuration, the coupling and guide system also allows the filtering group 301 to slide with respect to the support element 302 along a sliding direction parallel to the axes F and G of said terminal segments 313 and 315 of the inlet duct 307 and of the outlet duct 308, favouring the coupling and the uncoupling thereof.

As illustrated in FIG. 1, said coupling and guide system may comprise for example a plate 323 fixed to the cover 304 of the filtering group 301 and having at least two lateral edges 324 oriented parallel to the axes F and G of the terminal segments 313 and 315 of the inlet duct 307 and of the outlet duct 308.

Figure 32:
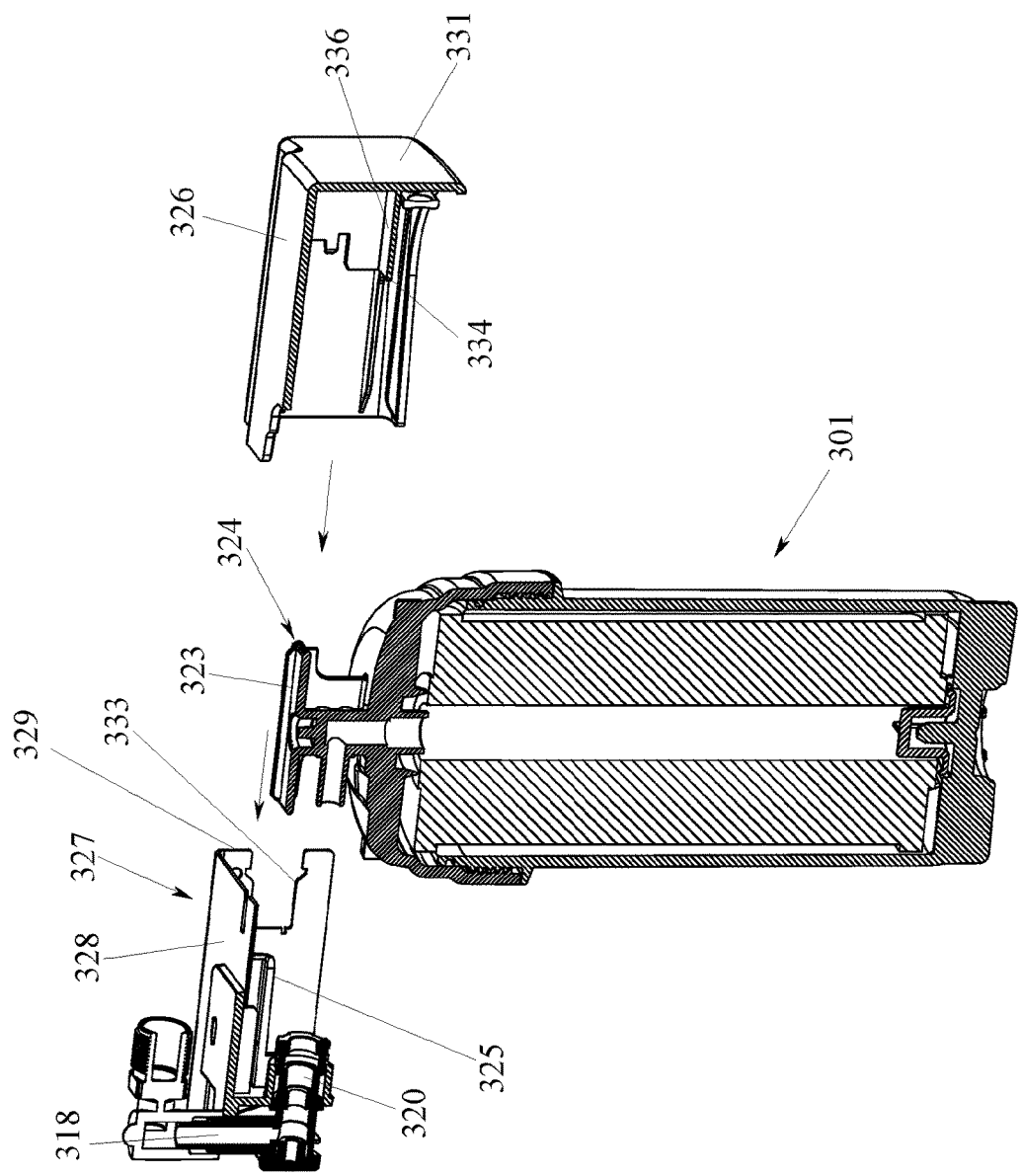
FIGS. 32, 33 and 34 are the same views of FIGS. 29, 30 and 31 in which the filtering device has been sectioned along the plane XXV-XXV of FIG. 24.

The coupling and guide system can further comprise a pair of shelves 325 fixed to the support element 302 and extending parallel to the axes of the terminal segments 319 and 320 of the connection ducts 317 and 318, which are suitable to receive, for rest, said lateral edges 324 of the plate 323 (see also FIG. 32).

Figure 31:
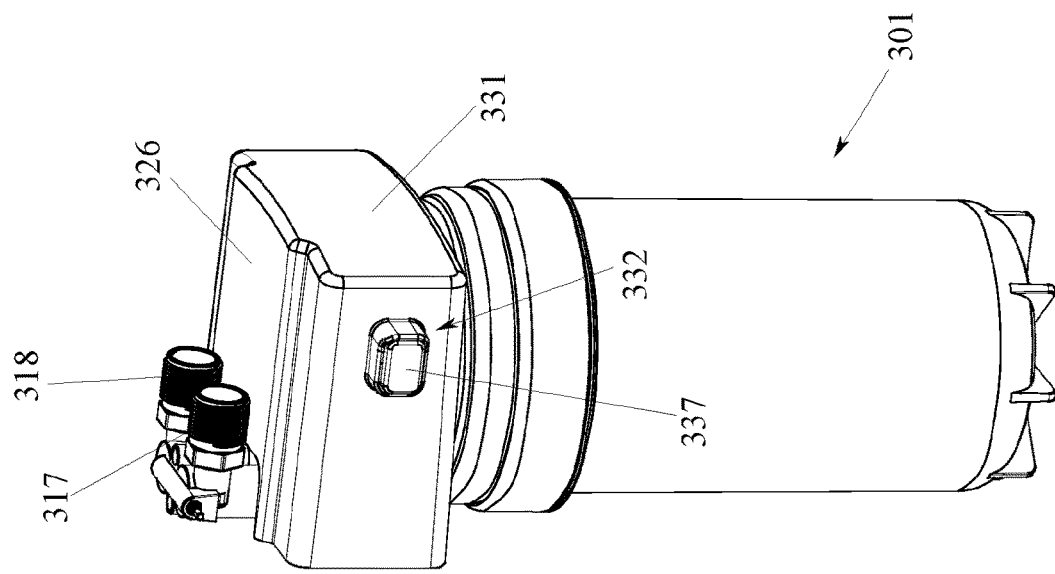
Figure 30:
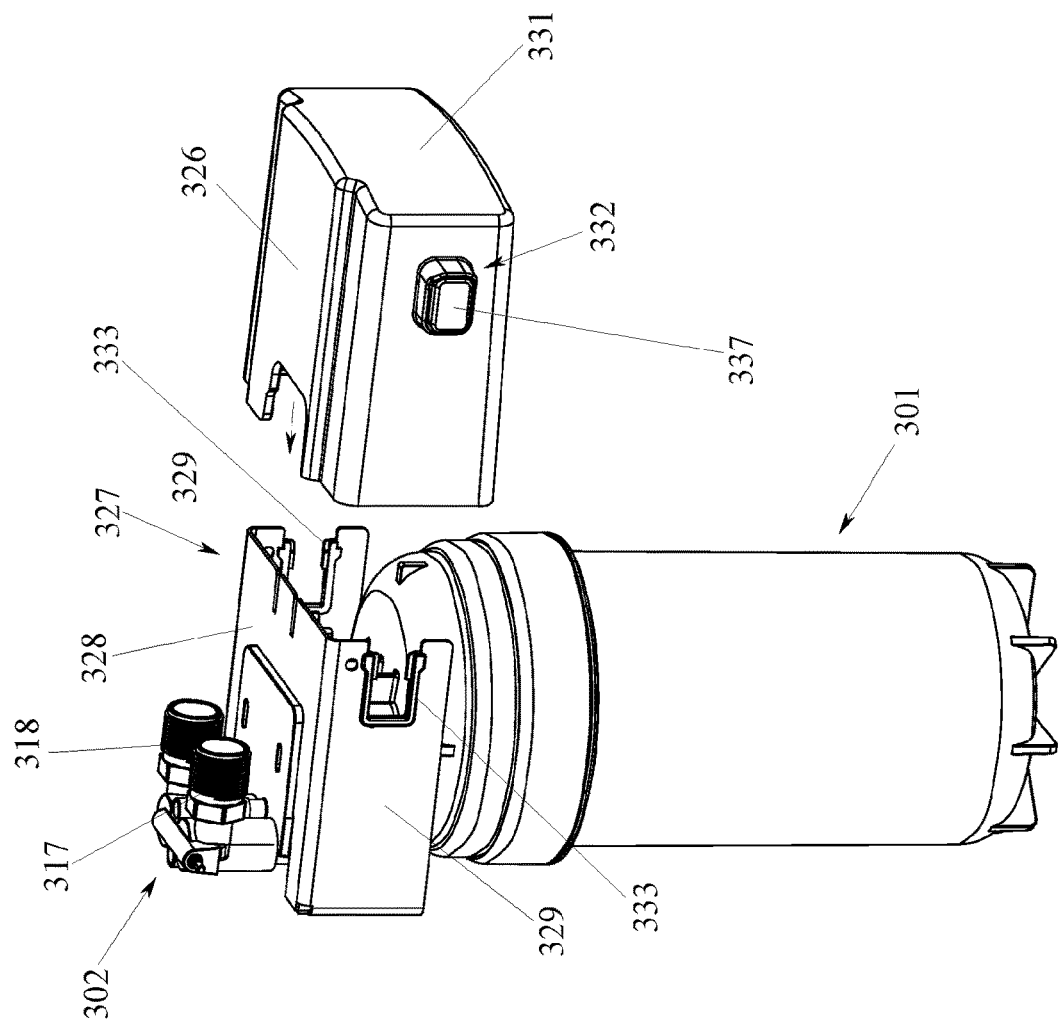

Thanks to the coupling between the plate 323 and the shelves 325, the filtering group 301 can therefore be easily brought into an operating configuration, in which the terminal segments 313 and 315 of the inlet duct 307 and of the outlet duct 308 are coaxially coupled respectively with the terminal segment 319 of the first connection duct 317 and with the terminal segment 320 of the second connection duct 318, as illustrated in FIGS. 30 and 31.

To selectively lock the filtering group 301 in this operating position, the filtering device 300 can comprise a suitable releasable locking system.

Said releasable locking system can comprise a tightening element 326 that can be slidably coupled to the support element 302 according to the same sliding direction as the filtering group 301, after the latter has been brought into the operating position.

For example, the tightening element 326 can be shaped as a covering case, which is suitable to be inserted like a drawer on a box-like frame 327 which is fixed to the support element 302 and which is suitable to contain the terminal segments 319 and 320 of the connection ducts 317 and 318, as well as the shelves 325.

The box-like frame 327 can be shaped as a C-section profile and axis parallel to the axes of the terminal segments 319 and 320 of the connection ducts 317 and 318, which has for example an upper flat wall 328, which surmounts said terminal segments 319 and 320, and two flat lateral walls 329, which extend downwards from said upper wall 328 but on opposite sides of the terminal segments 319 and 320 themselves.

An axial end of said box-like frame 327 is open so as to allow the insertion of the filtering group 301.

The tightening element 326 is inserted onto the box-like frame 327 and has a rear wall 331 suitable to close the open axial end of the box-like frame 327, opposing the terminal segments 319 and 320 of the connection ducts 317 and 318.

The tightening element 326 is also provided with one or more releasable snap-fitting members 332, which are suitable to lock the tightening element 326 on the box-like frame 327 of the support element 302 in a predetermined stop position.

For example, said snap-fitting members 332 can be positioned on two lateral flanks of the tightening element 326, which are suitable to cover the lateral walls 329 of the box-like frame 327, and can be singularly configured to snap into a corresponding seat 333 obtained in said lateral walls 329.

In particular, the hooking between the snap-fitting members 332 and the corresponding seats 333 can take place simply by pushing the tightening element 326 to make it slide on the box-like frame 327, for example thanks to a suitable conformation of the aforesaid snap-fitting members 332 (for example with sawtooth shape) which allows them, following the aforesaid movement, to deform and then to snap into the relative seat 333.

The tightening element 326 also has at least one abutment surface 334 which, when the filtering group 301 is in the operating position and the tightening element 326 is in the stop position, is suitable to stay in contact with a corresponding abutment surface of the filtering group 301 on the opposite side with respect to the terminal segments 319 and 320 of the connection ducts 317 and 318 with respect to the sliding direction, thus locking the filtering group 301 in the operating position.

Figure 34:
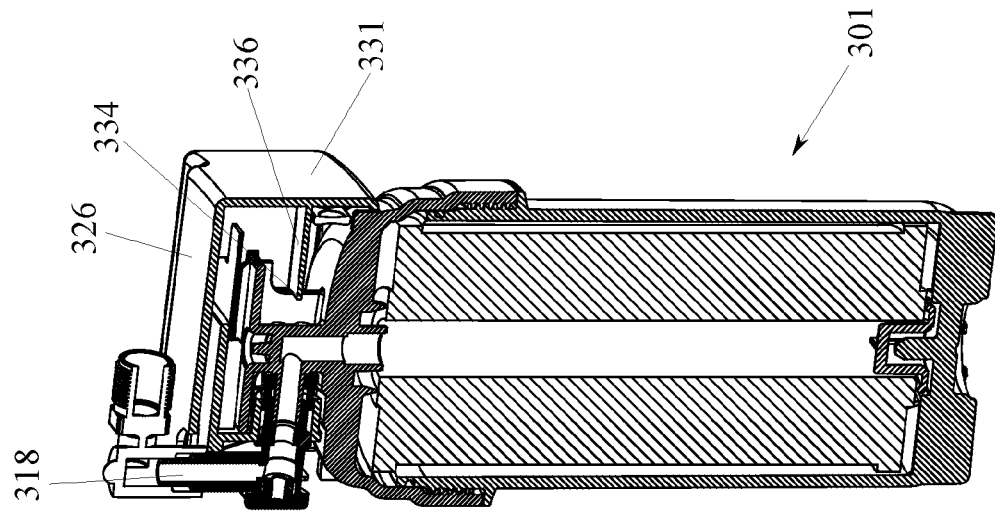
Figure 33:
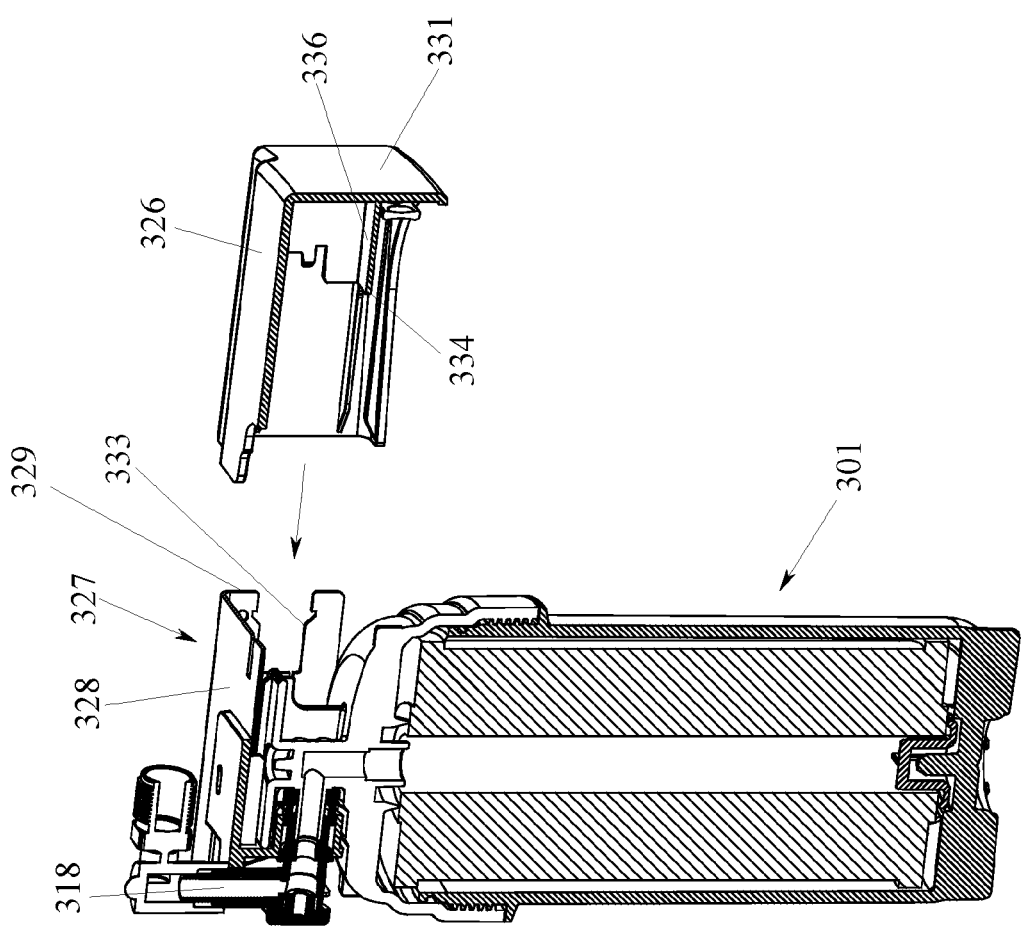

As illustrated in FIGS. 26 and 27, in this embodiment, the abutment surface 334 is made available for example by a shelf 336 deriving from the inner surface of the rear wall 331 of the tightening element 326, while the corresponding abutment surface is made available by one or more ribs which rise from the cover 304 of the filtering group 301 and which support the plate 323 (see also FIGS. 33 and 34).

Thanks to the solution described above, in order to remove the filtering group 301 it is then sufficient to release the snap-fitting members 332 and remove first the tightening element 326 and then the filtering group 301.

For this purpose, a button 337 can be associated with each snap-fitting member 332, which is suitable to be pressed to release the hooking produced by the snap-fitting member 332 itself.

In particular, the snap-fitting member 332 and the relative button 337 can be made as a single object.

It is wished to highlight that the buttons 337 must be pressed only when it is necessary to remove the tightening element 326 since, as previously anticipated, during the coupling step, the hooking between the snap-fitting members 332 and the corresponding seats 333 can take place simply by pushing the tightening element 326 to make it to slide on the box-like frame 327.

If the filtering device 300 described above is located inside the plant 100, as illustrated for example in FIG. 1, the first connection duct 317 of the support element 302 can be stably connected with the outlet 203 of the pump 201, while the second connection duct 318 can be stably connected with the first connection duct 431 of one of the modular elements 401 (see also FIG. 2).

Figure 24:
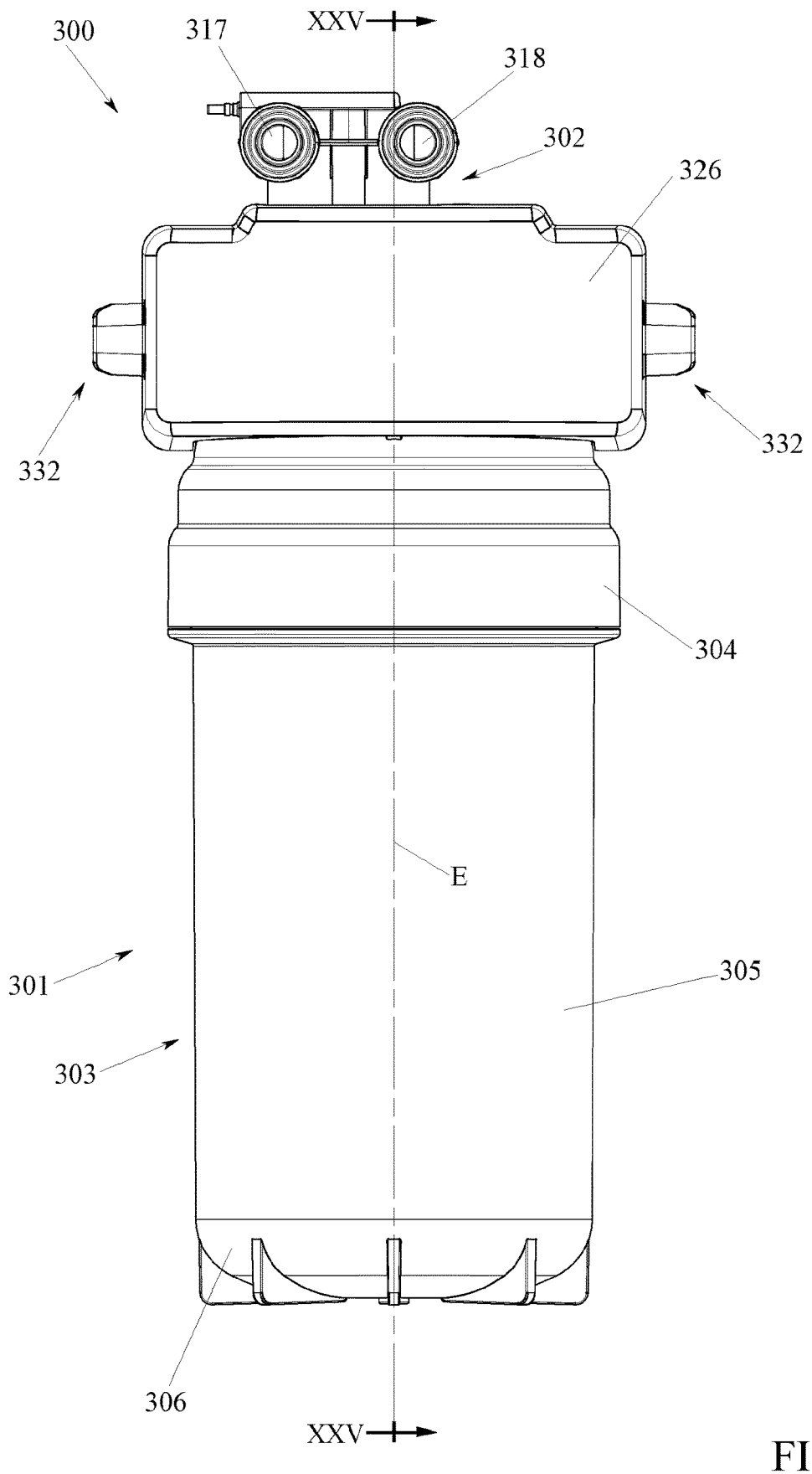
FIG. 24 is a front view of a filtering device for mechanical separation of the independent type which can be used for example in association with the plant of FIG. 9.

If, on the other hand, the filtering device 300 is separated, as illustrated for example in FIG. 24, the first connection duct 317 of the support element 302 can be directly connected with the water network, while the second connection duct 318 can be connected with the inlet duct 101 of the plant 100 or, more generally, with any utility that must receive the water filtered by the filtering device 300.

In this second case, it is further provided that, a non-return valve, indicated respectively with 338 and 339 (see FIGS. 26 and 27) can be inserted inside each terminal segment 319 and 320 of the connection ducts 317 and 318.

Said non-return valves 338 and 339 have the function of automatically preventing the water from outflowing from the water network, when the filtering unit 301 is removed. Therefore, both non-return valves 338 and 339 are configured so as to be closed in the same direction, i.e. moving towards the end of the respective terminal segment 319 and 320.

In this way, both non-return valves 338 and 339 prevent water from outflowing from the respective terminal segment 319 and 320.

However, since the non-return valve 338 is placed on the first connection duct 317 (from which the water to be filtered comes from), when the filtering group 301 is repositioned it is necessary to reopen the non-return valve 338 in contrast to the action of water.

To do this, the terminal segment 319 of the first connection duct 317 can contain a presser element 340, shaped for example as a sort of needle, which, following the insertion of the terminal segment 313 of the inlet duct 307, is pushed by said terminal segment 313 and in turn pushes the non-return valve 338 into the opening position.

This presser element 340 is not present in the terminal segment 320 of the second connection duct 318, since the non-return valve 339 opens automatically by effect of the exiting water flow.

Outlet Module

Figure 20:
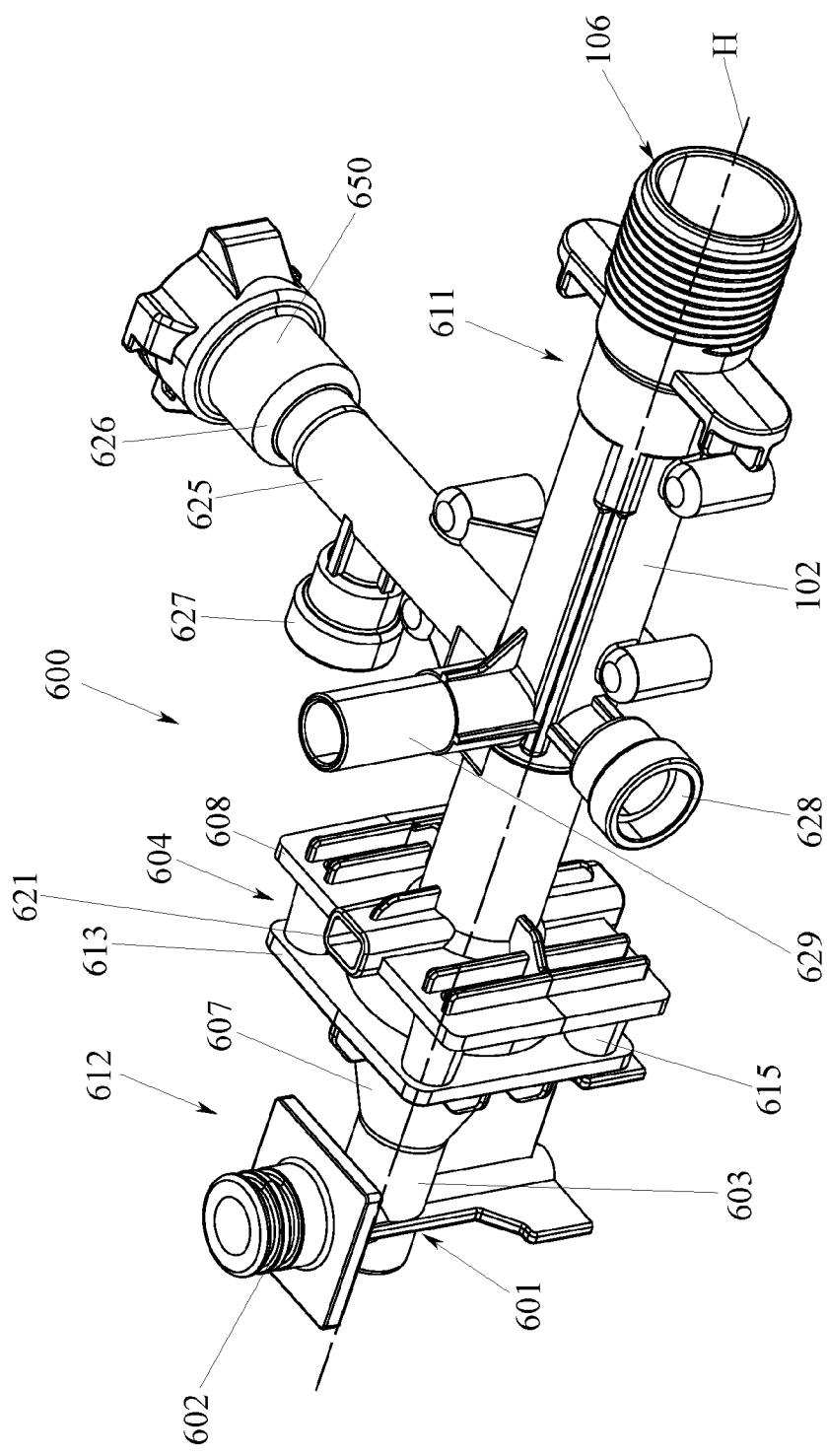
FIG. 20 is a perspective view of an outlet module used in the plants of FIGS. 1 and 9.
Figure 21:
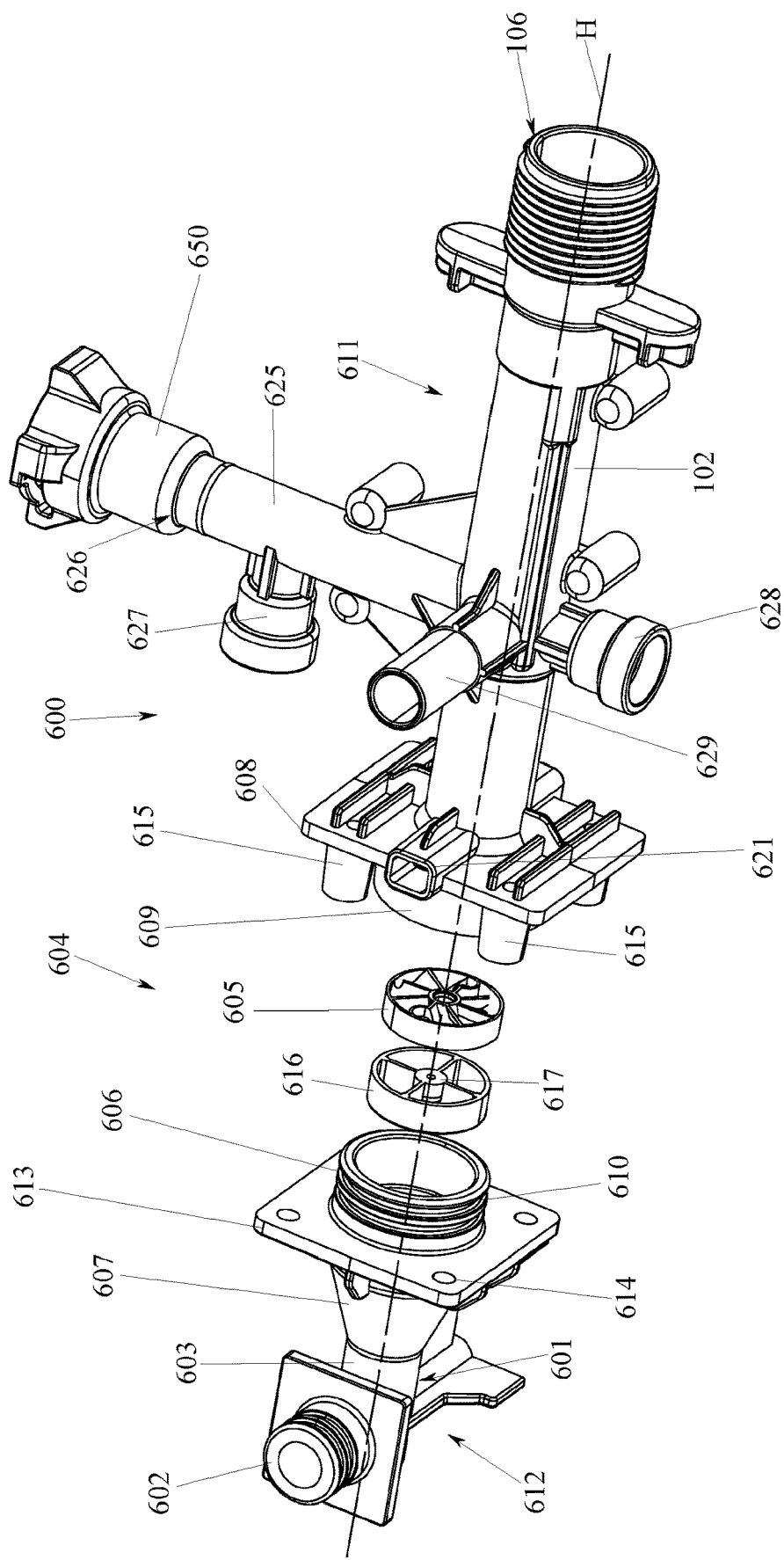
FIG. 21 is an exploded view of the outlet module of FIG. 20.
Figure 22:
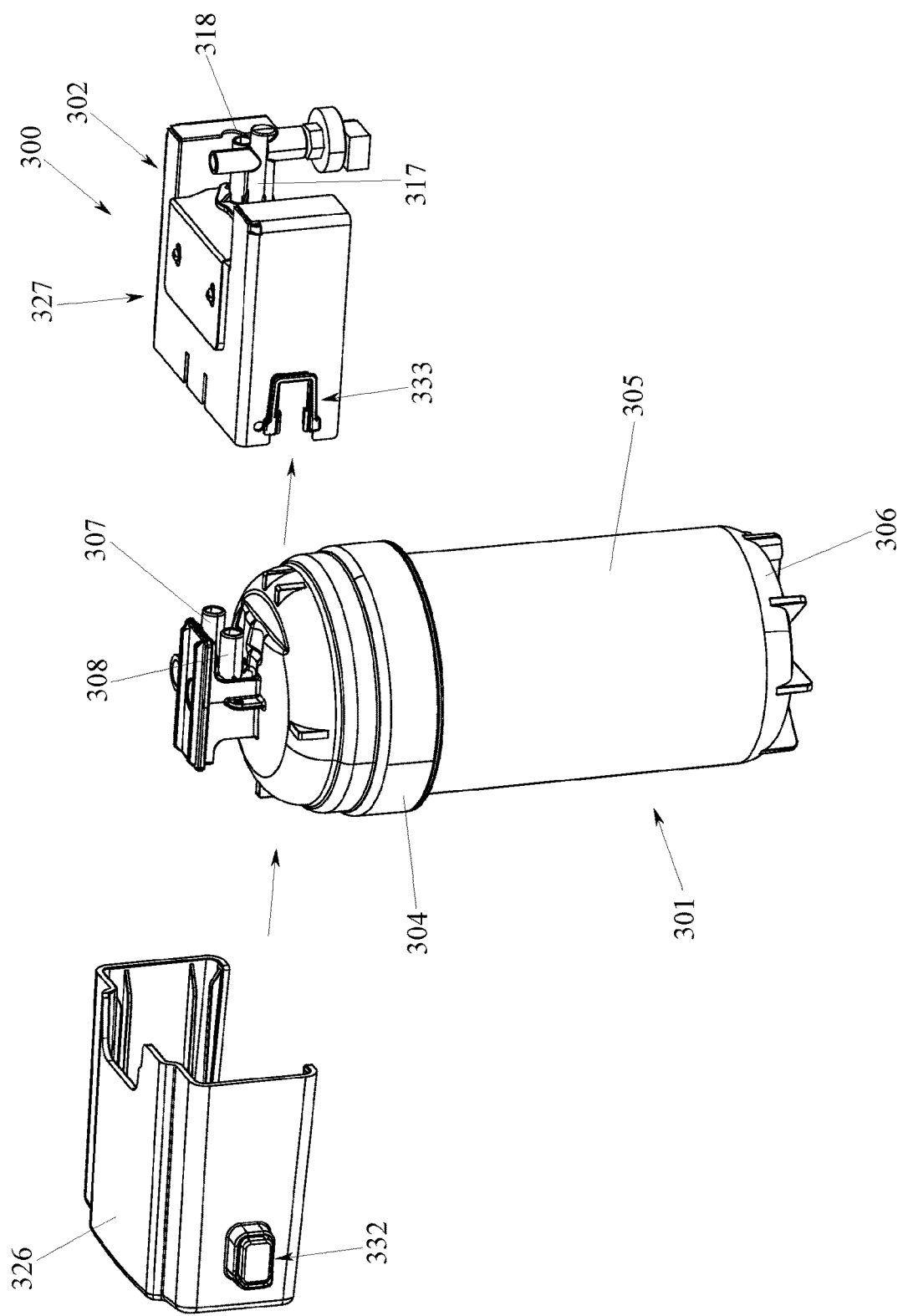
FIG. 22 is a partially exploded perspective view of a filtering device for mechanical separation used in the plant of FIG. 1.
Figure 23:
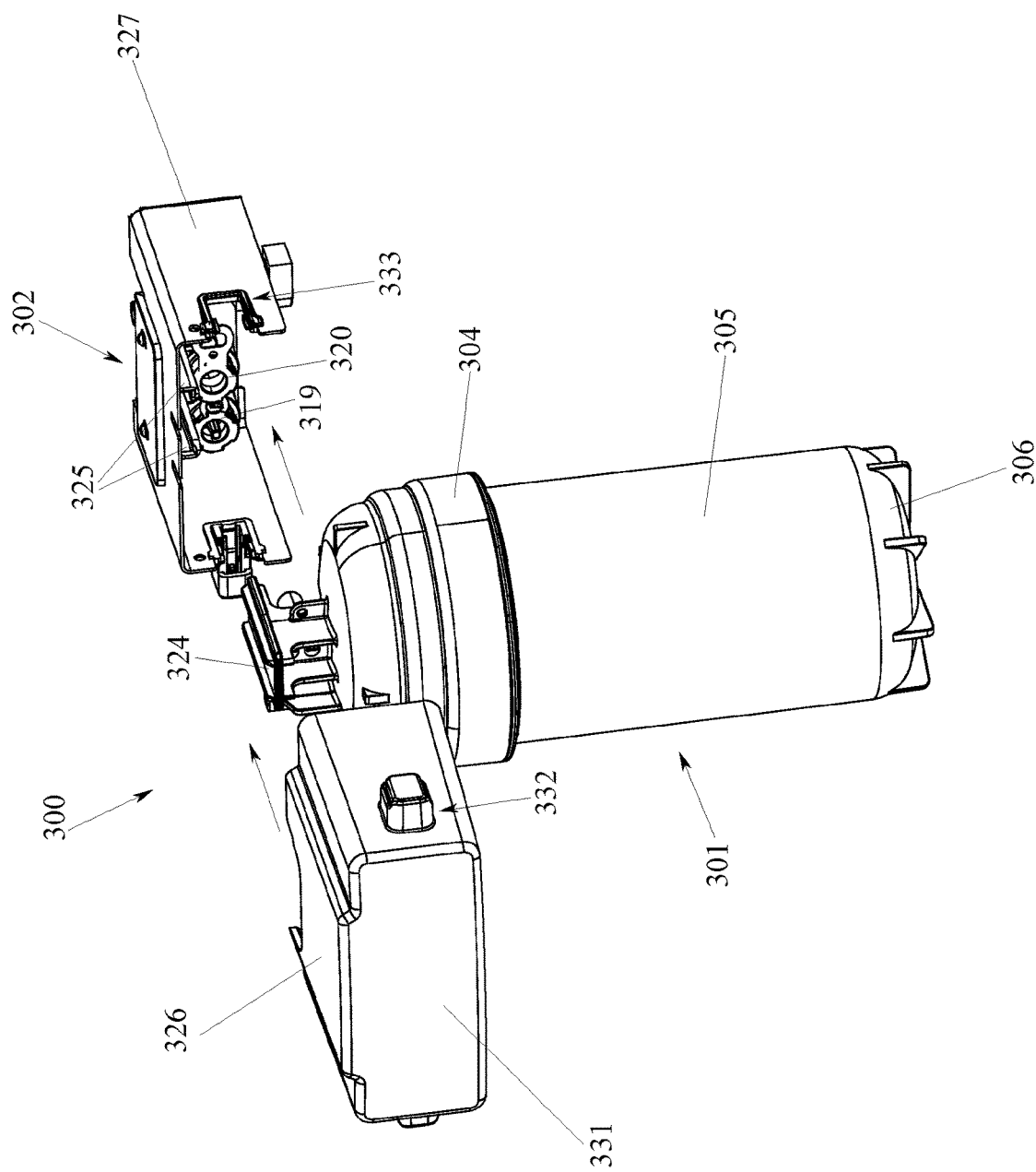
FIG. 23 is another perspective and partially exploded view of the filtering device of FIG. 22 shown from another angle.

With particular reference to FIGS. 20 and 21, the outlet module 600 first of all comprises the outlet duct 102, which preferably extends rectilinearly along a predetermined central axis H.

At one axial end, the outlet duct 102 has a terminal segment 106, which is suitable to be connected with one or more utilities of the treated water, for example but not necessarily through a manual or automatic delivery valve (not shown).

The outlet module 600 also comprises an inlet fitting 601, which is suitable to receive the water filtered by the reverse osmosis filtering device 400 and to convey it towards the outlet duct 102, preferably at the axial end opposite the terminal segment 106.

As illustrated in FIG. 8A, the inlet fitting 601 can comprise a first segment 602 which defines a coupling sleeve suitable for being coaxially inserted, by interposition of suitable sealing rings, directly inside the outlet mouth 427 of one of the modular elements 401 of the reverse osmosis filtering device 400.

The first segment 602 of the inlet fitting 601 can be axially locked to the outlet mouth 427 by means of a simple removable clip 651 which is inserted laterally on two opposed flanges obtained respectively around the first segment 602 of the inlet fitting 601 and around the outlet mouth 427 of the modular element 401.

The inlet fitting 601 may further comprise a second segment 603, which is suitable to hydraulically connect the first segment 602 with the outlet duct 102.

This second segment 603 can be coaxial to the outlet duct 102 and can be orthogonal to the first segment 602, giving the inlet fitting 601 substantially the shape of an elbow. Between the second segment 603 of the inlet fitting 601 and the outlet duct 102, the outlet module 600 comprises a flow rate transducer 604.

The flow rate transducer 604 generally comprises an outer casing suitable to contain an impeller 605.

In detail, the outer casing of the flow rate transducer 604 can comprise a cylindrical tang 606, which has a first axial end placed in hydraulic communication with the inlet fitting 601.

For example, the cylindrical tang 606 can be coaxial to the second segment 603 of the inlet fitting 601 and can optionally be connected thereto by means of a truncoconical segment 607.

The outer casing of the flow rate transducer 604 can also comprise a cover 608, which is suitable to close the second and opposite axial end of the cylindrical tang 606 and is provided with at least one internal through aperture (not visible in the figures) suitable for placing in hydraulic communication the internal volume of the cylindrical tang 606 with the outlet duct 102.

In particular, the cover 608 can comprise an annular tang 609 which, by interposition of suitable annular sealing gaskets, is inserted coaxially onto the cylindrical tang 606.

The gaskets are preferably housed in corresponding annular seats 610 obtained on the outer surface of the cylindrical tang 606.

According to one aspect of the invention, the cover 608, with the eventual annular tang 609, is part of a first monolithic body, globally indicated with 611, which also comprises (defines) the outlet duct 102.

Similarly, the cylindrical tang 606 is preferably part of a second monolithic body, globally indicated with 612, which also comprises (defines) the inlet fitting 601, including the first segment 602, the second segment 603 and possibly the truncoconical segment 607. Said first and second monolithic body 611 and 612 can be made of plastic material, for example by injection molding. In particular, each of said first and second monolithic body 611 and 612 can be directly obtained as a single piece, or it can be obtained in several parts which are then inseparably joined together, for example by welding or gluing, thus forming a single piece.

After the first and the second monolithic body 611 and 612 have been assembled together, by inserting the annular tang 609 onto the cylindrical tang 606, they can be mutually fixed by any conventional system.

As illustrated in FIG. 21, in the embodiment in question, this fixing is made possible by the fact that the second monolithic body 612 comprises a flat flange 613, which is obtained between the truncoconical segment 607 and the cylindrical tang 606 and is suitable to face the cover 608 of the first monolithic body 611.

The flat flange 613 comprises a plurality of through holes 614, each of which is suitable to be aligned with a corresponding sleeve 615 deriving in a single body from the cover 608.

In this way, the fixing between the first and the second monolithic body 611 and 612 can be obtained simply with the aid of a plurality of self-tapping screws (not shown), each of which can be inserted into a respective through hole 614 and screwed into the corresponding sleeve 615.

Before the first and the second monolithic body 611 and 612 are joined together, a support disc 616 provided with a central hub 617 and with a plurality of through apertures for the free outflow of water can be coaxially accommodated inside the cylindrical tang 606. The impeller 605, which is free to rotate, by effect of the water in transit, around its own axis coinciding with the axis of the cylindrical tang 606 is also rotatably accommodated inside the cylindrical tang 606.

For example, the impeller 605 can be rotatably coupled, by means of a central pin 618, the opposite ends of which are respectively inserted in the central hub 617 of the support disc 616 and in a hole obtained centrally in the cover 608 (see FIG. 8A).

Although in the example illustrated the impeller 605 is positioned coaxially inside the cylindrical tang 606, it is not excluded that, in other embodiments, the positioning of the impeller may be different.

The flow rate transducer 604 further comprises a system suitable for detecting the rotation speed of the impeller 605.

Said detection system can comprise one or more reference elements 619 (see FIG. 8A) fixed in an eccentric position on the impeller 605 and a proximity sensor 620, installed in a fixed position with respect to the impeller 605, which is suitable to generate an electrical signal when each of said reference elements 619 passes close to the proximity sensor 620 itself.

For example, the reference elements 619 can be magnetic bodies and the proximity sensor 620 can be configured to react to the magnetic field generated by said magnetic bodies as they pass.

In the illustrated embodiment, the proximity sensor 620 can be installed in a cavity 621 of the first monolithic body 611, which is made at the cover 608 so as to remain separated from the ducts in which the water flows, while the reference elements 619 can be positioned in order to be aligned with the proximity sensor 620 over a predetermined angular position of the impeller 605.

The proximity sensor 620 can be electrically connected with an electronic processing unit (not illustrated) which, based on the rotation speed of the impeller 605, is able to calculate the flow rate of water flowing from the inlet fitting 601 to the outlet duct 102, for example in order to verify the correct operation of the plant 100.

Downstream of the flow rate transducer 604 (with respect to the water direction), the outlet module 600 comprises at least one non-return valve 622 (see FIG. 8A), which is installed inside the outlet duct 102 so as to intercept all the water flowing inside it.

This non-return valve 622 is suitable to allow the passage of water flowing from the inlet fitting 601 towards the outlet duct 102, preventing reverse flow.

In this way, when the utility connected to the outlet duct 102 stops requesting water, for example following the closure of the delivery valve, a water hammer is generated which automatically closes the non-return valve 622, keeping an intermediate segment of the outlet duct 102 comprised between the terminal segment 106 and the non-return valve 622 itself under pressure.

When the utility requests water again, for example following the reopening of the delivery valve, the pressure in said intermediate segment of the outlet duct 102 drops rapidly, allowing the opening of the non-return valve 622 and therefore a new inflow of filtered water.

To make this operation safer, the outlet module 600 can comprise at least one further non-return valve 623, which is completely similar to the previous one and is inserted inside the outlet duct 102, upstream of the non-return valve. 622 with respect to the direction of the water outflow.

The outlet module 600 can comprise a locking element 624, which is fixed to the outlet duct 102 at the terminal segment 106 and, protruding inside the outlet duct 102 itself without obstructing it, contacts the non-return valve 622, locking it axially and preventing it from slipping off.

Returning to FIGS. 20 and 21, the first monolithic body 611 of the outlet module 600 can further comprise a secondary duct 625, which derives from and is in hydraulic communication with the intermediate segment of the outlet duct 102 comprised between the non-return valve 622 and the terminal segment 106.

Said secondary duct 625, which can be straight and extend along an axis perpendicular to the axis H of the outlet duct 102, therefore has an efferent axial end in the intermediate segment of the outlet duct 102 and an opposite free axial terminal end 626.

In some embodiments, such as the one illustrated in FIG. 9, the terminal end 626 of the secondary duct 625 can simply be closed with a plug.

In other embodiments, such as the one illustrated in FIG. 1, the terminal end 626 of the secondary duct 625 can be connected with the inlet duct 101 of the plant 100, by interposition of the bypass solenoid valve 105.

In this way, if, for example, the plant 100 has a failure and the main solenoid valve 104 is kept constantly closed, the utilities can still be supplied with water (although it is not treated), simply by opening the bypass solenoid valve 105 which allows water coming from the water network to flow directly from the inlet duct 101 into the secondary duct 625 of the outlet module 600 and from there into the outlet duct 102 towards the utilities.

In this case, another non-return valve 650, which is suitable to intercept all the water that flows inside the secondary duct 625, can be interposed between the terminal end 626 of the secondary duct 625 and the bypass solenoid valve 105.

In particular, said non-return valve 650 is suitable to allow the passage of water flowing from the bypass solenoid valve 105 towards the outlet duct 102, preventing reverse flow. The first monolithic body 611 of the outlet module 600 can further comprise a connection port 627, which is placed in hydraulic communication with the intermediate segment of the outlet duct 102 comprised between the non-return valve 622 and the terminal segment 106.

In the illustrated embodiment, said connection port 627 derives laterally from the secondary duct 625, for example from an intermediate segment of the secondary duct 625 comprised between the outlet duct 102 and the terminal end 626.

The connection port 627, which can extend with straight axis parallel to the central axis H of the outlet duct 102, is suitable to be directly coupled with a pressure-sensitive device 107 (see FIGS. 7 and 9), so that the latter is suitable to detect the pressure that reigns in the intermediate segment of the outlet duct 102 comprised between the non-return valve 622 and the terminal segment 106.

This pressure-sensitive device 107 is preferably a pressure switch which directly controls the pumping group 200 and possibly also the main solenoid valve 104.

Alternatively, the pressure-sensitive device 107 can be a pressure transducer 107 which can be connected to the electronic control unit which controls the main solenoid valve 104 and the pumping group 200.

In both cases, when the pressure-sensitive device 107 detects a pressure higher than a predetermined threshold value, indicative for example that the request for water by the utilities has been interrupted, the motor 204 of the pumping group 200 is automatically stopped and eventually the main solenoid valve 104 is also closed.

Conversely, when the pressure-sensitive device 107 detects that the pressure has dropped below the threshold value again, that is the utilities have been reopened and request water, the main solenoid valve 104 can be automatically opened and the motor 204 of the pumping group 200 is put back into operation.

The first monolithic body 611 of the outlet module 600 can further comprise a coupling port 628, which derives from and is placed also in hydraulic communication with the intermediate segment of the outlet duct 102 comprised between the non-return valve 622 and the terminal segment 106.

In the illustrated embodiment, said coupling port 628 can derive directly from the outlet duct 102, for example extending with axis straight and coinciding with the axis of the secondary duct 625 but on the opposite side of the latter.

The coupling port 628 is suitable to be directly coupled with a conductivity transducer 108 (see FIG. 7), so that the latter is suitable to detect the electrical conductivity of the water flowing along the intermediate segment of the outlet duct 102 comprised between the non-return valve 622 and the terminal segment 106.

The conductivity transducer 108, which is known per se and conventional, can be connected to the electronic control unit, so that the latter can, for example, control the operation and the efficiency of the plant 100.

In fact, the electrical conductivity of water generally depends on the concentration of salts dissolved therein, so that this parameter can provide an indirect indication of the operation and of the filtering capacity of the reverse osmosis filtering device 400.

Finally, the outlet module 600 can comprise a connecting duct 629, which derives from and is also placed in hydraulic communication with the intermediate segment of the outlet duct 102 comprised between the non-return valve 622 and the terminal segment 106. This connecting duct 629 can extend with axis straight and orthogonal both to the central axis H of the outlet duct and to the axis of the secondary duct 625 but preferably incident with the latter into a common intersection point.

In the example of FIG. 8A, the connecting duct 629 is closed with a plug, however, in other embodiments, it is suitable to be hydraulically connected to an auxiliary device (not illustrated).

Said auxiliary device can be a tank, which is preferably positioned at a higher level than the outlet duct 102.

This tank can effectively act as a buffer for storing the treated water, to allow a more immediate supply of the same when requested by the utilities.

In fact, as previously explained, when the utilities request water, for example through the opening of the respective delivery valve, the pressure in the outlet duct 102 decreases and, only following pressure decrease, the electronic control unit controls the actuation of the pumping group 200 and possibly the opening of the main solenoid valve 104.

This procedure can therefore involve a certain delay between the instant in which the water is requested by the utilities and the instant in which the water is actually supplied. The presence of a storage tank connected to the connecting duct 629 can mitigate this delay.

In fact, during normal operation of the plant 100, the storage tank is filled with a part of the filtered water travelling towards the utilities connected to the outlet duct 102.

When the request for water stops, this filtered water remains confined inside the storage tank.

When the delivery is reopened, the pressure drop in the outlet duct 102 causes the filtered water stored in the tank to flow immediately towards the utilities, waiting for the plant 100 to return to normal operation.

Obviously, a person skilled in the art can make numerous modifications of a technical-applicative nature to everything described above, without thereby departing from the scope of the invention as claimed below.

The invention claimed is:

1. A container (403) for filtering devices, comprising:
a tubular lateral wall (405),
a bottom plate (406) which closes a first axial end of said tubular lateral wall (405), and
a closing system (500) configured to close, in an openable fashion, a second and opposite axial end of said tubular lateral wall (405),
wherein said closing system (500) comprises:
an occlusion element (501), which comprises a cylindrical lower portion (502) configured to be coaxially inserted into the tubular lateral wall (405) and an upper portion (507) from which one or more abutment elements (508) project, said one or more abutment elements (508) resting on an edge of the second axial end of the tubular lateral wall (405),
one or more annular seats (503) obtained coaxially on an outer lateral surface of the cylindrical lower portion (502) of the occlusion element (501) and singularly configured to receive an annular sealing gasket (504) providing a radial sealing between the cylindrical lower portion (502) of the occlusion element (501) and the tubular lateral wall (405), and
a tightening member (517) comprising at least one abutment surface (519) resting on the upper portion (507) of the occlusion element (501) on an opposite side with respect to the bottom plate (406) and a ring nut (518) configured to surround the occlusion element (501) and to be axially constrained to an exterior of the tubular lateral wall (405), at the second axial end thereof, in order for the tightening member (517) to axially lock the occlusion element (501) in the position in which the abutment elements (508) rest on the edge of the second axial end of the tubular lateral wall (405).

2. The container (403) according to claim 1, wherein the occlusion element (501) is without threading.

3. The container (403) according to claim 1, wherein the cylindrical lower portion (502) of the occlusion element (501) is defined by a tubular wall (505) which delimits an axial inner cavity open towards the bottom plate (406).

4. The container (403) according to claim 3, wherein said tubular wall (505) of the occlusion element (501) has a smaller thickness with respect to that of the tubular lateral wall (405), at least at the second axial end thereof.

5. The container (403) according to claim 1, wherein the edge of the second axial end of the tubular lateral wall (405) is shaped so as to define a cam profile on which the abutment elements (508) of the occlusion element (501) can slide following a rotation of the occlusion element (501) around an axis thereof, said cam profile being configured to transform said rotation into an axial displacement of the occlusion element (501) with respect to the tubular lateral wall (405).

6. The container (403) according to claim 5, wherein the upper portion (507) of the occlusion element (501) has an axial cavity (511) configured to obtain a prismatic coupling with a coupled-type maneuvering key (512).

7. The container (403) according to claim 5, wherein the upper portion (507) of the occlusion element (501) has one or more through slots (516) having transverse axes with respect to the occlusion element (501).

8. The container (403) according to claim 1, wherein the abutment surface (519) of the tightening member (517) is defined by a bottom wall (520) which occludes an axial end of the ring nut (518).

9. The container (403) according to claim 1, wherein the ring nut (518) is a threaded ring nut configured to be screwed to the exterior of the tubular lateral wall (405).

10. The container (403) according to claim 9, further comprising an anti-unscrewing system for the tightening member (517) with respect to the tubular lateral wall (405).

11. The container (403) according to claim 10, wherein said anti-unscrewing system comprises:
   a first notch (521) fixed to the tightening member (517),
   a second notch (522) moveably coupled to the tubular lateral wall (405) of the container between an engagement position, in which the second notch is configured to be engaged with the first notch (521) for preventing the rotation of the tightening member (517), and a disengagement position in which the second notch frees said engagement, and
   a spring (525) configured to push the second notch (522) in engagement position.

* * * * *